(12) United States Patent
Sprang et al.

(10) Patent No.: US 9,430,479 B2
(45) Date of Patent: *Aug. 30, 2016

(54) INTERACTIVE FRAMES FOR IMAGES AND VIDEOS DISPLAYED IN A PRESENTATION APPLICATION

(75) Inventors: Steve Sprang, Mountain View, CA (US); Brad Vaughan, Mt. Lebanon, PA (US); Jay Christopher Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/535,043

(22) Filed: Jun. 27, 2012

(65) Prior Publication Data

US 2013/0050255 A1 Feb. 28, 2013

Related U.S. Application Data

(63) Continuation of application No. 12/187,174, filed on Aug. 6, 2008, now Pat. No. 8,225,208.

(60) Provisional application No. 60/954,297, filed on Aug. 6, 2007, provisional application No. 60/970,167, filed on Sep. 5, 2007.

(51) Int. Cl.
| | |
|---|---|
| *G06F 17/30* | (2006.01) |
| *G11B 27/034* | (2006.01) |
| *G11B 27/10* | (2006.01) |
| *G11B 27/34* | (2006.01) |
| *G06F 3/0484* | (2013.01) |
| *G06T 7/00* | (2006.01) |
| *G06T 11/60* | (2006.01) |

(52) U.S. Cl.
CPC ...... *G06F 17/30056* (2013.01); *G06F 3/04845* (2013.01); *G06T 7/0081* (2013.01); *G06T 11/60* (2013.01); *G11B 27/034* (2013.01); *G11B 27/10* (2013.01); *G11B 27/34* (2013.01); *G06T 2207/20104* (2013.01); *G06T 2207/20144* (2013.01)

(58) Field of Classification Search
CPC ............. G06T 11/00; G06T 2207/20132; G06T 2207/20144; G06T 2207/20116; H04N 5/272; G06F 17/30056
USPC .......... 715/716, 723, 730, 790, 800
See application file for complete search history.

(56) References Cited

U.S. PATENT DOCUMENTS

| | | | |
|---|---|---|---|
| 5,452,406 | A | 9/1995 | Butler et al. |
| 5,459,529 | A | 10/1995 | Searby et al. |
| 5,473,740 | A * | 12/1995 | Kasson .................. 345/628 |
| 5,534,917 | A | 7/1996 | MacDougall |
| 5,557,728 | A | 9/1996 | Garrett et al. |
| 5,590,267 | A | 12/1996 | Butler et al. |
| 5,615,324 | A * | 3/1997 | Kuboyama ............. 345/441 |

(Continued)

*Primary Examiner* — Eric Wiener
(74) *Attorney, Agent, or Firm* — Blank Rome LLP

(57) ABSTRACT

A presentation application for framing objects, such as images and videos, is provided. Using the presentation application, the user may select a frame from a plurality of available frames. The presentation application may mask portions of the displayed object that would lie outside of the selected frame before displaying the selected frame. The presentation application may provide an interface that allows the user to adjust the size of the frame and the object. The presentation application may automatically adjust the size of the frame when the size of the object is changed, and vice versa.

22 Claims, 35 Drawing Sheets

(56) References Cited

U.S. PATENT DOCUMENTS

| | | |
|---|---|---|
| 5,687,306 A | 11/1997 | Blank |
| 5,715,331 A | 2/1998 | Hollinger |
| 5,748,775 A | 5/1998 | Tsuchikawa et al. |
| 5,781,198 A | 7/1998 | Korn |
| 5,812,787 A | 9/1998 | Astle |
| 5,914,748 A | 6/1999 | Parulski et al. |
| 5,923,791 A | 7/1999 | Hanna et al. |
| 6,008,807 A | 12/1999 | Bretschneider et al. |
| 6,084,582 A | 7/2000 | Qureshi et al. |
| 6,175,423 B1 | 1/2001 | Frickey |
| 6,204,840 B1 | 3/2001 | Petelycky et al. |
| 6,300,955 B1* | 10/2001 | Zamir ................ 382/283 |
| 6,311,196 B1 | 10/2001 | Arora et al. |
| 6,324,545 B1 | 11/2001 | Morag |
| 6,369,835 B1 | 4/2002 | Lin |
| 6,396,500 B1 | 5/2002 | Qureshi et al. |
| 6,400,347 B1 | 6/2002 | Kang |
| 6,400,374 B2* | 6/2002 | Lanier ................ 345/630 |
| 6,404,441 B1 | 6/2002 | Chailleux |
| 6,459,756 B1* | 10/2002 | Tam et al. ............ 378/15 |
| 6,550,922 B2 | 4/2003 | Bogomolnyi |
| 6,590,586 B1 | 7/2003 | Swenton-Wall et al. |
| 6,636,238 B1 | 10/2003 | Amir et al. |
| 6,683,649 B1 | 1/2004 | Anderson |
| 6,738,075 B1 | 5/2004 | Torres et al. |
| 6,750,903 B1* | 6/2004 | Miyatake ........... H04N 5/23238 348/218.1 |
| 6,827,447 B2 | 12/2004 | Wu |
| 6,850,247 B1 | 2/2005 | Reid et al. |
| 6,907,136 B1* | 6/2005 | Shigemori ............ 382/118 |
| 6,938,210 B1 | 8/2005 | Huh |
| 6,970,145 B1 | 11/2005 | Aoki |
| 6,973,627 B1 | 12/2005 | Appling |
| 6,992,661 B2* | 1/2006 | Ikehata ............. G06F 3/04845 345/173 |
| 7,030,890 B1 | 4/2006 | Jouet et al. |
| 7,032,180 B2 | 4/2006 | Wilkinson et al. |
| 7,102,643 B2 | 9/2006 | Moore et al. |
| 7,167,191 B2 | 1/2007 | Hull et al. |
| 7,197,181 B1 | 3/2007 | Cote |
| 7,246,316 B2 | 7/2007 | Furlong et al. |
| 7,251,363 B2 | 7/2007 | Priddy |
| 7,283,277 B2 | 10/2007 | Li |
| 7,289,132 B1 | 10/2007 | Reid et al. |
| 7,360,159 B2 | 4/2008 | Chailleux |
| 7,478,328 B2 | 1/2009 | Hannebauer et al. |
| 7,500,203 B2 | 3/2009 | Mori |
| 7,505,051 B2 | 3/2009 | Wang |
| 7,526,726 B1* | 4/2009 | Skwarecki et al. ........ 715/731 |
| 7,629,984 B2 | 12/2009 | Reid et al. |
| 7,681,113 B2 | 3/2010 | Takakuwa et al. |
| 7,689,712 B2 | 3/2010 | Lee et al. |
| 7,707,188 B2 | 4/2010 | Pandya et al. |
| 7,710,439 B2 | 5/2010 | Reid et al. |
| 7,739,601 B1 | 6/2010 | Wong et al. |
| 7,743,331 B1 | 6/2010 | Fleischer et al. |
| 7,747,133 B2 | 6/2010 | Seo et al. |
| 7,752,548 B2 | 7/2010 | Mercer |
| 7,764,277 B2 | 7/2010 | Klassen et al. |
| 7,768,535 B2 | 8/2010 | Reid et al. |
| 7,787,755 B2 | 8/2010 | Seo et al. |
| 7,843,466 B2 | 11/2010 | Hanechak |
| 8,013,870 B2* | 9/2011 | Wilensky ............ 345/592 |
| 8,155,415 B2* | 4/2012 | Faul et al. ............ 382/131 |
| 8,225,208 B2 | 7/2012 | Sprang et al. |
| 2001/0050755 A1 | 12/2001 | Bogomolnyi |
| 2002/0030634 A1* | 3/2002 | Noda ............... G06T 11/60 345/5 |
| 2002/0109736 A1 | 8/2002 | Chailleux |
| 2002/0120939 A1 | 8/2002 | Wall et al. |
| 2002/0122067 A1 | 9/2002 | Geigel et al. |
| 2002/0133513 A1* | 9/2002 | Townsend et al. ........ 707/500.1 |
| 2002/0156799 A1 | 10/2002 | Markel et al. |
| 2002/0164151 A1* | 11/2002 | Jasinschi et al. .......... 386/69 |
| 2002/0167538 A1 | 11/2002 | Bhetanabhotla |
| 2003/0002718 A1* | 1/2003 | Hamid ................ 382/124 |
| 2003/0072486 A1 | 4/2003 | Loui et al. |
| 2003/0076538 A1 | 4/2003 | Whittingham et al. |
| 2003/0103234 A1* | 6/2003 | Takabayashi ...... H04N 1/00132 358/1.15 |
| 2003/0112268 A1 | 6/2003 | Wettach |
| 2003/0122863 A1 | 7/2003 | Dieberger et al. |
| 2004/0056894 A1 | 3/2004 | Zaika et al. |
| 2004/0104920 A1* | 6/2004 | Kawabe ............ G06F 3/1454 345/660 |
| 2004/0109014 A1* | 6/2004 | Henderson ......... G09G 5/377 715/716 |
| 2004/0123184 A1 | 6/2004 | Westberg |
| 2004/0125129 A1 | 7/2004 | Marsh |
| 2004/0201610 A1 | 10/2004 | Rosen et al. |
| 2004/0205477 A1 | 10/2004 | Lin |
| 2004/0205546 A1 | 10/2004 | Blumberg |
| 2005/0034077 A1 | 2/2005 | Jaeger |
| 2005/0044499 A1 | 2/2005 | Allen et al. |
| 2005/0068589 A1* | 3/2005 | Inness et al. ............. 358/3.28 |
| 2005/0071781 A1 | 3/2005 | Atkins |
| 2005/0091579 A1 | 4/2005 | Mewherter et al. |
| 2005/0108619 A1 | 5/2005 | Theall et al. |
| 2005/0111737 A1 | 5/2005 | Das et al. |
| 2005/0114251 A1 | 5/2005 | Sperandeo |
| 2005/0114521 A1 | 5/2005 | Lee et al. |
| 2005/0147322 A1* | 7/2005 | Saed ................ 382/284 |
| 2005/0168583 A1* | 8/2005 | Thomason .......... G06T 3/608 348/208.4 |
| 2005/0174462 A1* | 8/2005 | Brost ............... 348/333.09 |
| 2005/0219395 A1* | 10/2005 | Sugimoto ........ G06K 9/00221 348/333.12 |
| 2005/0259590 A1 | 11/2005 | Brown et al. |
| 2005/0278629 A1 | 12/2005 | Chailleux |
| 2006/0098167 A1* | 5/2006 | Sato ................ G03B 21/26 353/35 |
| 2006/0177132 A1* | 8/2006 | Jackson et al. ............. 382/173 |
| 2006/0228044 A1* | 10/2006 | Yeh et al. ................ 382/276 |
| 2006/0238653 A1* | 10/2006 | Tobita ................ G11B 27/28 348/581 |
| 2006/0244765 A1 | 11/2006 | Isomura et al. |
| 2006/0245805 A1 | 11/2006 | Takakuwa et al. |
| 2006/0259314 A1* | 11/2006 | Furman et al. ............. 705/1 |
| 2006/0265643 A1* | 11/2006 | Saft ............... G06F 17/30899 715/209 |
| 2006/0279566 A1 | 12/2006 | Atkins et al. |
| 2006/0284885 A1 | 12/2006 | Van Asten et al. |
| 2007/0005616 A1* | 1/2007 | Hay et al. ................. 707/100 |
| 2007/0016875 A1 | 1/2007 | Santos-Gomez |
| 2007/0033528 A1* | 2/2007 | Merril et al. ............... 715/732 |
| 2007/0038938 A1 | 2/2007 | Canora et al. |
| 2007/0083911 A1 | 4/2007 | Madden et al. |
| 2007/0106927 A1 | 5/2007 | Antley |
| 2007/0124156 A1 | 5/2007 | Rice et al. |
| 2007/0124709 A1 | 5/2007 | Li et al. |
| 2007/0140559 A1* | 6/2007 | Rambharack et al. ....... 382/171 |
| 2007/0154164 A1 | 7/2007 | Liu et al. |
| 2007/0168849 A1 | 7/2007 | Bell et al. |
| 2007/0198908 A1 | 8/2007 | Kirkpatrick et al. |
| 2007/0199018 A1* | 8/2007 | Angiolillo et al. ........... 725/39 |
| 2007/0201765 A1* | 8/2007 | DuBois ................ 382/293 |
| 2007/0204215 A1 | 8/2007 | Mueller et al. |
| 2007/0206842 A1* | 9/2007 | Hamid ................ 382/125 |
| 2007/0266324 A1 | 11/2007 | Chailleux |
| 2007/0294612 A1* | 12/2007 | Drucker et al. ............ 715/500.1 |
| 2008/0007625 A1 | 1/2008 | Reid et al. |
| 2008/0063303 A1* | 3/2008 | Strom ............... G06T 3/4023 382/298 |
| 2008/0086689 A1 | 4/2008 | Berkley et al. |
| 2008/0100696 A1 | 5/2008 | Schirdewahn |
| 2008/0104515 A1 | 5/2008 | Dumitru et al. |
| 2008/0120546 A1 | 5/2008 | Pulier |
| 2008/0126476 A1* | 5/2008 | Nicholas et al. ........... 709/203 |
| 2008/0222505 A1 | 9/2008 | Chmura |
| 2008/0222560 A1 | 9/2008 | Harrison |
| 2008/0272986 A1 | 11/2008 | Lee |
| 2009/0024881 A1 | 1/2009 | Carroll et al. |
| 2009/0044117 A1 | 2/2009 | Vaughan et al. |

(56) References Cited

U.S. PATENT DOCUMENTS

| | | |
|---|---|---|
| 2009/0044123 A1 | 2/2009 | Tilton et al. |
| 2009/0044136 A1 | 2/2009 | Flider et al. |
| 2009/0060334 A1 | 3/2009 | Rayner |
| 2009/0070636 A1 | 3/2009 | Bultrowicz et al. |
| 2009/0128486 A1 | 5/2009 | Nijlunsing et al. |
| 2009/0254830 A9 | 10/2009 | Reid et al. |
| 2010/0064223 A1 | 3/2010 | Tilton |
| 2011/0107214 A1* | 5/2011 | Kouznetsov et al. ........ 715/716 |

* cited by examiner

FIG. 39

INTERACTIVE FRAMES FOR IMAGES AND VIDEOS DISPLAYED IN A PRESENTATION APPLICATION

CROSS-REFERENCE TO RELATED APPLICATIONS

This application is a continuation of U.S. patent application Ser. No. 12/187,174, entitled "Interactive Frames for Images and Videos Displayed in a Presentation application" filed Aug. 6, 2008, which claims the benefit of U.S. Provisional Application Nos. 60/954,297, filed Aug. 6, 2007 and 60/970,167, filed Sep. 5, 2007. This application is also related to U.S. application Ser. Nos. 12/187,264, filed Aug. 6, 2008; 12/187,170, filed Aug. 6, 2008; 12/187,262, filed Aug. 6, 2008; and 12/187,263, filed Aug. 6, 2008. All of these applications are hereby incorporated by reference herein in their entirety.

BACKGROUND

1. Field of the Invention

This application is related to a presentation application and to framing objects displayed on slides of presentations using a presentation application.

2. Background of the Disclosure

Electronic devices, including for example computers, may be used to implement presentation applications. Using presentation applications, users may create one or more slides that include some form of visual information. For example, presentation applications may provide users with an interface to add videos or images to slides and to change the size and location of the videos or images within the slides. However, the ability to change more advanced properties of objects in conventional presentation applications remain limited.

SUMMARY OF THE DISCLOSURE

Systems and methods are provided for framing objects, such as images and videos, displayed in a presentation application.

The user of an electronic device may access a presentation application to create slides for a presentation. In some embodiments, the user may add an object to a slide (e.g., text, video, or an image), and direct the presentation application to display a frame around at least a portion of the object. For example, the user may request that a frame resembling a physical picture frame be displayed around an image.

The presentation application may provide a plurality of frames for the user to choose from. Each of the frames may be associated with a set of graphics that together form the entire frame. For example, a first graphic may be displayed as the sides of a particular frame, a second graphic may be displayed as the top and bottom of that frame, and a third graphic may be displayed for each corner of the frame. When the presentation application receives a user selection of one of the available frames, the presentation application may identify the graphics for the selected frame using, for example, metadata that defines properties of the selected frame.

In many scenarios, the length of a graphic for a particular edge (e.g., the length of the graphic for the top of the object) may be different than the length of that edge of the object (e.g., the length of the top of the object). For example, if only one copy of the graphic were displayed at the edge, that edge would not be entirely bordered. In some embodiments, the presentation application may stretch a graphic when the graphic is shorter than the length of the graphic edge. In other embodiments, the presentation application may instead display multiple copies of the graphic. The presentation application may determine whether to stretch or duplicate the graphics of a frame based on the metadata associated with the frame.

The presentation application may provide a convenient and user-friendly interface that allows a user to adjust the size of the frame and the size of the object it frames. For example, the presentation application may provide a slider that, when moved by the user, can change the width of the frame. The presentation application may automatically adjust the frame when the user directs the presentation application to change the size of the frame. The presentation application may, for example, increase the number of displayed copies of the side/top/bottom graphics, or the amount that the graphics are stretch, as the size of the object is increased.

The presentation application may provide frames that are irregularly shaped, such as frames that have an inner boundary and an outer boundary that are not parallel and/or an inner boundary and outer boundary that are not straight. To display these frames, the presentation application can mask portions of the object that lie outside of the outer boundary of the frame. The presentation application may or may not additionally mask any portions of the object that will be covered by the frame. Once these portions are masked, the presentation application may display the frame.

BRIEF DESCRIPTION OF THE DRAWINGS

The above and other aspects and advantages of the invention will be apparent upon consideration of the following detailed description, taken in conjunction with the accompanying drawings, in which like reference characters refer to like parts throughout, and in which:

FIGS. 38 and 39 show illustrative display screens for displaying import/export notifications in accordance with an embodiment of the present invention;

DETAILED DESCRIPTION OF THE DISCLOSURE

Figure 1:
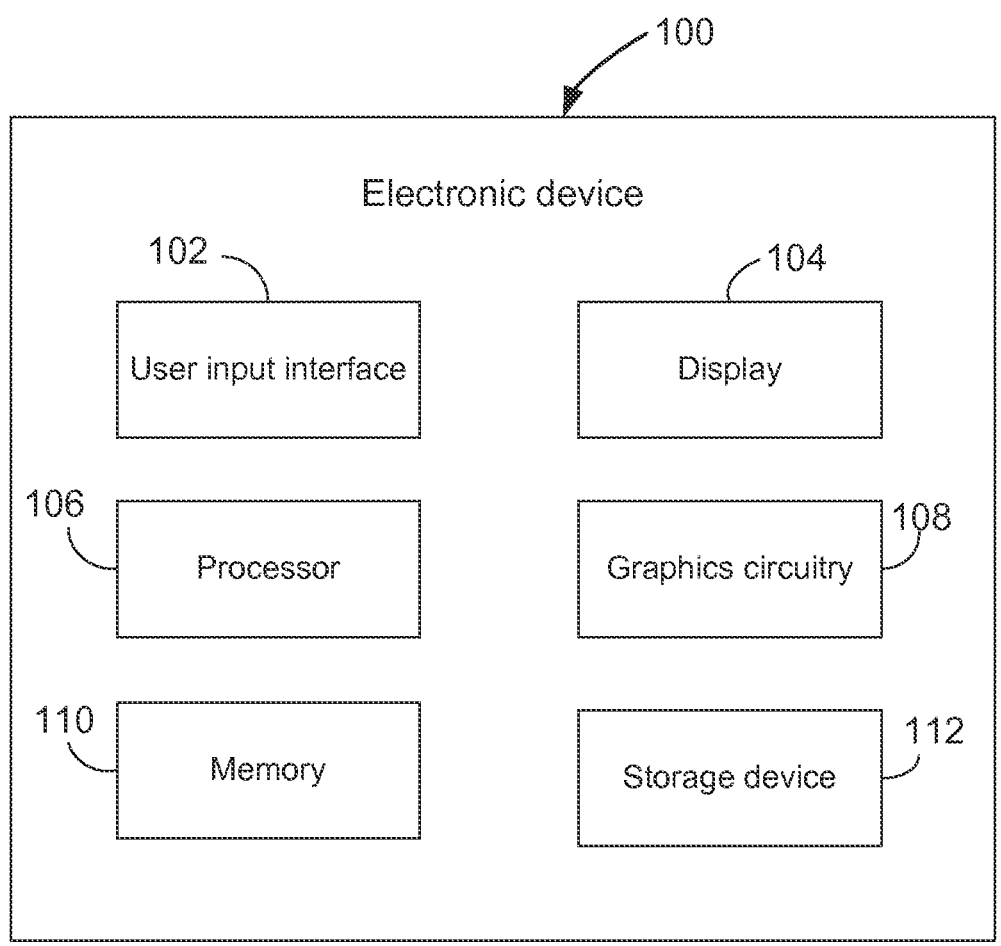
FIG. 1 shows a simplified block diagram of an electronic device in accordance with an embodiment of the present invention.

FIG. 1 shows a simplified block diagram of illustrative electronic device 100. Electronic device 100 can include, among other components, user input interface 102, display 104, processor 106, graphics circuitry 108, memory 110, and storage device 112. Processor 106 can communicate with the other components of electronic device 100, and can control the operation of system 100. Processor 106 may be any suitable type of processor, such as a central processing unit (CPU) or a microcontroller. In some embodiments, processor 106 can execute instructions stored in memory 110.

Memory 110 may include one or more different types of memory that can be used to perform device functions. For example, memory 110 may include cache, Flash, ROM, and/or RAM. Memory 110 may be specifically dedicated to storing firmware. For example, memory 110 may be provided for storing firmware for device applications (e.g., operating system, user interface functions, and processor functions).

Storage device 112 can include one or more suitable storage mediums, such as a hard-drive, permanent memory such as ROM, semi-permanent memory such as RAM, or cache. Storage device 112 can be used for storing media (e.g., audio and video files), text, pictures, graphics, or any suitable user-specific or global information that may be used by electronic device 100. Storage device 112 may store programs or applications that can be run on processor 106, may maintain files formatted to be read and edited by one or more of the applications, and may store any additional files that may aid the operation of one or more applications (e.g., files with metadata). It should be understood that any of the information stored in storage device 112 may instead by stored in memory 110, and in some cases, may depend on the operating conditions of electronic device 100.

With continuing reference to FIG. 1, electronic device 100 can include user input interface 102 and display 104 for providing a user with the ability to interact with electronic device 100. For example, user input interface 102 and display 104 can provide an interface for a user to interact with an application running on processor 106. User input interface 102 may take a variety of forms, such as a keyboard/keypad, computer mouse, click wheel, button, stylus, or touchscreen. User input interface 102 can also include an audio input device (e.g., a microphone) or a video input device (e.g., a camera or a web cam) for recording. Display 104 can include a liquid crystal display (LCD), a touchscreen display, or any other suitable display system for presenting information or media to a user. Display 104 can be controlled by graphics circuitry 108. Graphics circuitry 108 may include a video card, such as a video card with 2D or 3D capabilities.

Electronic device 100 can include any device or group of devices capable of providing an application for editing media or creating presentations. In one embodiment, electronic device 100 may include a user computer system, such as a desktop computer (e.g., an iMac) or a laptop computer (e.g., a PowerBook or MacBook). In this embodiment, system 100 may run a suitable computer operating system, such as a Mac OS, and can include a set of applications stored in, for example, storage device 112 that is compatible with the particular operating system.

The applications available to a user of electronic device 100 can be grouped into application suites. The suites may include applications that provide similar or related functionalities. For example, the applications in one suite may include word processing and publishing applications (e.g., Keynote and Pages within the iWork suite), and another suite may include media editing tools (e.g., iWeb within the iLife suite). The applications within a given suite may have similar properties and other features that associate each application in a suite with the other applications in that suite. For example, the applications may have a similar look and feel, may have a similar user interface, may include related features or functions, may allow a user to easily switch between the applications in the suite, or may be a combination of these.

Therefore, although embodiments of the present invention will generally be described in terms of a single application, it should be understood that any of the features or functionalities of an application may be general to one or more of the applications in a suite. Alternatively, they may be general to one or more applications across a group of suites. Also, some embodiments of the present invention are described as being executed by a presentation application. A presentation application is referred to herein as an interactive application running on any user equipment that presents media (e.g., visual media such as video, images, pictures, graphics, etc., or audio media such as sound clips) to a user and allows the user to control some of the features or aspects of the media. For example, a presentation application may be an application that can be used to create and present slides of a slide show presentation.

A presentation application can provide multiple modes of operation. For example, the presentation application can include three modes of operation referred to sometimes as an edit mode, a presentation mode, and a presenter's mode. In edit mode, the presentation application may provide a convenient and user-friendly interface for a user to add, edit, remove, or otherwise modify the slides of a slide show. To display a created slide show presentation in a format suitable for presenting to an audience, the presentation application can switch into presentation mode. In some embodiments, the presentation application may provide a full-screen presentation of the slides in the presentation mode, and can include any animations, transitions, or other properties defined in the edit mode. In presenter's mode, the presentation application can display the slide show presentation, like in the presentation mode, but with additional information (e.g., a timer for displaying the length of time since the presentation started, options to control the flow of the presentation). The presentation application may provide a presenter's mode display to a presenter of a slide show presentation, and may provide a presentation mode display to the audience of that slide show presentation.

Figure 2:
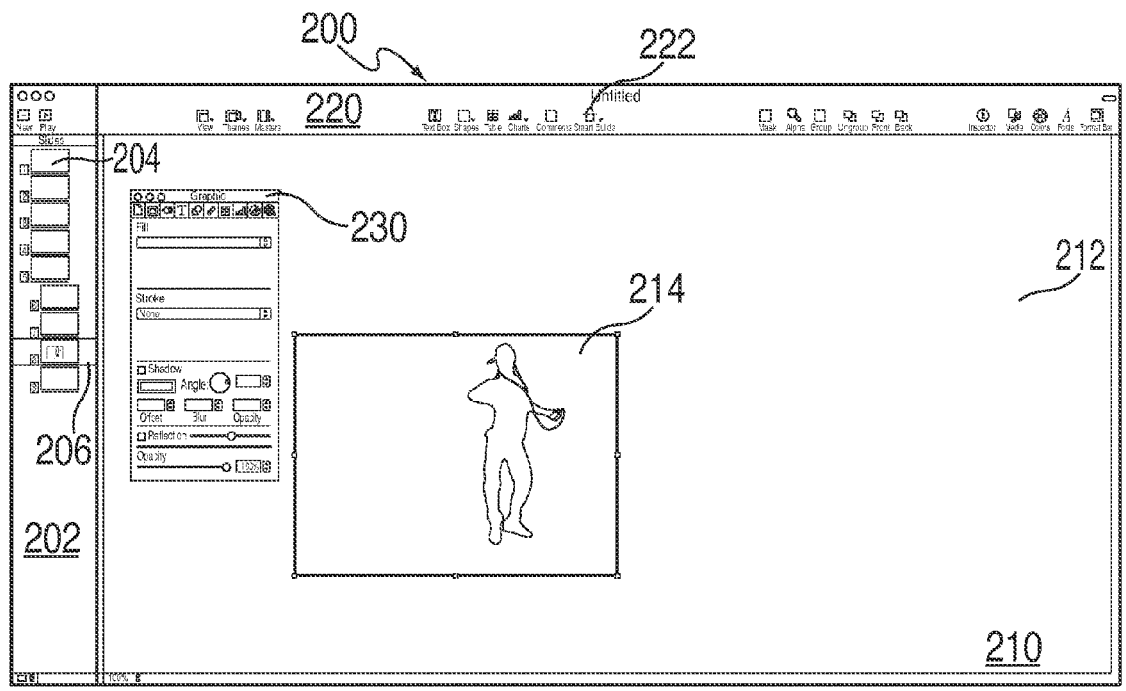
FIG. 2 shows an illustrative display screen of a presentation application for creating customizable slide shows in accordance with an embodiment of the present invention.

FIG. 2 is an illustrative display of a presentation application in accordance with one embodiment of the invention. The presentation application may be provided by a program stored in memory 110 (FIG. 1) for display on display 104. The presentation application may present display screen 200 on display 104 when the application is in edit mode, and may allow a user to, among other things, create a presentation with customizable images, videos, and text. Display screen 200 may include three panes: slide organizer 202, slide canvas 210, and toolbar 220 for creating and editing various aspects of a presentation. As described below in greater detail, by using these panes, a user may easily move between the slides of a presentation, edit and animate slides, and edit and animate objects (e.g., images, movies, text and tables) that are present in each slide. It should be understood that the size of each pane in display screen 200 is merely illustrative, and that the relative size of each pane may be adjusted by, for example, a user.

Slide organizer 202 may display a representation of each slide in a presentation. Slide organizer 202 may include representations 204 of the slides of a presentation. Representations 204 may take on a variety of forms, such as an outline of the text in the slide or a thumbnail of the slide. Slide organizer 202 may allow the user to organize the slides prepared using the application. For example, the presentation application may allow the user to manipulate the order of the slides by dragging a representation of a slide in slide organizer 202 from one relative position to another within slide organizer 202. As illustrated in FIG. 2, the bottom four of slide representations 204 may be indented to provide further organizational clarity of the presentation. These slide representations may have been indented by the presentation application in response to a user request to indent these slides, or the presentation application may have indented these slide representations automatically. In some scenarios, for example, the slide representations may be indented to visually show that the indented slides are related in content, or that the indented slides refer to sub-topics of the topic presented in the immediately preceding non-indented slide. While the bottom four slides are indented in FIG. 2, it should be understood that any combination of the slides 204 in slide organizer 202 may be indented and for any suitable reason.

In response to receiving a user selection of a slide representation 204 in slide organizer 202, the presentation application may display the associated slide in slide canvas 210. For example, highlight region 206 may be displayed in response to a user selection of that slide representation, and the slide identified by highlight region 206 may be displayed in slide canvas 210 as slide 212. To change the slide displayed in slide canvas 210, the presentation application may provide the user with the ability to move highlight region 206 up or down one slide at a time, or may allow the user to directly select a different slide in slide organizer 202 (e.g., using input interface 102, FIG. 1). For example, the presentation application may display a different slide on slide canvas 210 in response to receiving an "up" or "down" key on a computer keyboard or receiving a mouse/stylus selection directly on a different one of slide representations 204.

The current slide 212 displayed in slide canvas 210 may include any suitable object 214, including for example text, images, graphics, video, or any other suitable object. While only one object 214 is shown in FIG. 2, it should be understood that slide 212 can include any number of objects of a variety of different types, and the appearance of slide 212 may depend on the customizations performed by the user.

In some embodiments, the presentation application may allow the user to edit the different elements of slide 212 from slide canvas 210. For example, the user may edit the settings associated with slide 212 (e.g., the background) or may edit the location, properties, or animation of objects (e.g., object 214) in the slide. For example, the user may customize object 214 of slide 212, or the properties of slide 212 using various tools provided by the presentation application. The user may activate one or more of these various tools from toolbar 220 provided by the presentation application.

Toolbar 220 may include several selectable icons 222 that are each operative to activate a different tool or function. For example, toolbar 220 may include an icon operative to activate a smart build tool. The smart build tool may allow a user to group multiple objects (e.g., images, tables, videos, etc.) and create animations (e.g., turntable animation, thumb-through animation, etc.) for the group. These animations may be made to appear cinematic by utilizing acceleration and other capabilities of a 3D graphics circuitry (e.g., graphics circuitry 108 of FIG. 1). The smart build tool, as well as its features and functionalities, are described in greater detail in co-pending, commonly-assigned U.S. application Ser. No. 11/834,614, filed Aug. 6, 2007 which is hereby incorporated herein by reference in its entirety.

The presentation application may provide options window 230 as an alternate or additional interface for a user to customize slide 212 or its contents (e.g., object 214). Options window 230 may be an interactive window that can be moved and minimized/maximized by the user independently of panes 202, 210, and 220. Options window 230 can be, for example, an overlay over any of these panes (as is shown in FIG. 2) or can be displayed as an additional pane in display screen 200. Options window 230 may include one or more user input mechanisms of any suitable type, such as drop down menus, radio buttons, and sliders. The presentation application may display options window 230 using any suitable approach, for example automatically (e.g., based on the media application context) or in response to a user instruction (e.g., in response to a user instruction to display options related to a selected object).

The options available from options window 230 may vary depending on the tool selected in toolbar 220 or by the type of object 214 selected from slide 212, or both. For example, the presentation application may provide different options in window 230 based on whether a table, graphic, or text is selected. This allows options window 230 to provide suitable options for the particular type of object selected (e.g., font related options for text-based objects and pixel related options for graphics-based objects). It will be understood that although only one options window 230 is shown in FIG. 2, display 200 may include any suitable number of option windows 230.

Figure 3:
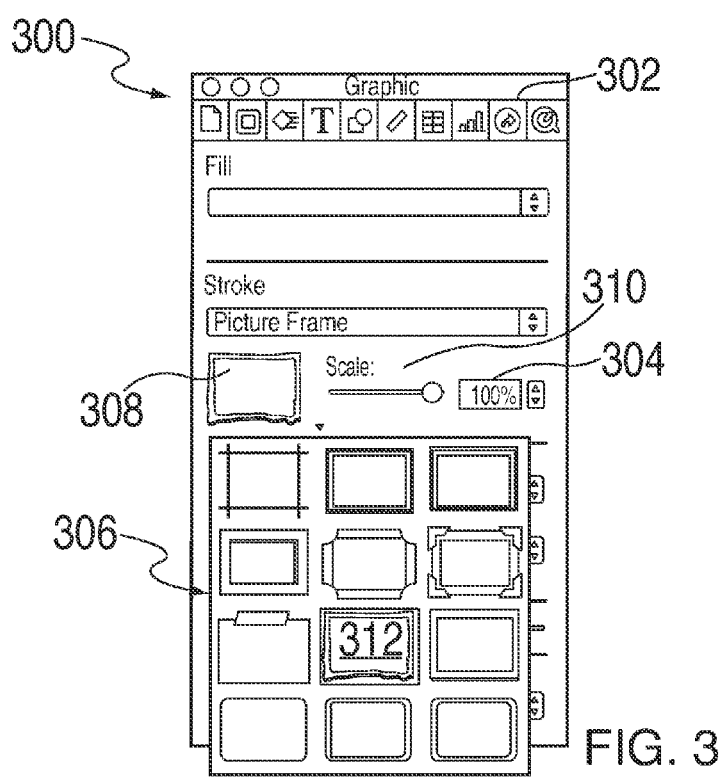
FIG. 3 shows an illustrative control window for adding a frame to an object or changing various aspects of a frame in accordance with an embodiment of the present invention.

Referring now to FIG. 3, window 300 is shown for viewing and editing the settings of a graphic in accordance with an embodiment of the present invention. In one embodiment, window 300 may be presented by display 200 (FIG. 2) as an option window 230 to allow the user to edit the properties of object 214 (FIG. 2). As shown in FIG. 3, window 300 is labeled atop as "graphic," which may be the type of window displayed by the presentation application when icon 302 of the top toolbar is selected. In some embodiments, "graphic" icon 302 may be automatically selected based on the type of object selected (e.g., a picture, a bitmap, a JPEG, etc.), and the presentation application may prevent a user from selecting another icon that would provide options not suitable for the type of the object currently selected. For example, if a graphic is selected, icon 302 corresponding to a graphic window may be automatically selected, and the presentation application may prevent from a user from selecting a font-editing icon.

When "graphic" icon 302 is selected or highlighted, window 300 may provide options related to editing and enhancing graphics. For example, the presentation application may display an option in window 300 to add a frame to a graphic. The frame can, in some embodiments, resemble a physical picture frame. A frame can be added to any suitable object, such as a video, graphic animation, or image. Although the following discussion may at times describe the use of frames with an image, it should be understood that frames can be used for any suitable object displayed on a slide, including, for example, videos. This, the particular examples presented in this disclosure are not intended to be limiting.

In response to a user selecting frame icon 308, the presentation application may display pull-down menu 306 with available frames that can be added to the image. In the example of FIG. 3, pull-down menu 306 may include representations of twelve different frames that a user may choose from. From the available frames, the user can direct the presentation application to select a frame by moving a highlight region to the desired frame or by directly selecting a frame with a user input device (e.g., user input interface 102 of FIG. 1). In response to a frame selection, the presentation application may update frame icon 308 to reflect the frame currently selected.

Figure 4:
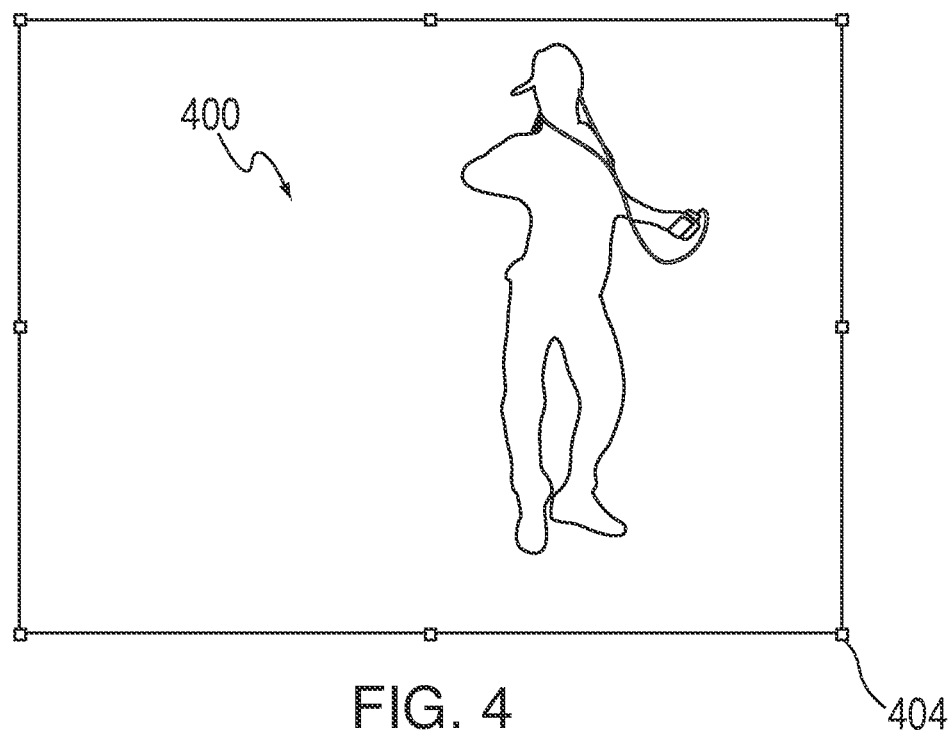
FIG. 4 shows an illustrative object without a frame in accordance with an embodiment of the present invention.
Figure 5:
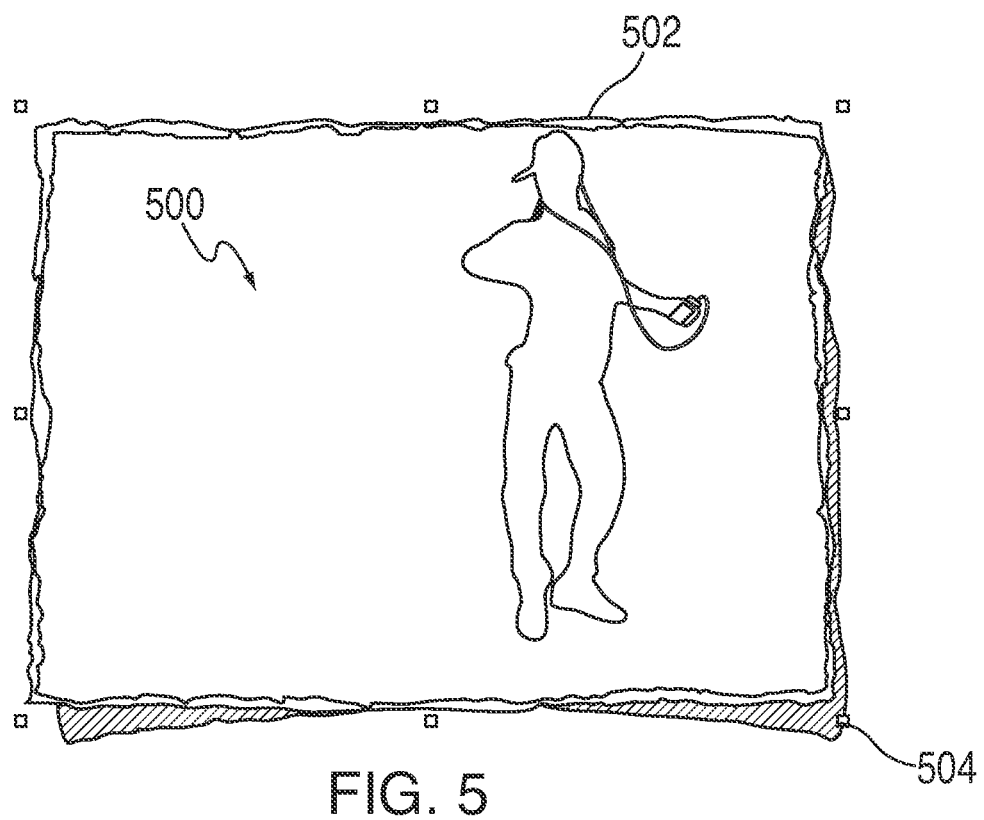
FIG. 5 shows the illustrative object of FIG. 4 with a frame in accordance with an embodiment of the present invention.

The result of selecting frame 312 in window 300 is illustrated in FIGS. 4 and 5. In particular, FIG. 4 shows an unframed image, image 400, which may be the same as object 214 of FIG. 2. FIG. 5 shows this image framed by frame 502. Frame 502 may correspond to the frame selected window 300 of FIG. 3. In some embodiment, frame 502 can have a shape with an inner and/or outer border that is not parallel to the edges of original image 400. The inner border may refer to the edge of the frame that is adjacent to a portion of the image (e.g., image 400) and the outer border may refer to the edge of the frame that is adjacent to the remaining portions of the slide (e.g., the background of the slide). Therefore, in order for only the proper areas of image 400 to be displayed within the irregular frame, portions around the edge of image 400 may be masked (e.g., hidden from the user) to produce image 500, where these portions may vary at different locations around the edge of the image. Frame 502 can vary, for example, in thickness at different locations of the frame, and can include texturing and other effects. The texturing and other effects may be achieved using alpha channel blending, or using any other suitable approach for providing a visually pleasing frame.

Some of the properties of images 400 and 500 can be edited directly from a slide canvas (e.g., slide canvas 204 of FIG. 2). For example, the presentation application may provide a user with the ability to edit the size of images 400 and 500 by moving any of the eight edge indicators 404 and 504, respectively, or the presentation application may allow a user to change the location of these images on a slide. In some embodiments, the overall appearance and properties of frame 502 itself may not appear to change when a user edits the image it frames. For example, the thickness and shape of frame 502 may remain substantially constant as the image size is adjusted. To maintain a substantially constant thickness and shape, the presentation application can automatically lengthen or shorten the edges of frame 502 as the user changes the size of the image. This may be advantageous, as a user may want to change aspects of the image, but not the frame for that image.

In some embodiments, the frame for the image may be edited independently of the image. For example, the properties (e.g., thickness, type) of frame 502 may be changed by a user or automatically without changing the properties of the image frame 502 frames. Referring back to FIG. 3, the presentation application may allow the user to edit the properties of a frame (e.g., frame 502 of FIG. 5) from the options within window 300. For example, as described above, a different frame can be chosen using drop-down menu 306 to completely change the properties of a frame. That is, each frame representation in drop-down menu 306 can be associated with a set of default properties, and in response to a user selecting an icon in drop-down menu 306, the presentation application may overwrite the properties of a current frame (if one is present) with the default properties of the selected frame.

In some embodiments, properties of the currently selected frame (e.g., the frame shown in icon 308) may be changed using input mechanisms or options in window 300 other than selecting a frame from drop-down menu 306. The other options provided in window 300 may allow a user to change one or more properties of the frame without changing the remaining the properties. For example, the presentation application may provide slider 310 and text box 304 in window 300 for changing just the size (e.g., thickness) of the frame. The presentation application may change the size of the frame in response to a user either moving the cursor in slider 310 or editing the frame ratio in text box 304. As one of these input mechanism is edited, the other mechanism may be automatically adjusted to reflect the edit. In some embodiments, the value of slider 310 and text box 304 can indicate the size of the frame relative to the maximum possible size of the frame. The user may change any other suitable aspect of the frame, including, for example, the color of a frame, the texture pattern of a frame, the degree of texture of a frame, etc.

Figure 6:
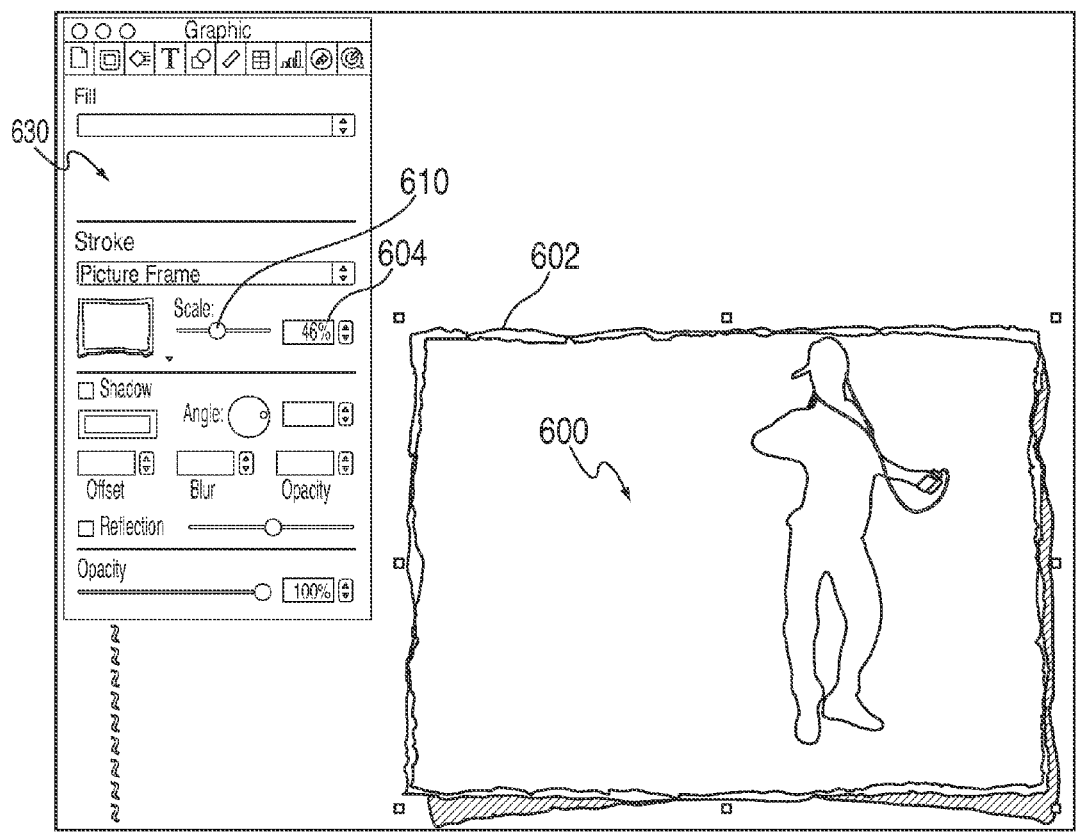
FIG. 6 shows the image of FIG. 5 with a thinner frame in accordance with an embodiment of the present invention.

In FIG. 3, slider 310 and text box 304 may be illustrated in their maximum-value position (e.g., rightmost position and "100%", respectively). At these positions, the corresponding frame may have the size of frame 502 in FIG. 5. Referring now to FIG. 6, the result of changing the values of slider 310 and textbox 604 of window 630 may be illustrated. In this figure, slider 610 and textbox 604 may be adjusted to 46% of the maximum frame size. The size (e.g., thickness) of frame 602 may therefore substantially equal to 46% of the size (e.g., thickness) of frame 502 in FIG. 5.

Figure 7:
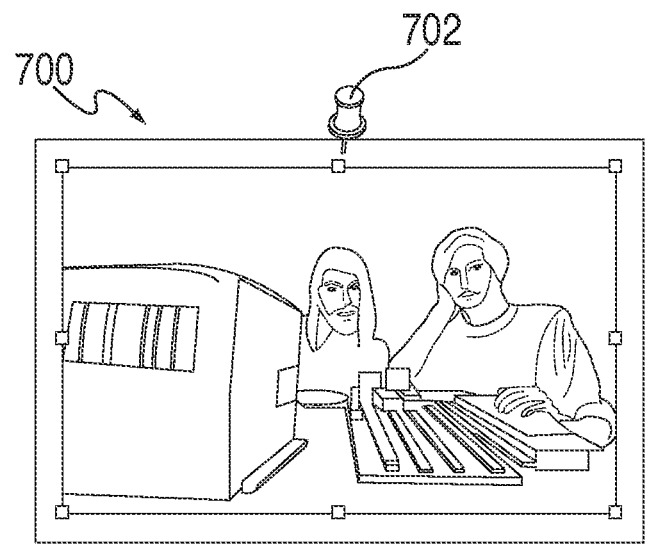
FIGS. 7 and 8 show adornments for objects in accordance with an embodiment of the present invention.
Figure 8:
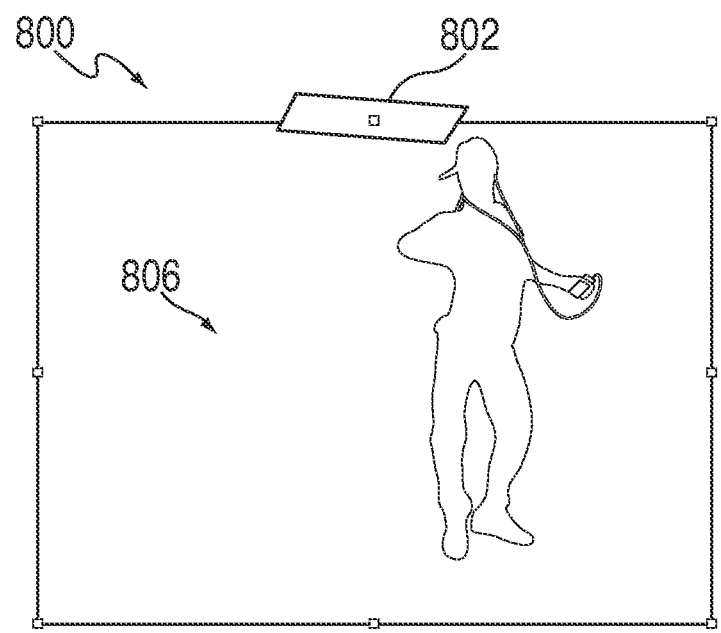

In some embodiments, some of the options in drop-down menu 306 (FIG. 3) can include one or more adornments for the image. The adornment can be displayed with an image in addition to or instead of a frame. FIGS. 7 and 8 illustrate two possible adornments. Object 700 of FIG. 7 may include adornment 702 in the shape of a thumbtack, and may include a rectangular frame. Object 800 of FIG. 8 may include adornment 802 in the shape of a piece of masking tape, and may not include a frame for the image. Adornment 802 may overlap a portion of image 806. Therefore, the presentation application can display object 800 by masking part of image 806 and drawing adornment 802 over the masked area. It should be understood that the adornments of FIGS. 7 and 8 are merely illustrative, and other adornments can be contemplated.

The presentation application can adjust the placement of an adornment as the size or other properties of the image changes. For example, the adornment may not change size when the image is scaled, and can remain in the same relative horizontal position of the image (e.g., in the center of the image). Vertically, the adornment may be located at a fixed position on the image (e.g., a predetermined number of pixels from the top of the image). In some embodiments, the size or other properties of the adornment can be edited in a separate window (e.g., using window 300), and can be edited independently of the frame (if applicable) or along with the frame. In other embodiments, the presentation application may not allow a user to edit the adornment.

Figure 9:
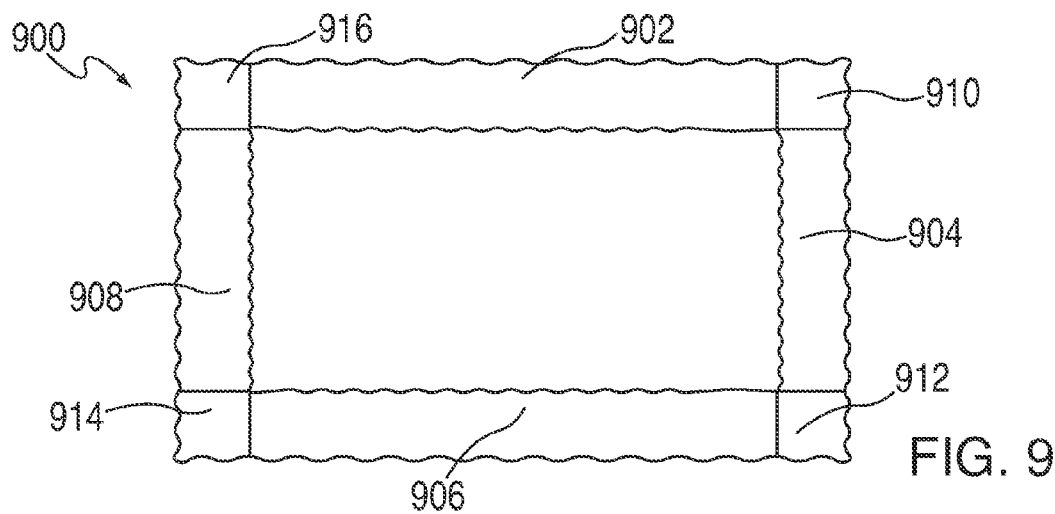
FIGS. 9 to 11 show illustrative schematic displays of frames in accordance with various embodiments of the present invention.

Referring now to FIG. 9, an illustrative schematic display of frame 900 is shown in accordance with one embodiment of the present invention. Frame 900 may include any of the features of the frames described above in connection with the frames of FIGS. 5-9. Frame 900 can be made up of eight graphics, including top graphic 902, right graphic 904, bottom graphic 906, left graphic 908, top-right graphic 910, bottom-right graphic 912, bottom-left graphic 914, and top-left graphic 916. In some embodiments, top graphic 902 may be from the same image file as bottom graphic 906 or from a flipped version of bottom graphic 906. Similarly, right graphic 904 may be obtained from the same image file as left graphic 908 or from a flipped version of the same image file, and the corner graphics may or may not be from the same image files.

As described in detail above, the presentation application can automatically lengthen or shorten a frame as necessary when the size of the image it frames is adjusted. When the size of the image is adjusted, the sizes of top graphic 902, right graphic 904, bottom graphic 906, and left graphic 908 may be stretched or narrowed accordingly. For example, if the length of the image is doubled, top and bottom graphics 902 and 906 may each be stretched to approximately twice its previous length to accommodate the longer image. Corner graphics 910, 912, 914, and 916 may remain the same or may be stretched/narrowed as well.

Figure 10:
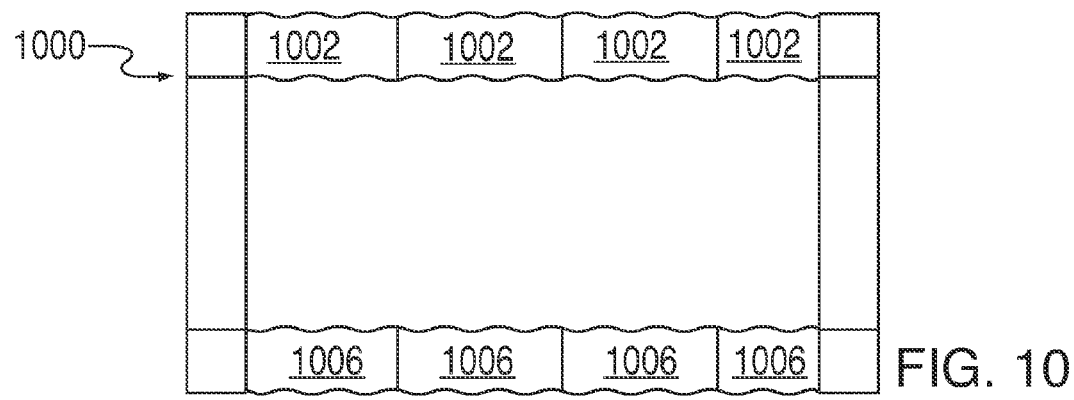
Figure 11:
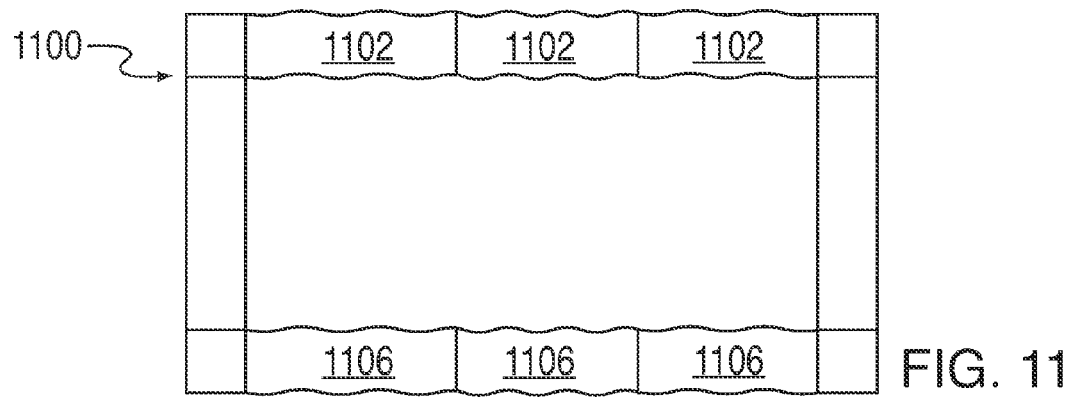

In some embodiments, instead of stretching the various graphics of frame 900, the length or width of the graphics may be fixed (e.g., to the true length/width of the graphics), and a graphic can be repeated multiple times and truncated (if necessary) when the size of the image it frames changes. For example, if the length of the image is doubled, the number of graphic copies used to frame a side of the image may be doubled. This feature may be illustrated in the schematic display of frame 1000 in FIG. 10, where the top and bottom of frame 1000 may be shown to include multiple graphics 1002 and 1006, respectively. One of each graphic 1002 and 1006 may be truncated to conform frame 1000 to the size of the image it frames. The presentation application may truncate one of the graphics when the length of a side of the image is not a multiple of the length of a graphic for that side. In other embodiments of the present invention, one or more of the graphics that make up a frame can be stretched/narrowed in addition to repeated/truncated when the size of the image it frames is changed. This feature may be shown in FIG. 11, where at least one of top graphics 1102 and bottom graphics 1106 are stretched to some degree to fit the size of the image. Although FIGS. 10 and 11 illustrate graphic repetition for only the top and bottom portions of a frame, it should be understood that these techniques may be applied to the sides as well.

Referring briefly back to pull-down menu 306 of FIG. 3, each of the 12 selectable frames can be associated with metadata. The metadata may define the properties (e.g., color, thickness, texture) associated with each frame in pull-down menu 306. The metadata can be stored in a file (e.g., an XML file in storage device 112 of FIG. 1) that is read by the presentation application at startup, for example. The presentation application can use the metadata to determine, among other things, initial and current settings of a frame. An example of metadata that can be associated with a frame is illustrated in list 1200 of FIG. 12, which is organized in "key-value" form. The presentation application can populate a list, such as list 1200, for each frame in pull-down menu 306 to define a set of characteristics for each frame that is made available to a user. For example, each frame provided by the presentation application may be defined by setting the values of a particular set of keys.

List 1200 can include any suitable number of keys of various types. List 1200 can include graphics keys 1202 that associate particular image files with the graphics of the frame (e.g., top graphic 902 of FIG. 9). For example, list 1200 may associate the bottom graphic of a frame with a file saved as "baby_bottom.png." List 1200 may include Stretch Tiles key 1204 for determining whether to stretch, repeat, or stretch and repeat frame graphics when the size of the image being framed is adjusted.

Figures 12, 13:
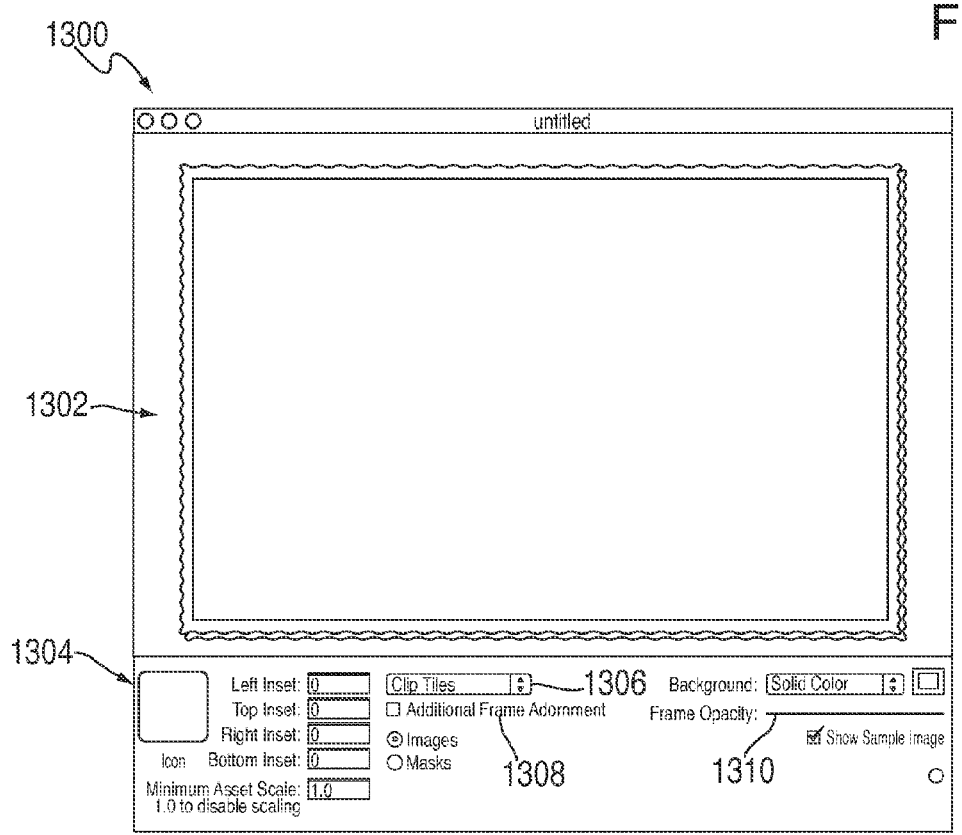
FIG. 12 shows illustrative metadata associated with a frame in accordance with an embodiment of the present invention.
FIG. 13 shows an illustrative interface for setting the properties of a frame in accordance with an embodiment of the present invention.

The presentation application can provide a user interface for adjusting the values of metadata list 120. FIG. 13 shows illustrative user interface 1300 that can be provided by the presentation application for setting or changing metadata values. In some embodiments, this interface may be available to only designers of the frames. In other embodiments, the presentation application may also allow general users access to an interface that is the same or similar to user interface 1300. User interface 1300 can include two panes: input pane 1304 for displaying the current metadata values and receiving updates to the metadata values, and view pane 1302 for displaying a preview of the frame that would result from the initial or updated metadata values displayed in input pane 1304. Thus, as the values in input pane 1304 are adjusted, the changes may be reflected in view pane 1302.

In some embodiments, input pane 1304 may allow a frame designer or a user of the presentation application to edit the metadata values shown in FIG. 12, and can include a variety of different types of input mechanisms (e.g., radio buttons, text input boxes, pull-down menus, etc.) for this purpose. For example, input pane 1304 can include pull-down menu 1306 that allows a frame designer or user to determine whether frame graphics should be stretched (as in FIG. 9) or clipped (as in FIG. 10). To allow a designer or user to add adornments (e.g., adornments 702 or 802 of FIGS. 7 and 8), input pane 1304 can include checkbox 1308. In response to receiving a user selection of checkbox 1308, the presentation application may allow the designer or user to add a frame adornment to the current frame. A designer or user may adjust the opacity of the frame using slider 1310 of input pane 1304. That is, when a user adjusts frame opacity slider 1310, the presentation application may adjust the opacity of the frame from fully transparent to fully opaque depending on the relative position of the cursor in slider 1310.

The presentation application may allow the designer or user to save the values selected in user interface 1300. When a user selects to save the values, the values entered into input pane 1304 may be reflected in the values of list 1200. For example, if a designer or user changes the value of pull-down menu 1306 to either enable or disable clipping of frame graphics, the value of Stretch Tiles key 1204 may be updated to reflect this change. Thus, when a user selects the frame in the presentation application, the updated values may be provided as the default properties for the frame.

Figure 14:
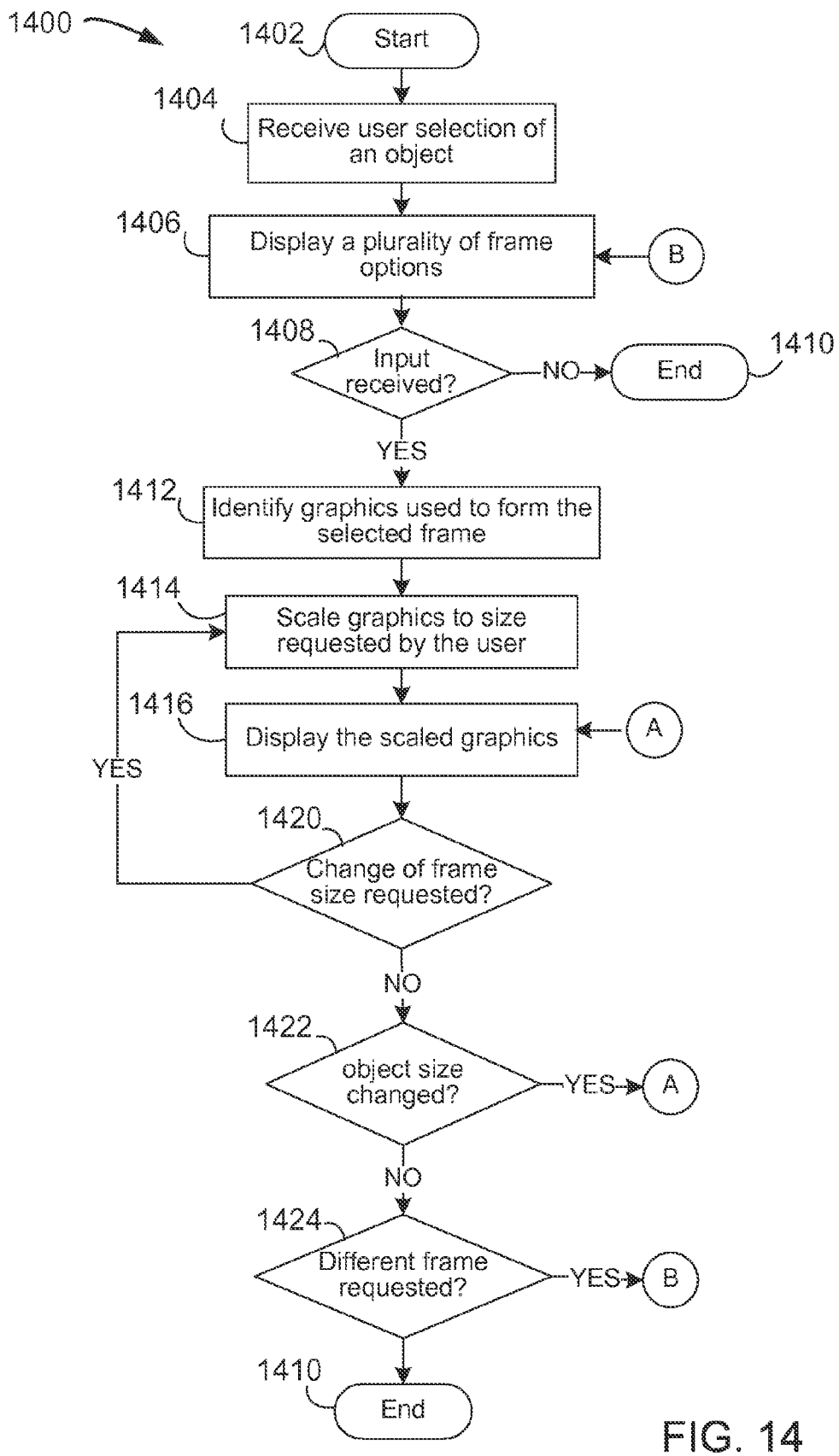
FIGS. 14 and 15 show flow diagrams of illustrative processes for framing an object based on a user selected frame in accordance with various embodiments of the present invention.

Referring now to FIG. 14, illustrative flow diagram of process 1400 is shown for providing a user with the ability to select a frame from a plurality of different possible frames using an application (e.g., Keynote, iWeb, etc.) running on user equipment (e.g., a laptop computer, desktop computer, etc.), and displaying the frame to a user. The frame can be used to enclose or border at least a portion of an object (e.g., object 214 of FIG. 2), such as a video, graphic, graphic animation, or picture. Process 1400 may begin at step 1402. At step 1404, the presentation application may receive a selection of an object. For example, the presentation application may receive a user selection of the object from a slide canvas (e.g., slide canvas 212 of FIG. 2), or the presentation application may automatically select an object. At step 1406, the presentation application may display several frame options that can be used to frame the selected object at step 1404. In some embodiments, the frame options may be displayed as selectable icons in a pull-down menu of a window of the application (e.g., window 300 of FIG. 3), and can be displayed in response to a user request or an automatically generated request. At step 1408, the presentation application may determine whether an input selecting a frame option has been received. For example, the presentation application may determine whether the user has selected a frame object using input interface 102 (FIG. 1). If, at step 1408, the presentation application determines that no input selecting a frame object has been received, process 1400 may move to step 1410 and end.

If, at step 1408, the presentation application instead determines that an input selecting a frame object has been received, process 1400 may move to step 1412. At step 1412, the presentation application may identify the graphics used to form the frame selected by the input received at step 1408. For example, the presentation application may identify the eight graphics associated with the selected frame (e.g., one for each side and one for each corner). In some embodiments, the presentation application may identify the graphics using metadata associated with the selected frame. At step 1414, the graphics associated with the frame may be scaled to a size in response to a user request. For example, in FIG. 6, each of the graphics of frame 602 may be scaled to 46% of its maximum size. Alternatively, the presentation application may scale the graphics each to a suitable default associated with the selected frame (e.g., based on metadata for that frame).

At step 1416, the presentation application may frame the selected object by displaying the scaled graphics around at least a portion the selected object. That is, the presentation application may frame the object that was selected at step 1404. At step 1420, the presentation application may determine whether a request to change the size of the frame has been received. For example, the presentation application may determine whether a user has moved slider 310 (FIG. 3) or text input field 304 (FIG. 3). If, at step 1420, the presentation application determines that a request to change the size of the frame has been received, process 1400 may return to step 1414 and may rescale the graphics based on the new frame size requested by the user.

If, at step 1420, the presentation application instead determines that a request to change the frame size has not been received, process 1400 may move to step 1422. At step 1422, the presentation object may determine whether the size of the selected object has changed. For example, the presentation application can determine whether the user has increased or decreased the size of the object by dragging an edge indicator of the object (e.g., edge indicator 504 of FIG. 5). If the presentation application determines that the size of the selected object has changed, process 1400 may move to step 1416 and the presentation application can reframe the object based on its current size. The frame may maintain the scale selected at step 1414. In some embodiments, the presentation application may render the displayed graphics at a lower resolution or at a higher resolution based on the new size of the object (e.g., the difference between a high resolution frame and a low resolution frame may not be noticeable for small objects). If, from step 1422, the presentation application instead determines that the size of the selected object has not changed, process 1400 may move to step 1424.

At step 1424, the presentation application may determine whether a different frame has been requested. For example, the presentation application may determine whether the user has accessed a new frame from drop down menu 306 (FIG. 3). If the presentation application determines that a new frame has been requested, process 1400 may return to step 1406 and the presentation application can display frame options. If, at step 1424, the presentation application instead determines that a new frame has not been requested, process 1400 may move to step 1410 and end.

It should be understood that FIG. 14 is merely illustrative. Any of the steps of process 1400 may be omitted, modified, combined, and/or rearranged, and any additional steps may be performed without departing from the scope of the invention.

Figure 15:
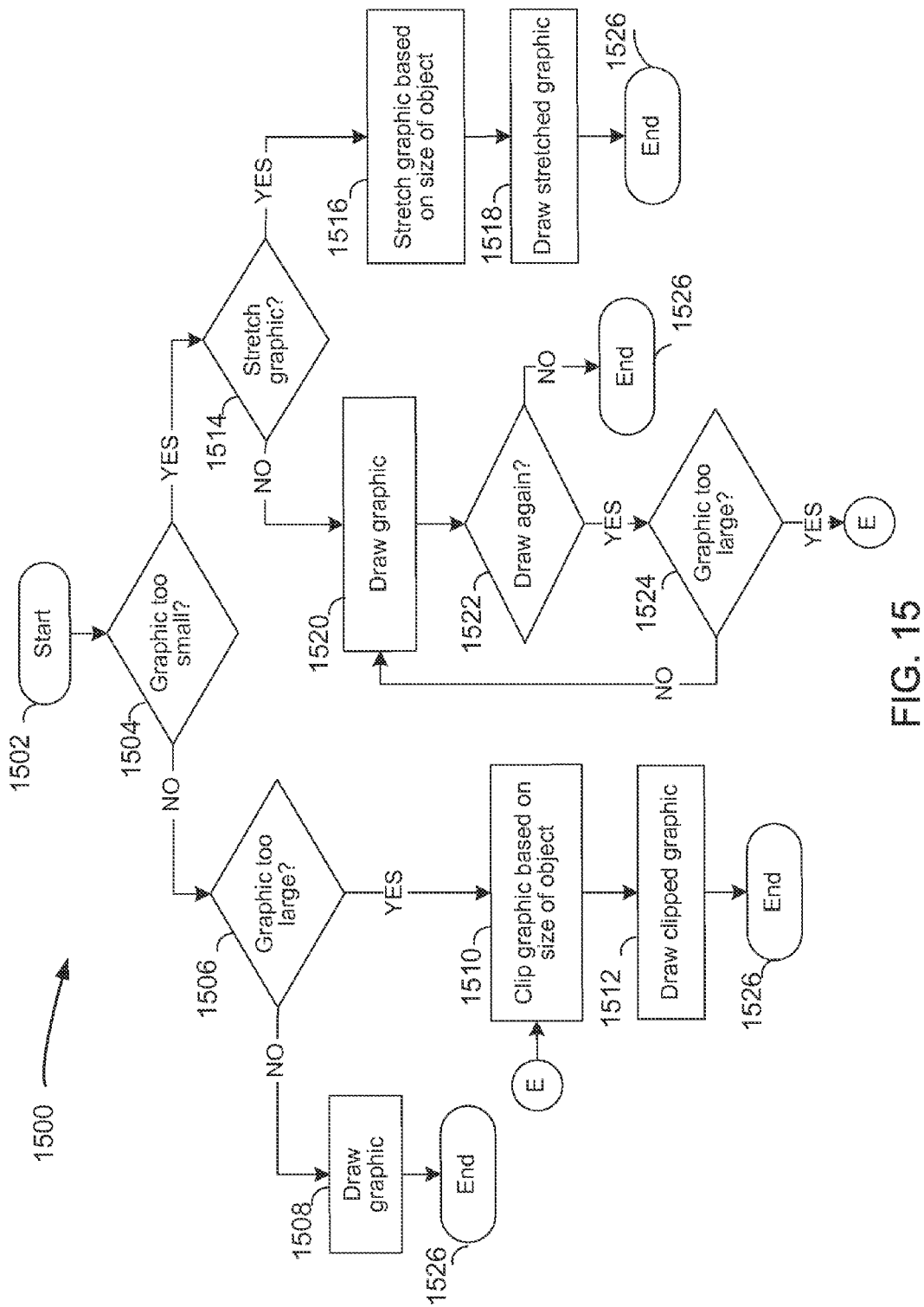

Referring now to FIG. 15, illustrative flow diagram of process 1500 is shown for drawing one of the edges of a frame (e.g., the top, bottom, or side of the frame) for an object. The object that is being framed may be, for example, a video, graphic, graphic animation, picture, chart, or text, and the steps of process 1500 can be performed by a presentation application (e.g., Keynote, etc.) running on user equipment (e.g., a laptop, desktop, etc.). Process 1500 may be a more detailed view of part of step 1416 of FIG. 14, and can be executed multiple times for each edge of the object (e.g., once each for the top, bottom, and two sides). The edge of the object may refer to the actual boundary of the object, or may refer to the edge of a portion of the object that the frame is intended to frame.

Process 1500 may begin at step 1502. At step 1504, the presentation application may determine whether the graphic associated with the edge of the object is too small. For example, the presentation application may determine whether the length of the graphic is greater than the length of the object the frame is intended to border.

If, at step 1504, the presentation application determines that the graphic for the edge is not too small, process 1500 may move to step 1506. At step 1506, the presentation application may determine whether the graphic is too large. The presentation application may determine that the graphic is too large if, for example, the length of the graphic is greater than the length of the object that the frame is intended to border. If, at step 1506, the presentation application determines that the graphic is not too large, process 1500 may move to step 1508. In this scenario, the graphic may be substantially the same length as the length of the edge of the object. Thus, at step 1508, the presentation application may draw (e.g., generate and display) the graphic for the edge. Process 1500 may then end at step 1526.

Returning to step 1506, if the presentation application instead determines that the graphic is too large, process 1500 may move to step 1510. At step 1510, the presentation application may clip the graphic based on the size of the (e.g., length) of the object. For example, the presentation application may shorten the graphic such that the length of the shortened graphic is substantially the same as the length of the edge (e.g., side, top, or bottom) of the object. At step 1512, the presentation application may be drawn to border that edge of the object. Process 1500 may then end at step 1526.

Returning to step 1504, if the presentation application instead determines that the graphic is too small (e.g., the length of the graphic is smaller than the length of the object edge), process 1500 may move to step 1514. At step 1514, the presentation application may determine whether to stretch the graphic. This determination can be based on metadata associated with the frame, such as the metadata of FIG. 12. If, at step 1514, the presentation application determines that the graphic should be stretched, process 1500 may move to step 1516. At step 1516, the presentation application may stretch the graphic accordingly (e.g., based on the size of the object). For example, the presentation application may stretch the graphic to the length of the edge. At step 1518, the presentation application may draw the stretched graphic at the edge of the object, and then process 1500 may end at step 1526.

If, at step 1514, the presentation application instead determines that the graphic should not be stretched, process 1500 may move to step 1520. At step 1520, the presentation application may draw the graphic without stretching it. The length of the graphic may be too small to frame the entire edge of the object. Thus, at step 1522, the presentation application may determine whether to draw the graphic again. In some embodiments, this determination may involve determining whether the number of graphics drawn up to that point span the edge of the object. If the presentation application determines that the graphic should not be drawn again, process 1500 may move to step 1526 and end.

Returning to step 1522, if the presentation application instead determines that the graphic should be drawn again, process 1500 may move to step 1524. At step 1524, the presentation application may determine whether the graphic is too large. The graphic may be too large if, for example, drawing the complete graphic again would result in a frame edge that is too long. If the presentation application determines that the graphic is too large, process 1500 may move to step 1510, which is described above.

Returning to step 1524, if the presentation application instead determines that the graphic is not too large, process 1500 may return to step 1520 and may draw the graphic again.

One skilled in the art would understand that FIG. 15 is merely illustrative. Any of the steps of process 1500 may be omitted, modified, combined, and/or rearranged, and any additional steps may be performed without departing from the scope of the invention. For example, in some embodiments, process 1500 may be modified to include the option of narrowing a graphic in addition to or instead of clipping a graphic.

Figure 16:
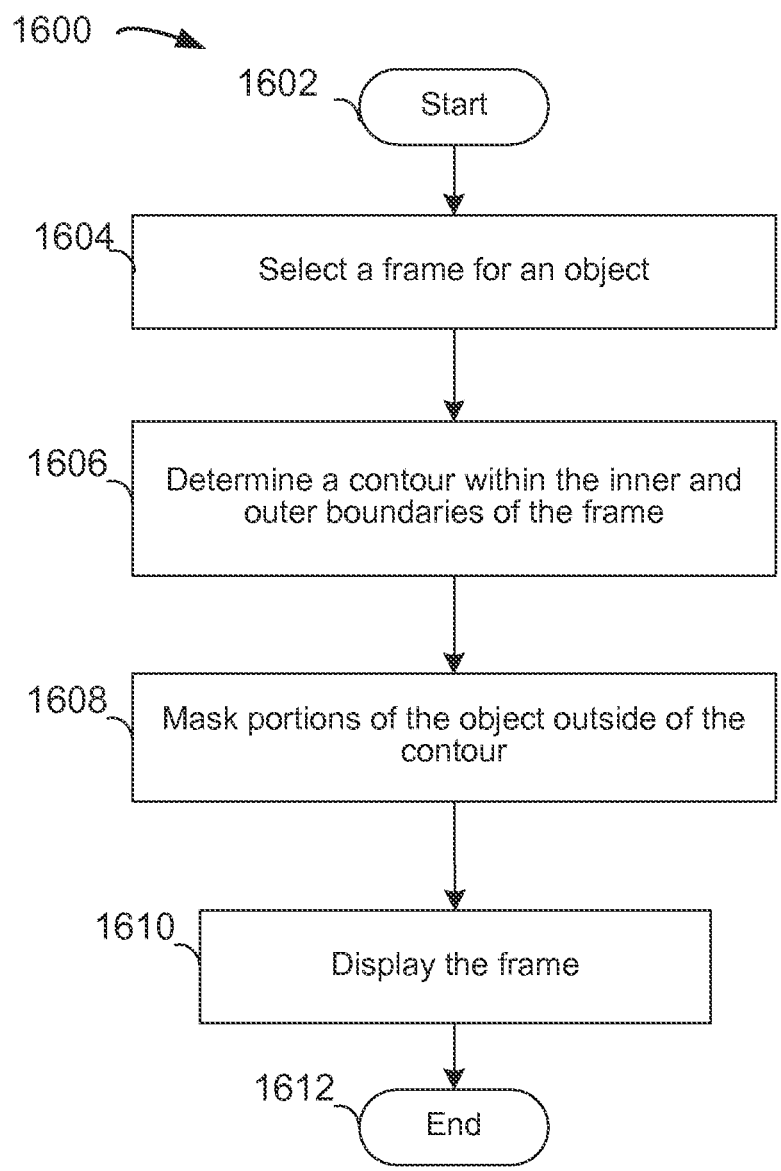
FIG. 16 shows a flow diagram of an illustrative process for providing a frame for an object in accordance with an embodiment of the present invention.

FIG. 16 is a flow diagram of illustrative process 1600 for masking an object when a frame is added. A presentation application executing the steps of process 1600 may be able to display frames that have irregular borders (e.g., not straight, curvy boundary). For example, process 1600 may allow the presentation application to display the irregularly shaped frame illustrated in FIG. 5, where the object is visible within the irregularly contoured inner boundary of the frame, but not visible outside the irregularly contoured outer boundary.

Process 1600 may begin at step 1602. At step 1604, the presentation application may select a frame for framing a displayed object. In some embodiments, the frame can have any of the features of the frames shown in pull-down menu 306 of FIG. 3, and may be selected by a user. At step 1606, the presentation application may determine a contour for the object that lies within the inner and outer boundaries of the frame. This information may be determined, for example, from metadata associated with the selected frame. For the illustrative frame of FIG. 5, the contour determined at step 1604 may be the irregular contour of either of these boundaries, or may be an irregular contour that lies between these boundaries.

At step 1608, the presentation application may mask portions of the object outside of the contour determined at step 1606. Masking the object may involve hiding the portions of the object without deleting information about the object. Instead, the presentation application may draw the information "underneath" the object, such as the background of a slide in a slide show presentation. At step 1610, the presentation application may display the frame for the object. Displaying the frame at step 1610 may effectively cover up any portions of the displayed object outside of the inner boundary of the frame that were not masked at step 1608. Because of the masking at step 1606 and the displaying at step 1610, no portions of the image may be displayed outside of the frame. Process 1600 may then end at step 1612.

One skilled in the art would understand that FIG. 16 is merely illustrative. Any of the steps of process 1600 may be omitted, modified, combined, and/or rearranged, and any additional steps may be performed without departing from the scope of the invention.

Figure 17:
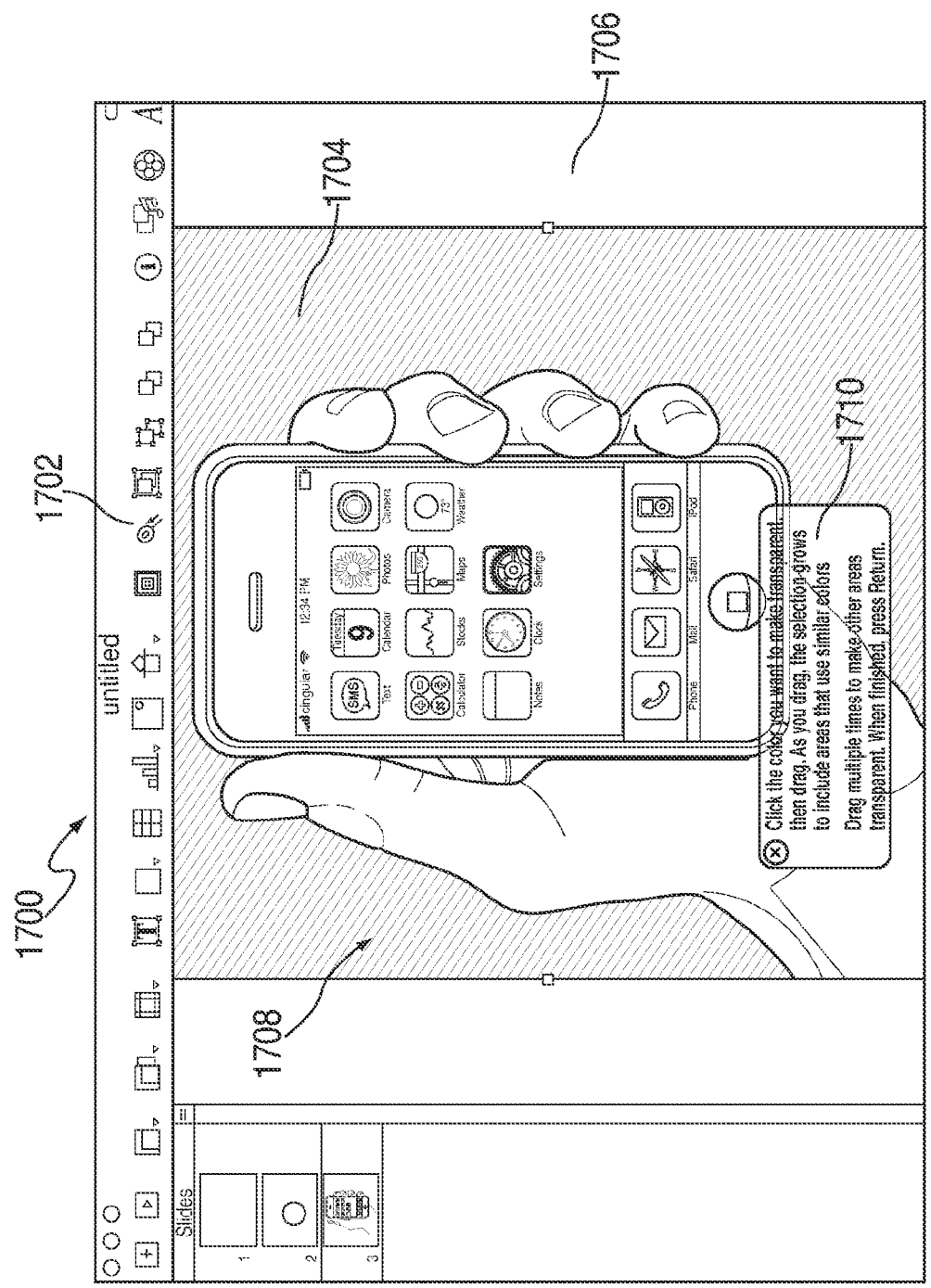
FIG. 17 shows an illustrative display screen for activating a background removal tool in accordance with an embodiment of the present invention.

In some embodiments of the present invention, the presentation application (e.g., the presentation application that can provide display screen 200 of FIG. 2) may have the capability to remove the background of an object. Referring now to FIG. 17, illustrative display screen 1700 showing slide 1708 may be provided by the application. Slide 1708 can include image 1704 on a slide with background 1706. The background color of image 1704 may be different than the color of background 1706. Thus, to remove the contrast between the different background colors, a user may want to change the background color of image 1704 to the color of background 1706.

To remove the background of an image, the presentation application may provide a background removal tool. Although the tool may be referred to as a background removal tool, removing backgrounds is merely one use for the tool. It should be understood that any other portion of the image, such as portions in the foreground of the object, can be removed using this tool. Also, while the tool may have the effect of removing the background, the removal may be accomplished by masking the background from view, rather than by changing the image itself (e.g., the .PNG file). Although the following discussion may at times describe the background removal tool for removing portions of an image, it should be understood that the removal feature can be used for any suitable object displayed on a slide, including, for example, videos. This, the particular examples presented in this disclosure are not intended to be limiting.

With continuing reference to FIG. 17, display 1700 may be similar to display 200 of FIG. 2, and may include a toolbar for selecting from a plurality of different tools. The presentation application may provide icon 1702 for activating the background removal tool. Icon 1702 may be available for selection whenever an object is highlight that is capable of having its background removed. The object may be, for example, an image or graphic. In some embodiments, when the presentation application receives a selection of icon 1702, the presentation application may provide informational window 1710 overlaid on a portion of slide 1708 to provide information on how to operate the background removal tool. Window 1710 may continue to be displayed until removed by a user, and once removed, may be displayed again the next time icon 1702 is selected, or may not be displayed until the presentation application is reloaded.

Figure 18:
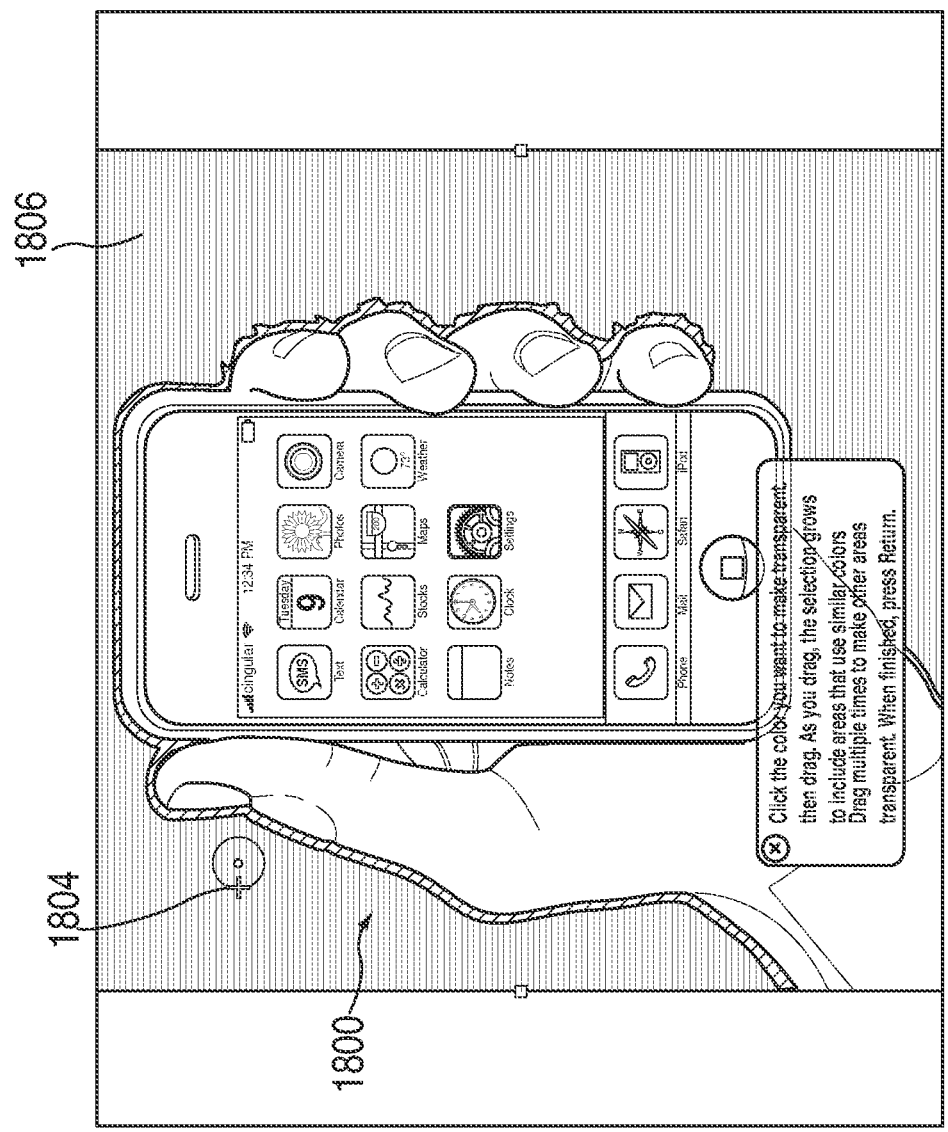
FIG. 18 shows a display screen illustrating the operation of the background removal tool in accordance with an embodiment of the present invention.

FIG. 18 shows a display screen that may be presented by a presentation application when the background removal tool is used. When the tool is activated, a user may define an initial point in the background of an object by selecting a location on the object. The point may be selected by moving a pointer to the location on the displayed object using, for example, a computer mouse. The presentation application may display a mark at the initial point to help the user keep track of its location.

The presentation application may display region 1806, which may be a region with the same or a similar color as that of the initial point. Region 1806 may include the initial point, and may be a contiguous region. Thus, region 1806 may not include areas of the object that are the same color as the background color of the image but would not be considered part of the background. That is, because region 1806 may be contiguous, region 1806 may not include areas of object 1800 that are similar to the background color, but are separated from the initial point by an area of dissimilar color. Region 1806 may be displayed as a single color (e.g., purple), or can be multi-colored. In some embodiments, region 1806 may be semi-transparent such that the user can still view the part of object 1800 behind region 1806.

Figure 19:
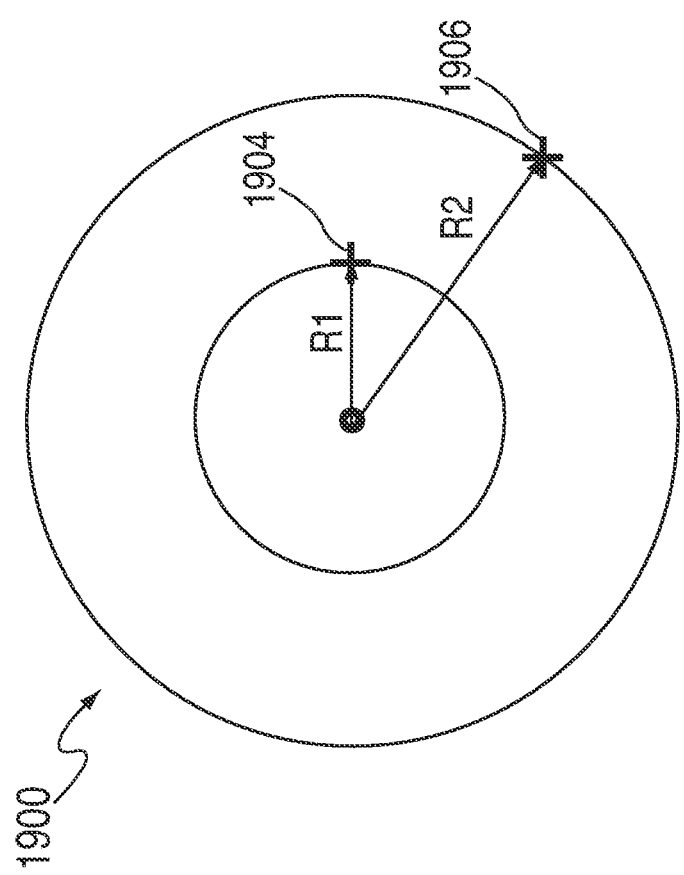
FIG. 19 shows a representation of the user interface provided when the background removal tool is activated in accordance with an embodiment of the present invention.

The presentation application may update the size and shape of region 1806 using the location of a pointer relative to the location of the initial point. In FIG. 18, the presentation application may provide region 1806 based on the relative location of pointer 1804. As the user moves pointer 1804, the presentation application may automatically change the size and shape of region 1806. To provide a visual indication of the distance between the current position of a pointer and the initial point, the presentation application may display a circle having a center at the initial point that is drawn through pointer 1804. For example, FIG. 19 illustrates pointers 1904 and 1906 that may be displayed by the presentation application at different times upon user movement of an input device (e.g., a computer mouse or stylus). Pointer 1906 may correspond to a displayed circle of radius R2 that is greater than radius R1, e.g., the radius of the circle displayed by the presentation application for pointer 1904.

Returning to FIG. 18, the presentation application may compute a color tolerance for the background color using the radius of a displayed circle. The color tolerance of the background color may be a measure of how similar a color would need to be to that of the initial point for the color to also be considered a background color. For example, if the color tolerance is low, only colors very similar to the color of the initial point may be considered a background color. The presentation application can increase the color tolerance when the user directs pointer 1804 away from the initial point and can decrease the color tolerance when the user directs pointer 1804 towards the initial point. Using the example of FIG. 19, the presentation application may compute a greater color tolerance for pointer 1906 than for pointer 1904. If the color tolerance is increased when the circle is expanded, more pixels in the object may have colors similar enough to the initial point to be considered a background color.

Figure 20:
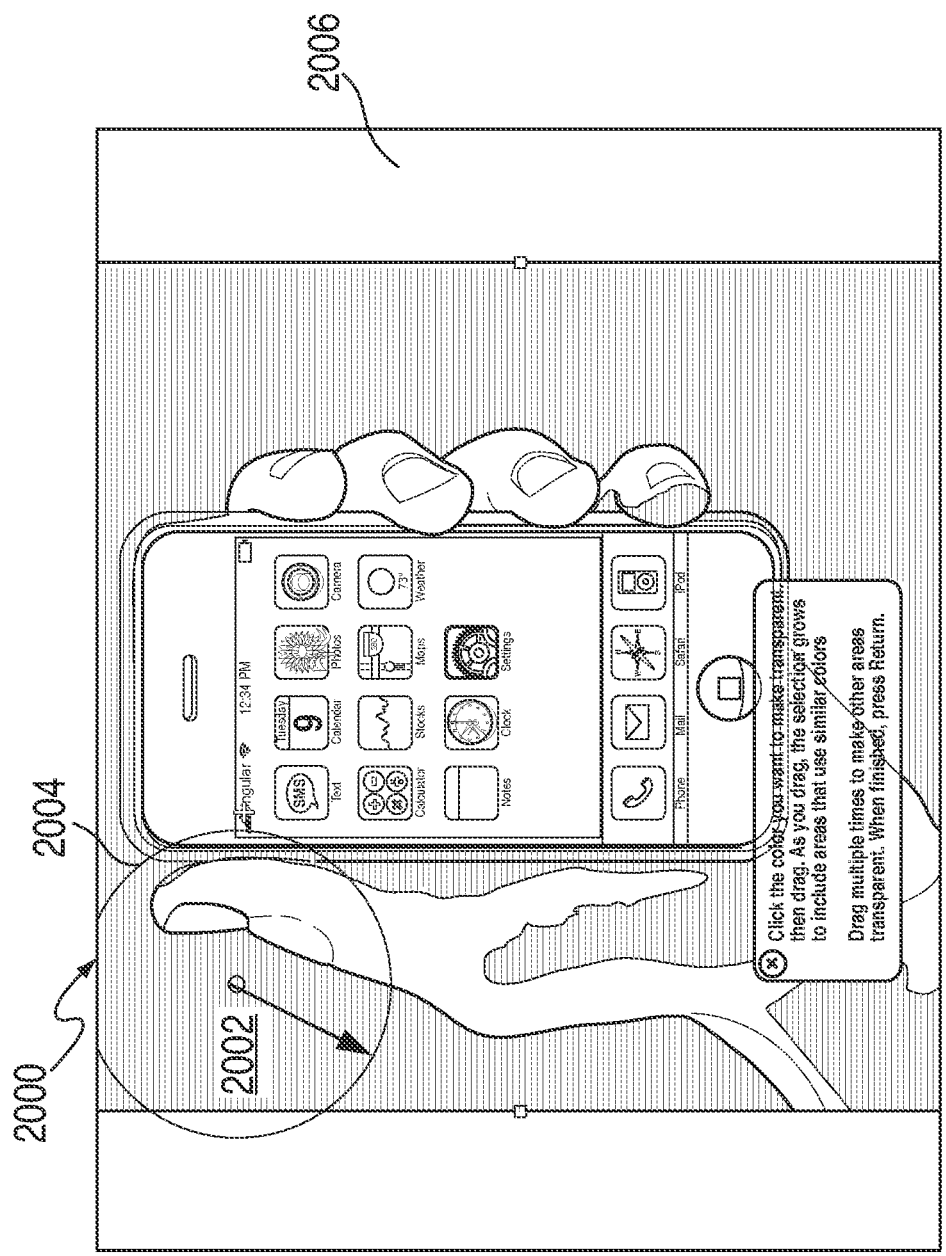
FIG. 20 shows an illustrative display screen demonstrating the effect of increasing the color tolerance of the background removal tool in accordance with an embodiment of the present invention.

Region 1806 may define the region that the presentation application removes if a removal confirmation is received from the user. Thus, a user can direct pointer 1804 away from or toward the initial point until the resulting displayed region corresponds to a region the user wants to remove. For example, region 1806 may not fully remove the background of object 1800, so the user may want to move pointer 1804 further from the initial point. FIG. 20 illustrates the opposite scenario, where pointer 2004, located a distance 2002 from the initial point, may cause the majority of object 2000 to be removed, including parts that the user may consider to be part of the foreground. This may occur when the color tolerance is higher than appropriate for the particular object, allowing colors significantly different from the color of the initial point to be considered background colors.

Figure 21:
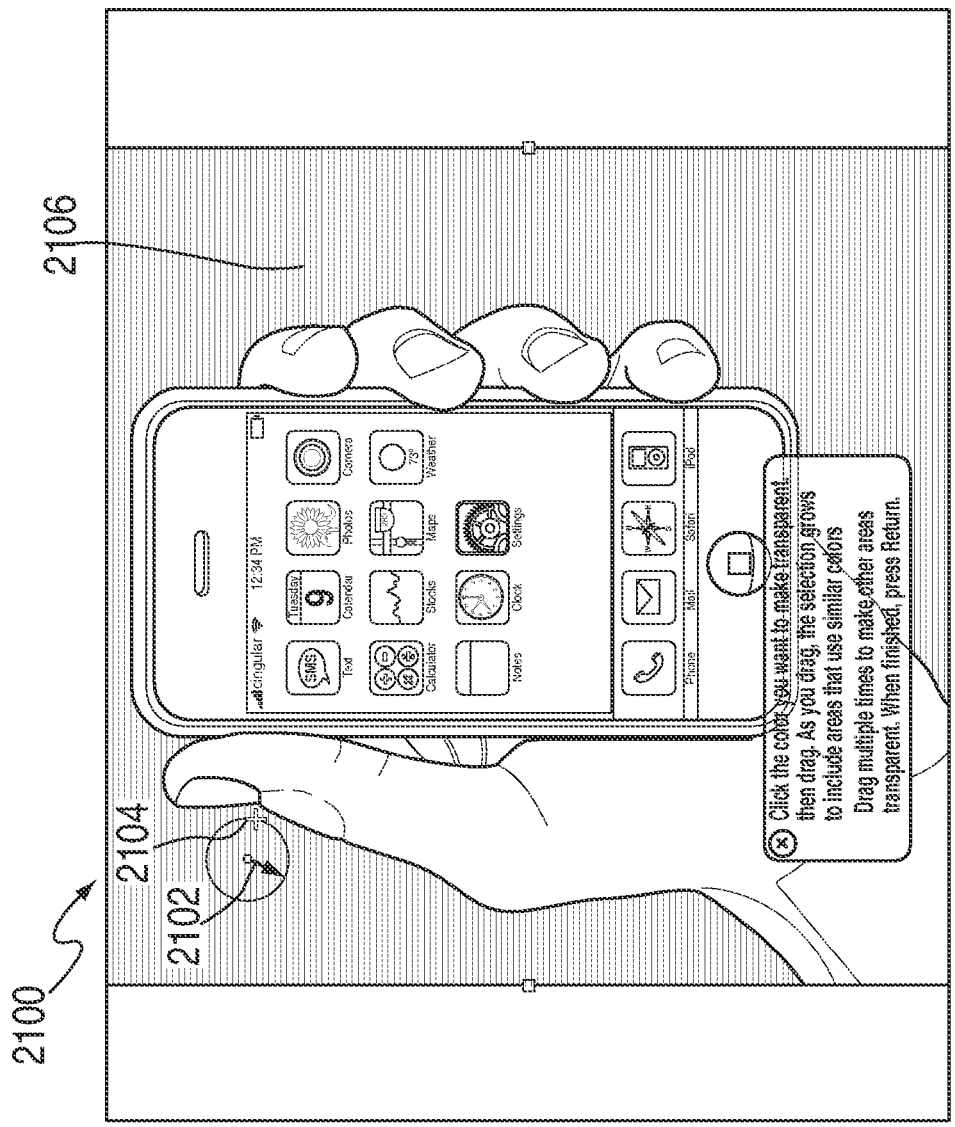
FIG. 21 shows an illustrative display screen demonstrating a suitable color tolerance level of the background removal tool in accordance with an embodiment of the present invention.
Figure 22:
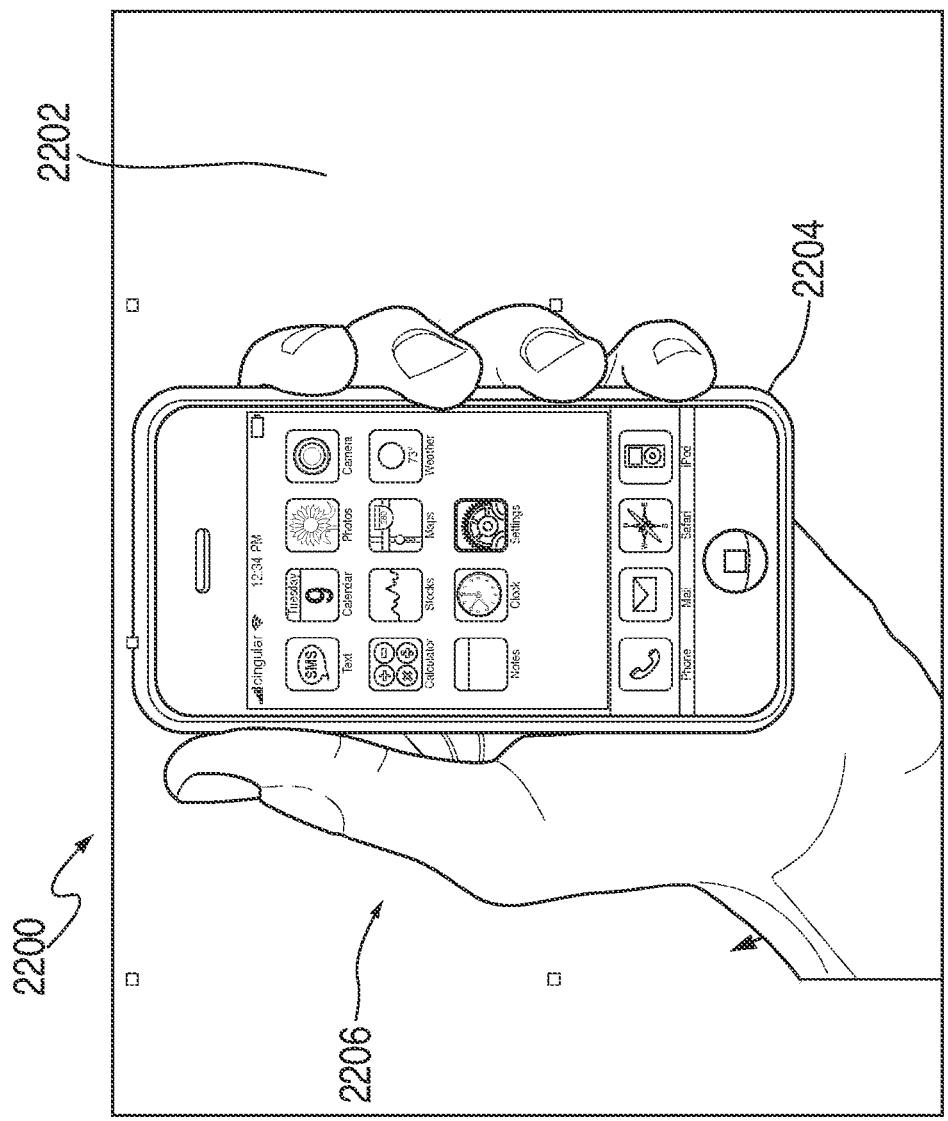
FIG. 22 shows an illustrative display screen demonstrating the result of background removal using the background removal tool in accordance with an embodiment of the present invention.

The user can finalize a portion for removal at any time. The portion currently displayed to the user may then be masked, revealing the background or other images, etc. underneath the object. For example, referring now to FIG. 21, the user may direct the presentation application to finalize background removal of region 2106 with pointer 2104 a distance 2102 from the initial point. When this portion is finalized and the background removal tool is deactivated, the presentation application may provide a display similar to display 2200 of FIG. 22. As illustrated in FIG. 22, the original background (e.g., background 1704 of FIG. 17) may be masked away, and more of slide 2202 may be revealed.

Using the background removal tool, the presentation application may provide clean, smooth edges between the portion of an object that is removed and the portion that remains visible. For example, referring again to FIG. 22, edge 2204 of image 2206 after background removal may be smooth. This can be accomplished by the presentation application even if the region originally selected for removal (e.g., region 2106 of FIG. 21) has irregular and uneven edges. To provide clean edges, the presentation application may convert the region selected for removal to a vector graphic before performing the removal. Thus, the outline of the region may be smoothened using a vector tracing algorithm that can convert the originally selected region to the vector graphic. Also, the use of vectors may allow any straggling pixels remaining in the background to be removed.

Figure 23:
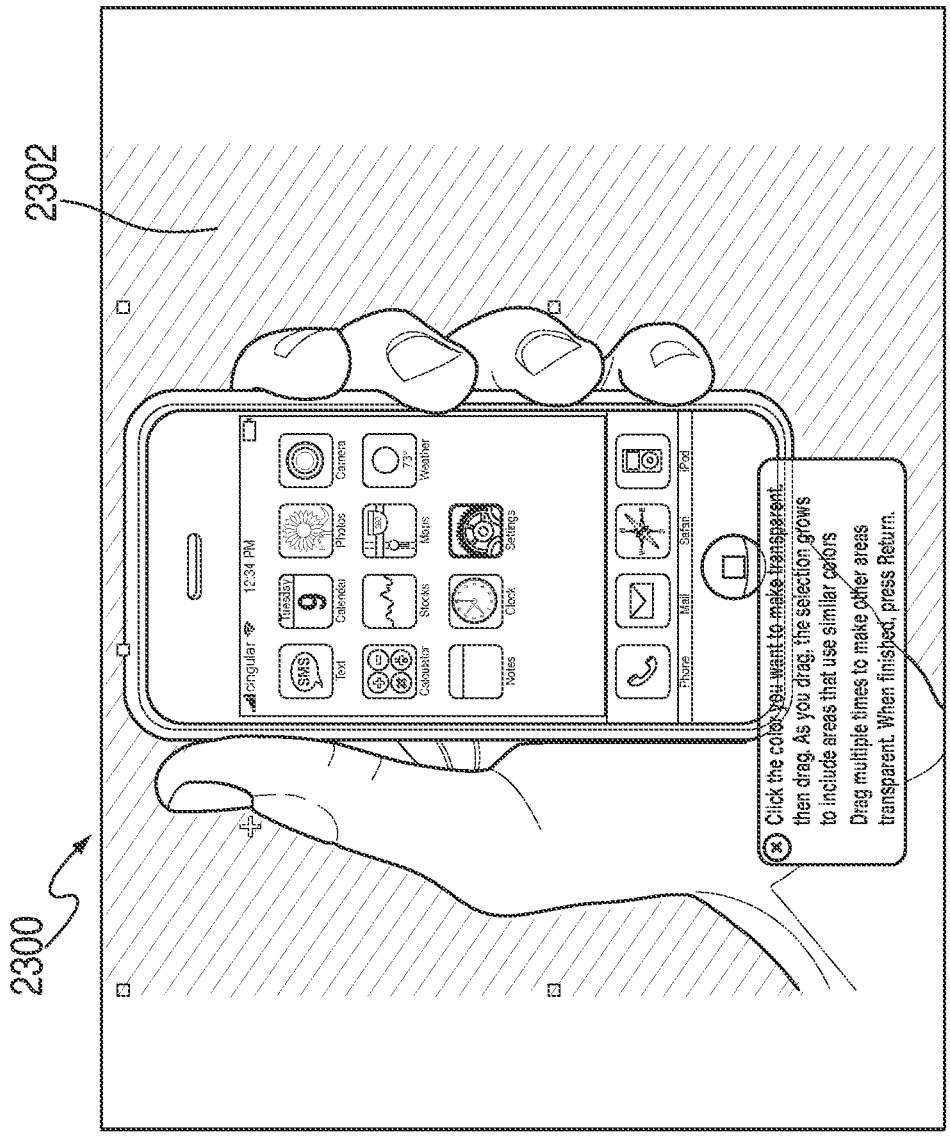
FIG. 23 shows an illustrative display screen demonstrating the result of activating the background removal tool when part of the background of the object has already been removed in accordance with an embodiment of the present invention.

If the user directs the presentation application to keep the background removal tool active after finalizing a portion of the object to be removed, or if the background tool is reactivated, a display similar to display 2300 of FIG. 23 may be provided to the user. The background that was previously masked (e.g., background 1704 of FIG. 17) may be displayed by the presentation application, but in an altered form. For example, the presentation application may display the previously removed background 2302 as a darker or lighter version of the original background, a more transparent version of the original background, or a blurred version of the original background. Any other suitable effect may be contemplated. Thus, the presentation application can allow the user to remain aware of the original background and which areas of the object background have been removed.

The presentation application may enable a user to perform background removal multiple times to the same object. For example, if the background includes multiple colors, using the background removal tool once may not be sufficient to remove the entire background. Thus, after a first removal, the user may select another initial point, possibly having a different color than the first initial point, on the image to continue removing portions of the background. The background tool may also be combined with the masking feature of the application, which may allow the user to manually define portions of the object to mask. Thus, multiple presentation application tools may be at the user's disposal to define the particular portion of the object that the user wants to remove.

When one or more masks are applied to the object using the masking tool or background removal tool, the original object may remain unchanged. Instead, the masked object may be defined by the original object and a series of masks that were used to obtain the masked object. For example, the masked object may be defined by the original object and a sequence of one or more vector graphics selected by the user for background removal. In this way, in response to requests by the user, the presentation application can revert back to displaying previous views of the object by removing each individual mask in the series of masks. The presentation application may save the masked object by storing the original object and a series of masks. Thus, the next time the user directs the presentation application to open the slide show presentation, the presentation application can still display the masked object, as saved, and can still allow the user to remove each individual mask from the masked object.

Figure 24:
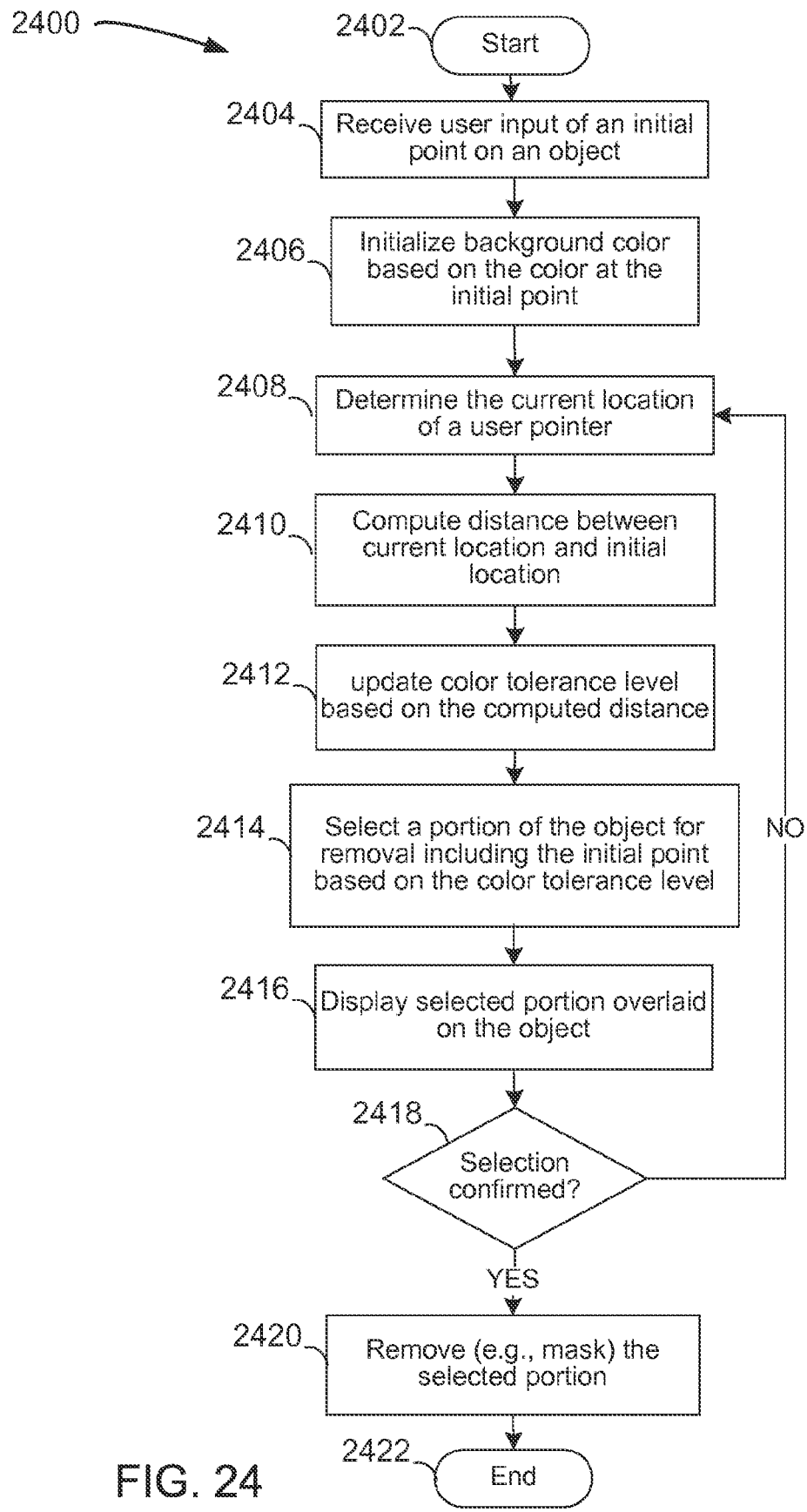
FIG. 24 shows a flow diagram of an illustrative process for determining a portion of an object for background removal in accordance with an embodiment of the present invention.

Referring now to FIG. 24, illustrative flow diagram of process 2400 is shown for removing the background of an object (e.g., image, graphic, etc.). Process 2400 may begin at step 2402. At step 2404, the presentation application may receive a user input of an initial point on an object. This point may be part of the background, or any other suitable part of the object, that the user wants to remove. At step 2406, the presentation application may initialize the background color based on the color of the initial point selected by the user.

At step 2408, the presentation application may determine the current location of a user pointer or cursor, and at step 2410, the presentation application may compute the distance between the current location and the initial point. The pointer may be the pointer that was used to select the initial point, and the computed distance may correspond to the distance that the user has moved the cursor or pointer since selecting the initial point. At step 2412, the presentation application may compute or update a color tolerance level based on the computed distance. The tolerance level can be obtained using any suitable method, such as using a table lookup approach or by calculating a function that is proportional to the distance.

At step 2414, the presentation application may select a portion of the object for removal that includes the initial point. The presentation application may select the portion based on the color tolerance level, and using any suitable algorithm. For example, the presentation application may use a seed-fill algorithm starting from the initial point to obtain pixels in the object that are similar in color to the initial point. In some embodiments, this portion can be computed using the color distribution of the entire object. That is, if, at step 2414, the presentation application selects a portion from an object that has already been masked (e.g., after previously using the background tool, using a masking tool, etc.), the portion may be selected from the original, unmasked object. Selecting from the unmasked object may be possible because the presentation may mask the image without changing the actual object (e.g., the saved version of the object) or removing any information associated with the masked areas. Instead, the presentation application may make those areas of the object appear transparent.

At step 2416, the presentation application may display the selected portion overlaid on the object. In some embodiments, the presentation application may display the selected portion using a suitable color over the object. The color chosen for this purpose be a distinct color, such as purple. At step 2418, the presentation application may determine whether the selection has been confirmed for removal by the user. If, at step 2418, the presentation application determines that the selection has been confirmed, process 2400 may move to step 2420. At step 2420, the presentation application may mask the selected portion. This may have the effect of removing portions of the object that have not already been masked (e.g., in previous uses of the background removal too, using the masking tool, etc.).

Returning to step 2420, if the presentation application instead determines that the selection has not been confirmed, process 2400 may return to step 2408 and may determine a new location of the user pointer. Thus, the presentation application can continuously and automatically update its selection for removal based on user manipulation (e.g., user movement of a pointer).

One skilled in the art would understand that FIG. 24 is merely illustrative. Any of the steps of process 2400 may be omitted, modified, combined, and/or rearranged, and any additional steps may be performed without departing from the scope of the invention.

Figure 25:
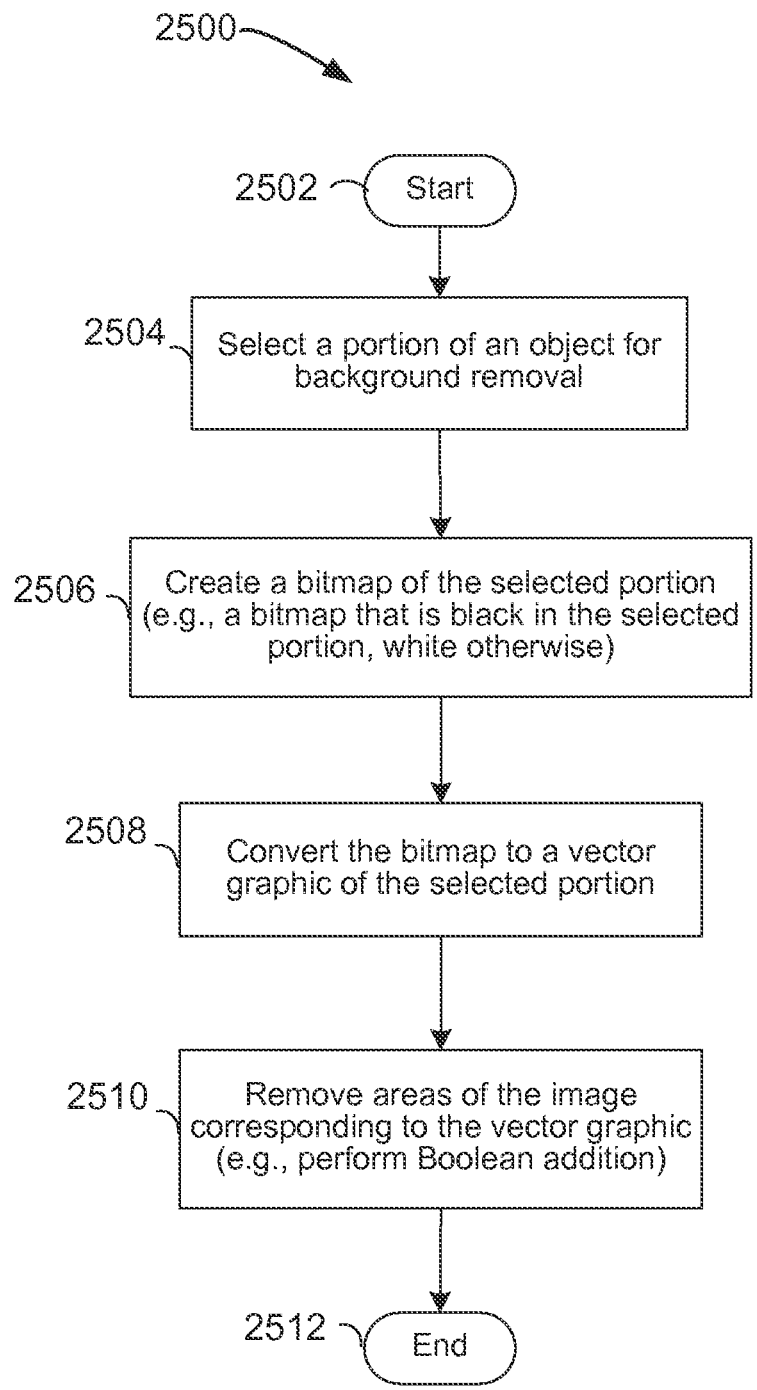
FIG. 25 shows a flow diagram of an illustrative process for performing background removal in accordance with an embodiment of the present invention.

Referring now to FIG. 25, illustrative flow diagram of process 2500 is shown for removing an area of an object (e.g., the background of the object). Some of the steps of process 2500 may illustrate one way to perform step 2414 of process 2400 (FIG. 24). Process 2500 may begin at step 2502. At step 2504, the presentation application may select a portion (e.g., region 1806 of FIG. 18) of an object for background removal. The portion may be the portion confirmed for removal at step 2418 of process 2400. Because any suitable algorithm may have been used to select the portion for removal (e.g., seed-fill algorithm), the edges of the portion may be irregular or visually displeasing. Thus, the remaining steps of process 2500 may produce edges that are smoothened, thereby mitigating the potentially displeasing effect of an irregular removal selection.

At step 2506, the presentation application may create a bitmap of the selected portion. In some embodiments, the presentation application may create a bitmap image where the selected portion is black while the remaining, unselected portions are white. Thus, creating a bitmap may involve producing a black and white bitmap of the selected image. At step 2508, the presentation application may convert the bitmap to a vector graphic of the selected portion. This conversion may involve performing any suitable tracing algorithm, such as the PO trace algorithm. The tracing algorithm may be based on a tracing library, and may produce a vector-based outline of the bitmap image. Thus, the resulting graphic from tracing the bitmap may be smoothened.

At step 2510, the presentation application may remove areas of the object corresponding to the vector graphic. Removing the portion may involve performing a Boolean addition of corresponding components of the vector graphic and the object. Because one or more previous masks for the object may exist (e.g., from using the masking tool), in some embodiments, the presentation application may remove a portion by combining the vector graphic with the previously computed masks. This combination may be determined by, for example, performing a Boolean OR function on all of the computed portions. The combined portion may therefore include all of the portions of the object that should be masked. In this case, the presentation application may perform the Boolean addition on the combined portion and the object. In other embodiments, the presentation application may remove the background by adding a mask on top of a previously masked object. Process 2500 may then end at step 2512.

One skilled in the art would understand that FIG. 25 is merely illustrative. Any of the steps of process 2500 may be omitted, modified, combined, and/or rearranged, and any additional steps may be performed without departing from the scope of the invention.

As described above, the background removal tool can automatically detect the boundary between the foreground and background of an object, and can mask the background from view. In some scenarios, however, a user may want to extract only a portion of the foreground, and not the entire foreground. For example, a user may want to extract one person from a group picture. Thus, the presentation application can provide a tool that allows a user to define an area of the foreground, and can remove the other portions of the object. These other portions that are removed may include the background of the object as well as other parts of the foreground not of interest to the user. Thus, a user may select between different types of masking tools provided by the presentation application, such as the foreground extraction tool and the background removal tool, based on the current needs of the user.

Although the foreground extraction tool is at times described as a tool for extracting a portion of an object's foreground, this is merely illustrative. It should be understood that the foreground extraction tool may allow a user to select and extract any portion of an object, whether background or foreground.

Figure 26:
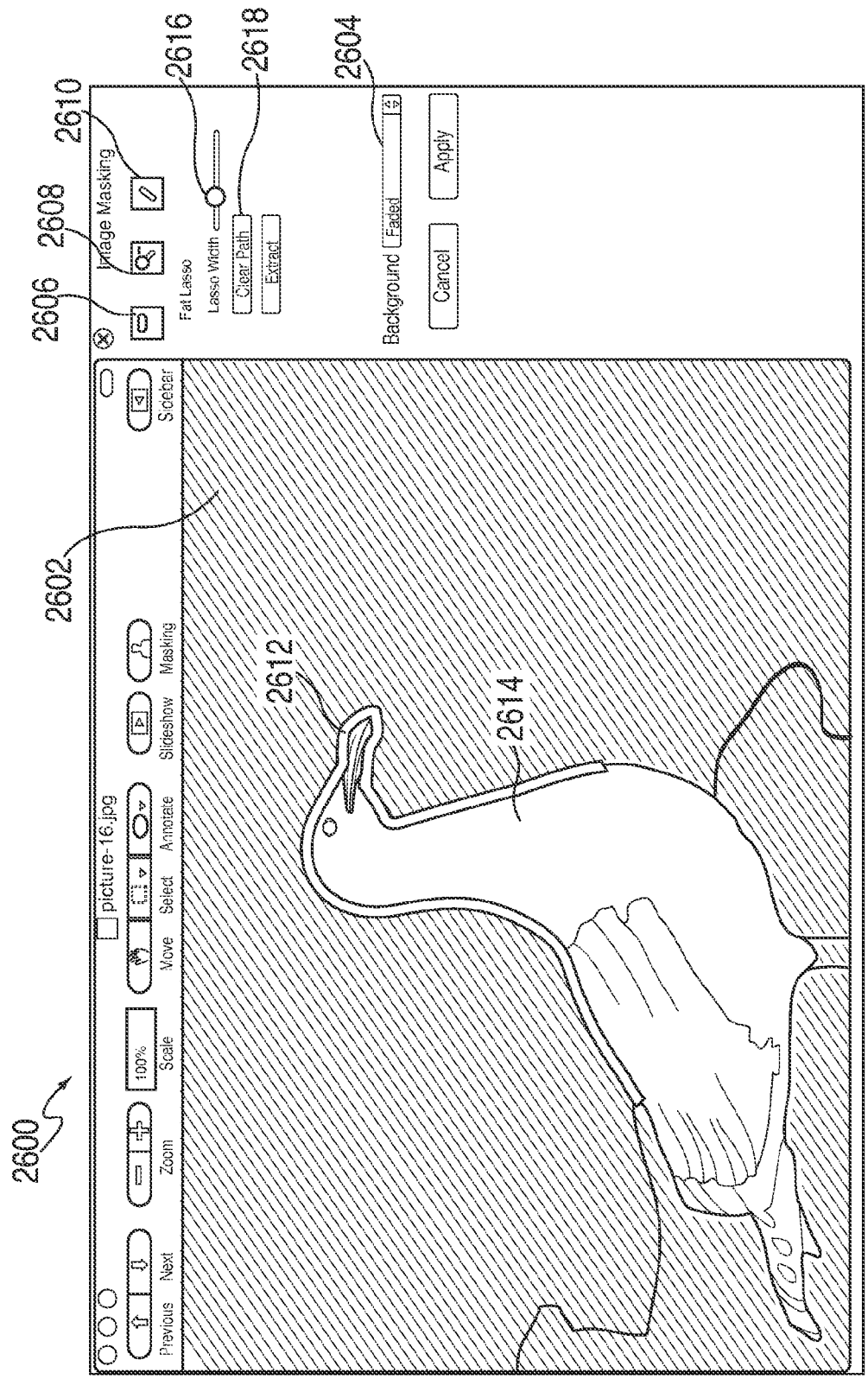
FIG. 26 shows a display screen illustrating the construction of a trimap in accordance with an embodiment of the present invention.

To extract at least a portion of an object's foreground or background, the presentation application can allow the user to define the perimeter of the foreground and extract the foreground or background based on the defined perimeter. FIG. 26 shows display screen 2600 that illustrates an exemplary interface for this feature. FIG. 26 illustrates the extraction a portion of object 2602. Object 2602 may be an image that includes a foreground (e.g., the seagull), identified as foreground 2614, and a background. FIG. 26, therefore, illustrates the extraction of a portion of foreground 2614 from object 2602.

Display screen 2600 of FIG. 26 can also include image masking options areas 2604. Image masking options areas 2604 may include one or more suitable options that can be used to, for example, change the view of the displayed object (e.g., changing the zoom), enable the foreground/background extraction tool(s), show/hide image masking options areas 2604, etc. In some embodiments, image masking options areas 2604 may be displayed in response to receiving a user selection of a masking tool icon in the toolbar of the presentation application (e.g., toolbar 220 of FIG. 2).

The features of the foreground/background extraction tool can be provided through image masking options areas 2604. Image masking options areas 2604 can include, for example, at least three tools that are activated using options icons 2606, 2608, and 2610. Option icon 2606 can enable the foreground extraction tool. Option icon 2608 can enable a tool similar to the background removal tool, and option icon 2610 can enable a pencil tool. Some other examples of options that may be included in image options areas 2604 are described below in connection with FIGS. 27 and 28.

When the foreground/background extraction tool is enabled, as shown in FIG. 26, the presentation application may display options icon 2606 in a depressed manner and can provide a user with the ability to define perimeter region 2612 of foreground 2614 using the foreground/background extraction tool. Perimeter region 2612 is defined, for example, by creating a polygon of any shape (with any suitable number of sides) around a portion of foreground 2614. The user may direct the presentation application to create the polygon one side at a time. A side of the polygon may be created by the presentation application, for example, in response to receiving user indications of the locations of the two vertices for the side. In this manner, the user can select points on the object using a pointer device (e.g., a computer mouse, finger) to define the vertices. The presentation application may then automatically display a line between the user-selected vertices. The line can be any suitable color or colors, such as black, white, and/or red.

One or more sides of the polygon may also be created by allowing a user to guide the pointer device along the perimeter of foreground 2614. The presentation application may automatically draw perimeter region 2612 in object 2602 where the pointer device passes. The user may choose between these two mechanisms or utilize both, in addition to any other line or polygon creation mechanism (e.g., choosing from a predefined shape), to draw perimeter region 2612. During or after the creation of perimeter region 2612, the presentation application may delete the fully or partially drawn polygon in response to the user selecting "Clear Path" option 2618, and the presentation application may display the original object. The user may then start the creation of a perimeter region over again, or may switch to using a different tool in the presentation application, for example. One skilled in the art would appreciate that other options may also be provided to the user, such as, for example, options to clear the most recently created side of the polygon, etc.

The user may change the thickness of perimeter region 2612 using slider 2616 of object masking options areas 2604. In some embodiments, the perimeter region defined by a user may be referred to as a "lasso," and thus slider 2616 may be labeled, as shown in FIG. 26, as "Lasso Width." The thickness of perimeter region 2612 can be dynamically adjusted by the user to ensure that the true perimeter of the object (e.g., the edge of the seagull) is within perimeter region 2612.

The creation of perimeter region 2612 may be complete once the user has formed a closed polygon. For example, the presentation application may automatically determine that the perimeter of foreground 2614 is complete when the ends of perimeter region 2612 touch, thereby creating a closed polygon. For the purposes of the present invention, a polygon may be considered closed when a subsequent polygon vertex is placed on or near the first vertex. In addition, if the user is using computer equipment, the user may double click on the computer mouse to indicate that the user would like to close the polygon. In response the double click, the presentation application may form a line from the last vertex created by the user to the first vertex. A completed perimeter region of the object in FIG. 26 is shown in FIG. 27.

Figure 27:
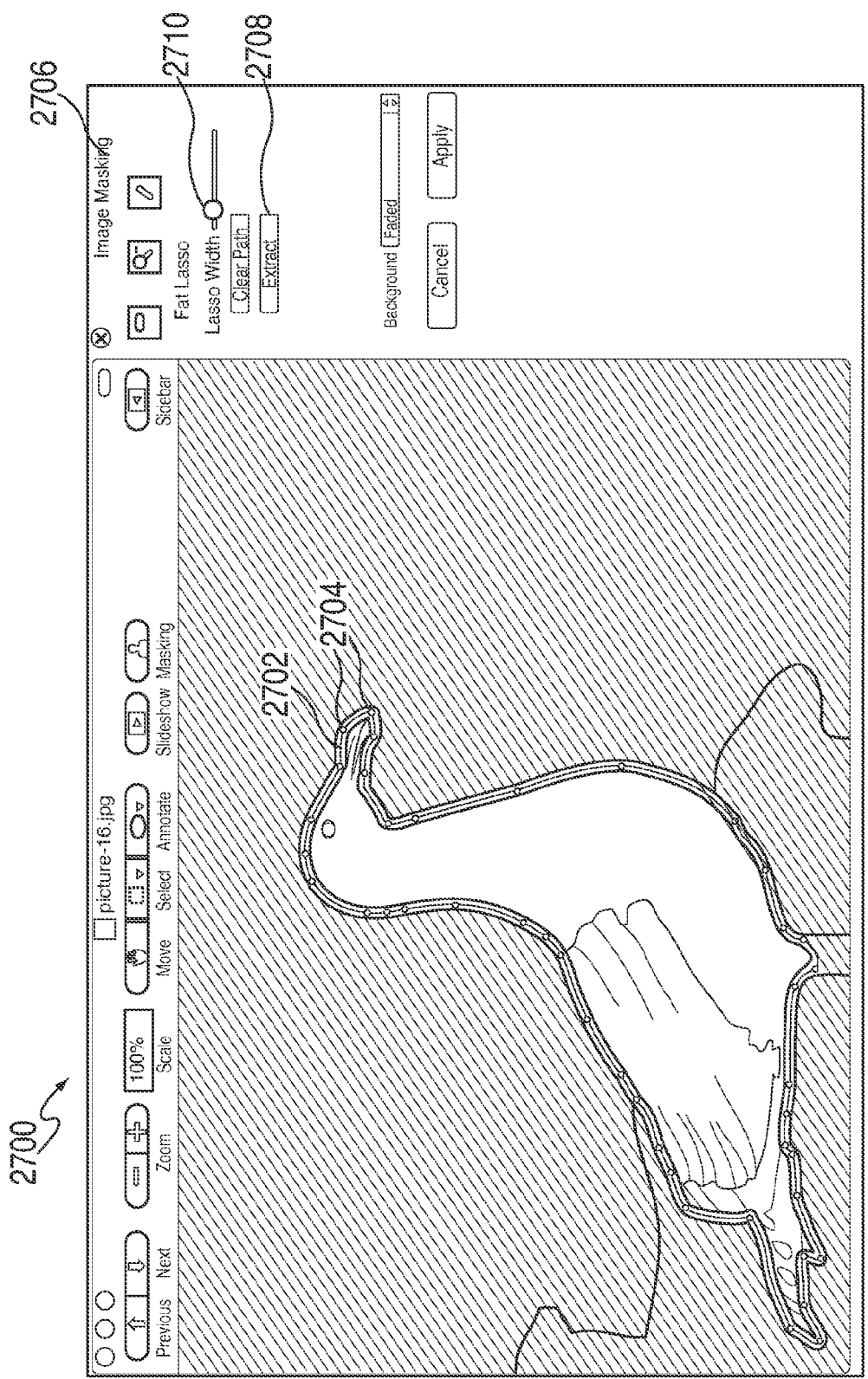
FIG. 27 shows an illustrative display screen demonstrating the refinement of a trimap in accordance with an embodiment of the present invention.

FIG. 27 shows completed perimeter region 2702. Once perimeter region 2702 is complete, a user may be provided with the ability to refine the region. In some embodiments, the presentation application may provide handles 2704 at the vertices of the polygon. Handles 2704 may be moved by a user by, for example, selecting and dragging one of handles 2704 to a different location, or by directly specifying a new location for the handle (e.g., performing a shift-click on some computer equipment). The presentation may group multiple handles together upon user request, and may allow the users to move the group of handles together. In addition, one or more of handles 2704 may be deleted by the user using, for example, a Delete key on a computer keyboard or by any other means. In response to moving or deleting one or more handles, the presentation application may update perimeter region 2702 to correspond to the new handle locations. Also, as described above, the thickness of perimeter region 2702 may be refined using the Lasso Width slider. Once a user is satisfied with the defined perimeter region, the user may extract the foreground by selecting extract option 2708 in image masking options areas 2706.

A user-defined perimeter region, such as perimeter region 2702, can aid a presentation application in determining which portions of an object the user would like the application to consider as part of the foreground and as part of the background. For example, the presentation application may consider any area outside of perimeter region 2702 to be part of the background, the area enclosed by perimeter region 2702 to be part of the foreground, and may initially consider the area within perimeter region 2702 to be unknown. Thus, in some embodiments of the present invention, the presentation application initially associates the pixels of an object among three categories, sometimes called "pixel sets": a foreground set, a background set, and an unknown set. Classifying an object in this manner is referred to herein as creating a "trimap" of the object. For simplicity, and where appropriate, a pixel identified as being part of the foreground is referred to herein as a "foreground pixel," a pixel identified as being part of the background is referred to herein as a "background pixel," and a pixel initially identified as being neither inside nor outside the lasso, but under the lasso, is herein referred to as an "unknown pixel." By allowing the user to adjust the thickness or width of the lasso (e.g., using slider 2710), the presentation application dynamically changes the number of pixels in each of these pixel sets. For example, when the user increases the lasso width, the presentation application may identify more pixels as being part of the unknown pixel set and fewer pixels as being part of the background and/or foreground pixel sets.

The presentation application may process each unknown pixel to determine whether the unknown pixel is completely part of the background, completely part of the foreground, or may be associated with both background and foreground. The algorithm for making this determination will be described in greater detail below in connection with FIGS. 30-32. In some embodiments, the outline of the portion to be extracted may be smoothened using a tracing algorithm (e.g., PO trace algorithm) before applying the mask. This process is described above in connection with, for example, FIG. 25.

In some embodiments, the presentation application may create the trimap of an object and process unknown pixels in response to receiving a user selection of extract option 2708. This approach may be advantageous, because the presentation application starts processing unknown pixels after the shape of the perimeter region is confirmed by the user, and prevents the presentation application from having to discard and re-compute information if the user changes the shape of the polygon. In other embodiments, the presentation application creates a trimap and performs some or all of the processing steps as the user creates and/or refines the perimeter region. For example, when the user creates a side of the polygon, the presentation application may create a partial trimap for that side and may process the unknown pixels within the partial trimap.

In response to receiving a selection of extract option 2708, the presentation application may mask the areas of the object that are not part of, for example, the foreground. This may leave the pixels in the foreground set of the object trimap visible, as well as any pixels in the unknown set that are determined to be at least partially part of the foreground. In some embodiments, the degree of visibility (e.g., the opacity) of an unknown pixel may depend on the degree that the pixel is determined to be part of the foreground. One skilled in the art would appreciate that, rather than extracting the foreground, this feature could also be used to extract the background. For example, the presentation application may instead mask the pixels in the foreground set, and may leave pixels in the background set and any unknown pixels that are at least partially in the background set visible. Thus, in addition to providing extract option 2708, a second extract option could be provided for extracting the background.

Figure 28:
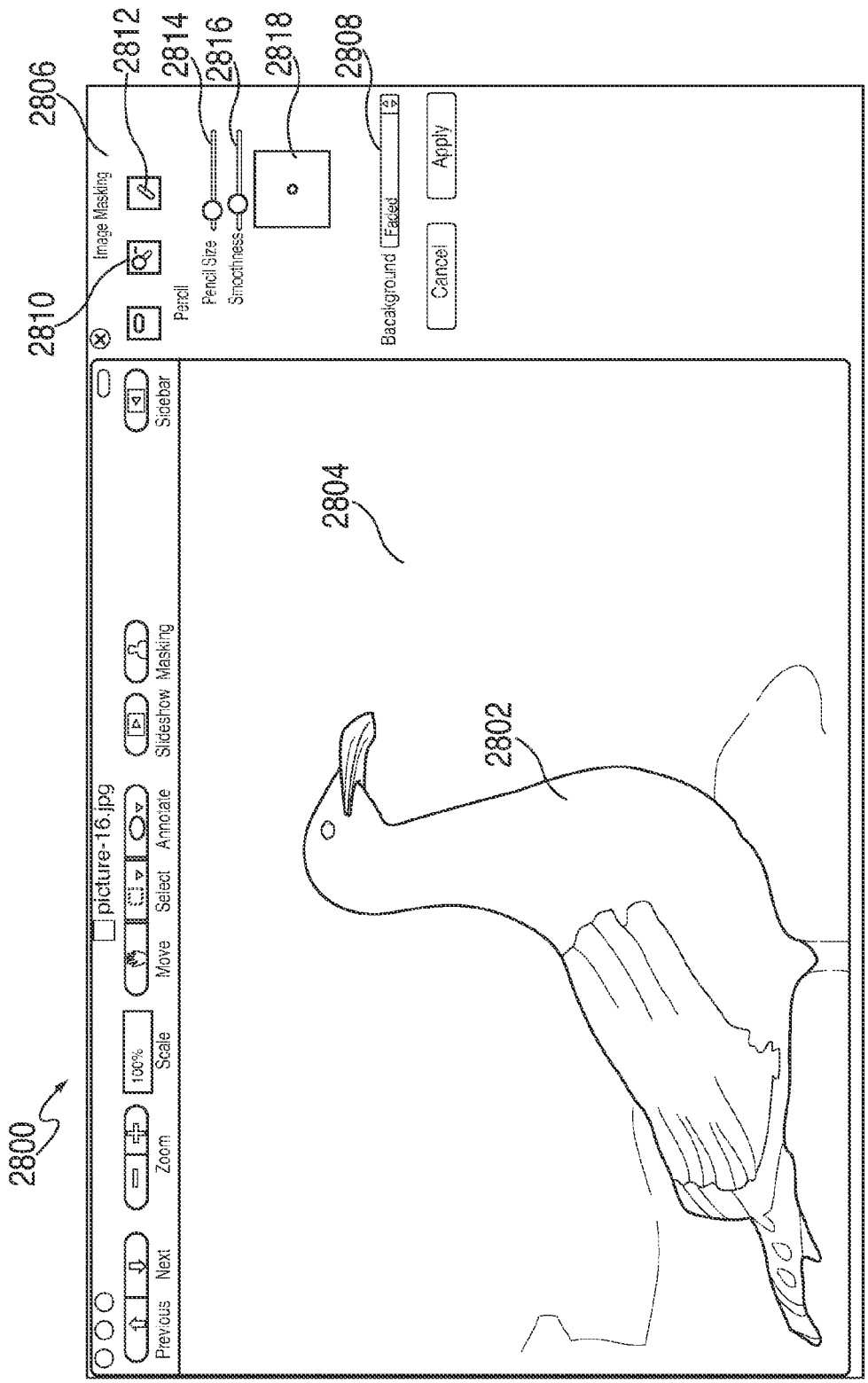
FIG. 28 shows an illustrative display screen demonstrating the result of foreground extraction in accordance with an embodiment of the present invention.

One exemplary result of foreground extraction is illustrated in FIG. 28. The user may be presented with a visual representation of foreground 2802 against faded background 2804. Faded background 2804 may resemble the original background, but may have a lower opacity. By presenting the extraction in this way, the user can see the entire object yet still easily distinguish which parts of the object have been extracted and which parts will be removed/masked. A faded background can be presented when this option is selected from pull-down menu 2808 in image masking options areas 2806. Other representations of a masked background may be contemplated, such as a completely transparent background, a background tinted with a suitable color, or any other suitable approach. Similarly, other embodiments of the present invention may extract the background and mask the foreground.

The presentation application may allow a user to refine the result of foreground extraction. Thus, the user may change the result of extraction if the user is not satisfied with the result. The presentation application can provide, for example, one or more tools for this purpose. The tools may be set to either add pixels to the foreground or remove pixels from the foreground, and may do so one or more pixels at a time. The setting may be toggled, for example, in response to the user selecting an option key. A magic wand tool, for example, may be activated by selecting option 2810, and as described above, may enable a tool similar to the background removal tool. In particular, the magic wand tool may obtain an initial point of the object (e.g., in response to a mouse click) and a color tolerance (e.g., based on the current distance of a mouse pointer to the initial point), and may use a seed-fill algorithm to remove or add contiguous areas of similar color.

In addition, a pencil tool, for example, may be activated when the user selects option tool 2812 of FIG. 28. The pencil tool may allow a user to define a portion of the object by selecting individual parts of the object or dragging a mouse pointer within the object. Depending on the current setting, the portion defined by the user may be added to the foreground or removed from the foreground.

In some embodiments, the pencil tool may have two settings that can be adjusted by sliders 2814 and 2816 in image masking options areas 2806. Slider 2814 may adjust the size (in terms of pixels) of the pencil used to draw the added/removed portion, and slider 2816 may adjust the smoothness of the pixel. The smoothness of the pixel refers to the degree of affect the pencil has on the object. For example, when the pencil tool is set to change background pixels to foreground pixels, a pencil with a low smoothness setting may change a pixel that is fully part of the background to a pixel that is fully part of the foreground. On the other hand, a pencil with a high smoothness setting may change a pixel that is fully part of the background to a pixel that is 10% part of the foreground and 90% part of the background. The degree of affect of the pencil may also vary depending on how close a pixel is to the center of the pencil. For example, for the high smoothness setting, the pencil tool may alter pixels that are closer to the center by 50%, and may alter pixels that are at the edge of the pencil by 10%. Thus, the smoothness of the pixel may be perceived as a blur around the edge of the pencil. In some embodiments, image masking options window 2806 can provide preview window 2818 to illustrate the size and smoothness of the pencil tool based on the current setting of sliders 2814 and 2816.

Figure 29:
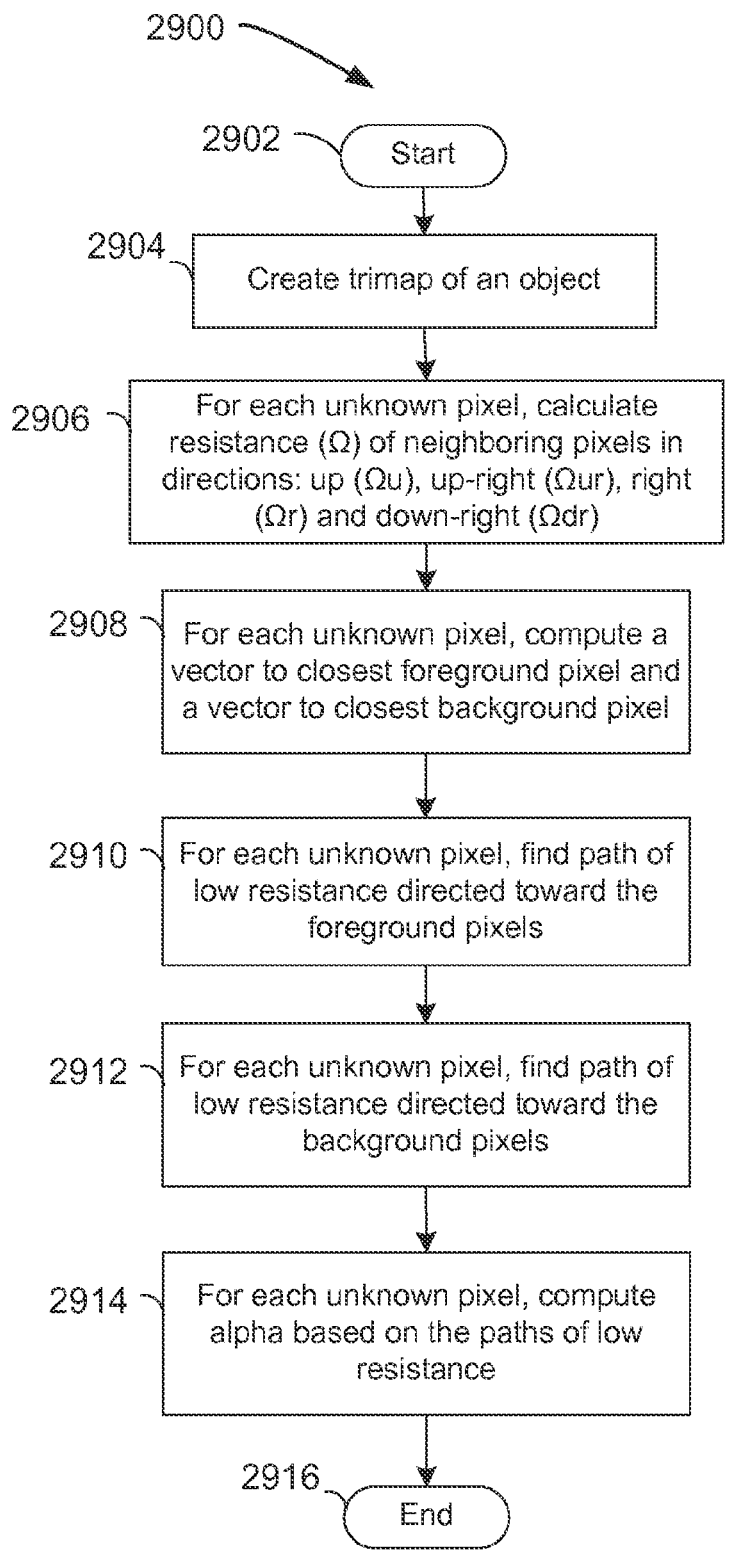
FIG. 29 shows a flow diagram of an illustrative process for extracting a foreground of an object in accordance with an embodiment of the present invention.

As mentioned above, the foreground extraction tool provided by the presentation application can determine whether pixels are part of the foreground of an object or the background of the object. FIG. 29 shows a flow diagram of illustrative process 2900 that can be utilized by the presentation application to make the determination. Some or all of the steps of process 2900, and of processes 3000 and 3100 in FIGS. 30 and 31, can be executed by the presentation application while a user creates or refines a lasso, or after a user completes the creation of the lasso.

Process 2900 may begin at step 2902. At step 2904, the presentation application may create a trimap in response to, for example, the user drawing a lasso in an object. In other embodiments, the lasso may be generated automatically by the presentation application. The object may be, for example, an image, picture, graphic, still frame from a video, etc.

At step 2906, the presentation application may calculate a set of resistances, which are referred to herein with the symbol omega ($\Omega$), for each unknown pixel of the trimap. A resistance between two pixels may correspond to the degree of color difference between the two pixels. The presentation application may calculate the resistance by mapping the red-green-blue (RGB) value of each pixel to a point in a three-dimensional coordinate system (e.g., X-Y-Z coordinate system) and computing the Euclidean distance between the points. In other embodiments, any other method for calculating color resistances may also be used by the presentation application.

For each unknown pixel, the presentation application may need to determine the resistance to neighboring pixels in each of the eight directions (four cardinal directions and four diagonals). To obtain these resistances without computing duplicates and thereby conserving processing power, the presentation application can calculate and store only four resistances for each unknown pixel at step 2906. For example, the presentation application may calculate resistances in directions up, up-right, right, and down-right. If, for example, the down resistance were also calculated for a particular pixel, this would be a duplicate of the up resistance calculated for the pixel below that particular pixel. Therefore, computing resistances for four neighboring pixels may allow the presentation application to obtain the resistances between each neighboring pixel without computing duplicates.

With continuing reference to FIG. 29, at step 2908, the presentation application may compute and store, for each unknown pixel, a vector from the unknown pixel to the background pixel closest to the unknown pixel, and a vector from the unknown pixel to the closest foreground pixel. Each vector may be associated with a length (in terms of the number of pixels) to the closest pixel and a direction to the closest pixel. For a given pixel, the presentation application may find the closest background or foreground pixel by scanning concentric circles of increasing radii, and computing a vector based on the found closest pixel.

Then, at step 2910, and for each unknown pixel, the presentation application can find a path of low resistance directed (or "guided") from the unknown pixel towards the foreground pixels. That is, using the resistances computed at step 2904 and the vectors computed at step 2906, the presentation application can spawn a walker algorithm that walks pixel-by-pixel towards the nearest background pixels. Because the walkers are guided by the vectors to the closest background or foreground pixels, these vectors are referred to herein as "guidance vectors." The algorithm can be terminated once the walker reaches a pixel that is either part of the foreground or the background. The walker algorithm can be associated with a free parameter, which defines the priority between the resistances and the guidance vectors. The free parameter, for example, may define how heavily the walker is guided by the resistances between pixels in relation to the guidance vectors associated with those pixels. The free parameter may be configured such that the walker travels the path of least resistance. Alternatively, the free parameter may be set such that a different outcome is achieved. Then, at step 2912, the presentation can find a path of low resistance leading away from the unknown pixel and directed towards the background pixels, which may be found using a second walker algorithm. The paths of low or least resistance for the foreground and background walkers can be found using the process described below in connection with FIG. 30.

At step 2914 of process 2900, the presentation application may compute an alpha value for each unknown pixel. The alpha value may correspond to the degree that the unknown pixel is part of the foreground. An alpha value of one may signify that the pixel is fully and only part of the foreground, an alpha value of zero may signify that the pixel is fully and only part of the background, and an alpha value between these values may indicate that the pixel is part of both the background and foreground to some degree. For example, an alpha value of 0.5 indicates that the pixel is equally part of the background as it is part of the foreground. As another example, an alpha value of 0.25 may signify that the pixel is mostly part of the background.

The presentation application can compute an alpha value based on the result of the paths found in steps 2910 and 2912. For example, the presentation application can compute an alpha value based on whether the walker algorithm directed toward the foreground pixels ended at a foreground pixel, whether the walker algorithm directed toward the background pixels ended at a background pixel, and the total resistance encountered during the walks. For example, when both walks end at a foreground pixel, the alpha value for that pixel may be set to one, and when both walks ended at a background pixel, the alpha value for that pixel may be set to zero. The computation performed by the presentation application to obtain alpha values for each unknown pixel is described in greater detail below in connection with FIG. 31. Process 2900 may then move to step 2916 and the method ends. At this ending step, the presentation application may have determined whether each pixel in an object is part of the foreground, background, or a combination of the two.

Figure 30:
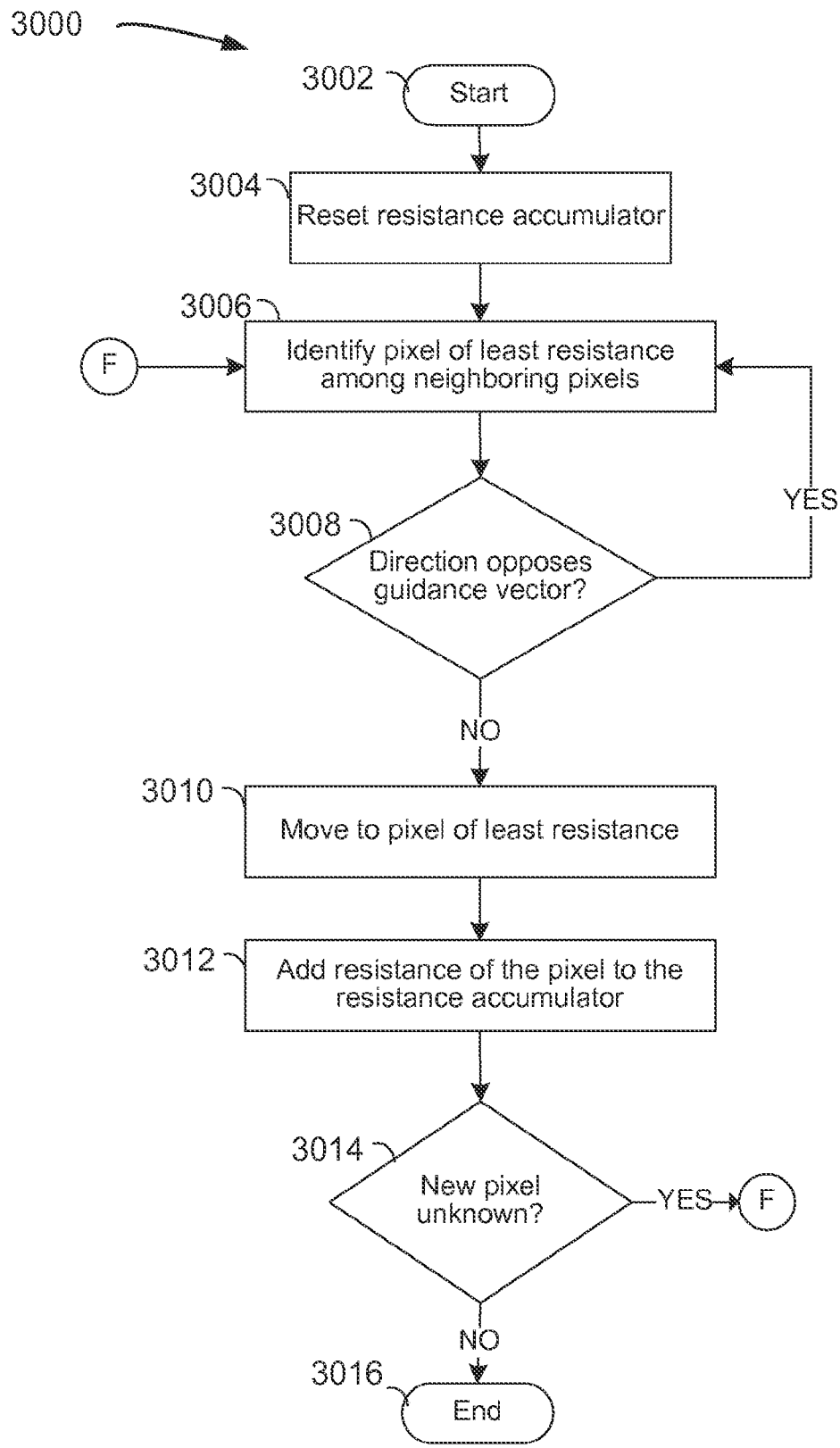
FIG. 30 shows a flow diagram of an illustrative process for finding a pixel path to a nearest foreground or background pixel in accordance with an embodiment of the present invention.

Referring now to FIG. 30, an illustrative flow diagram of process 3000 is shown for computing a path of low resistance towards either a background or foreground pixel. Process 3000 may be one embodiment of either or both steps 2910 and 2912 of FIG. 29, and may implement a walker algorithm. Process 3000 may begin at step 3002 for any suitable unknown pixel in a trimap. At step 3004, the presentation application may reset a resistance accumulator. The resistance accumulator may be used to accumulate the total resistance encountered during a walk guided toward the background or foreground of the object. For the unknown pixel, at step 3006, the presentation application may determine the pixel of least resistance among its eight neighboring pixels. Then, at step 3008, the presentation application may determine whether the pixel of least resistance is in a direction that opposes the guidance vector. The direction may oppose the guidance vector if, for example, the direction is more than 45 degrees from the direction of the guidance vector. If, at step 3008, the presentation application determines that the direction does oppose the guidance vector direction, process 3000 may return to step 3006, where the presentation application can determine the next neighboring pixel of lowest resistance (e.g., a neighboring pixel with the second lowest resistance).

If, at step 3008, the presentation instead determines that the direction towards the pixel of least resistance does not oppose the direction of the guidance vector, process 3000 may move to step 3010. At step 3010, the walker may move to the pixel of least resistance, and may add this resistance to the resistance accumulator at step 3012. Thus, the resistance accumulator may be updated to reflect the total resistance accumulated by the walk up to the current point. Then, at step 3014, the presentation application may determine whether the new pixel, which was moved to at step 3010, is an unknown pixel in the trimap. If so, process 3000 may move back to step 3006 and may identify the pixel of least resistance for the new unknown pixel. Otherwise, the new pixel may be either part of the foreground or background, and process 3000 may end at step 3016.

Thus, process 3000 of FIG. 30 may allow the presentation application to find the total resistance of a path leading from a pixel in the unknown set of the trimap and guided towards either the background or foreground. Also, process 3000 may allow the presentation application to determine whether the pixel terminating the walker algorithm at step 3016 is a foreground or background pixel. This final pixel may or may not be of the type that the walker algorithm was directed towards. Based on this information produced by process 3000, the presentation application can compute alpha values for each unknown pixel. As described above, these alpha values indicate the degree of which each pixel is part of the foreground. An illustrative process for computing the alpha value for an unknown pixel is shown in FIG. 31.

Figure 31:
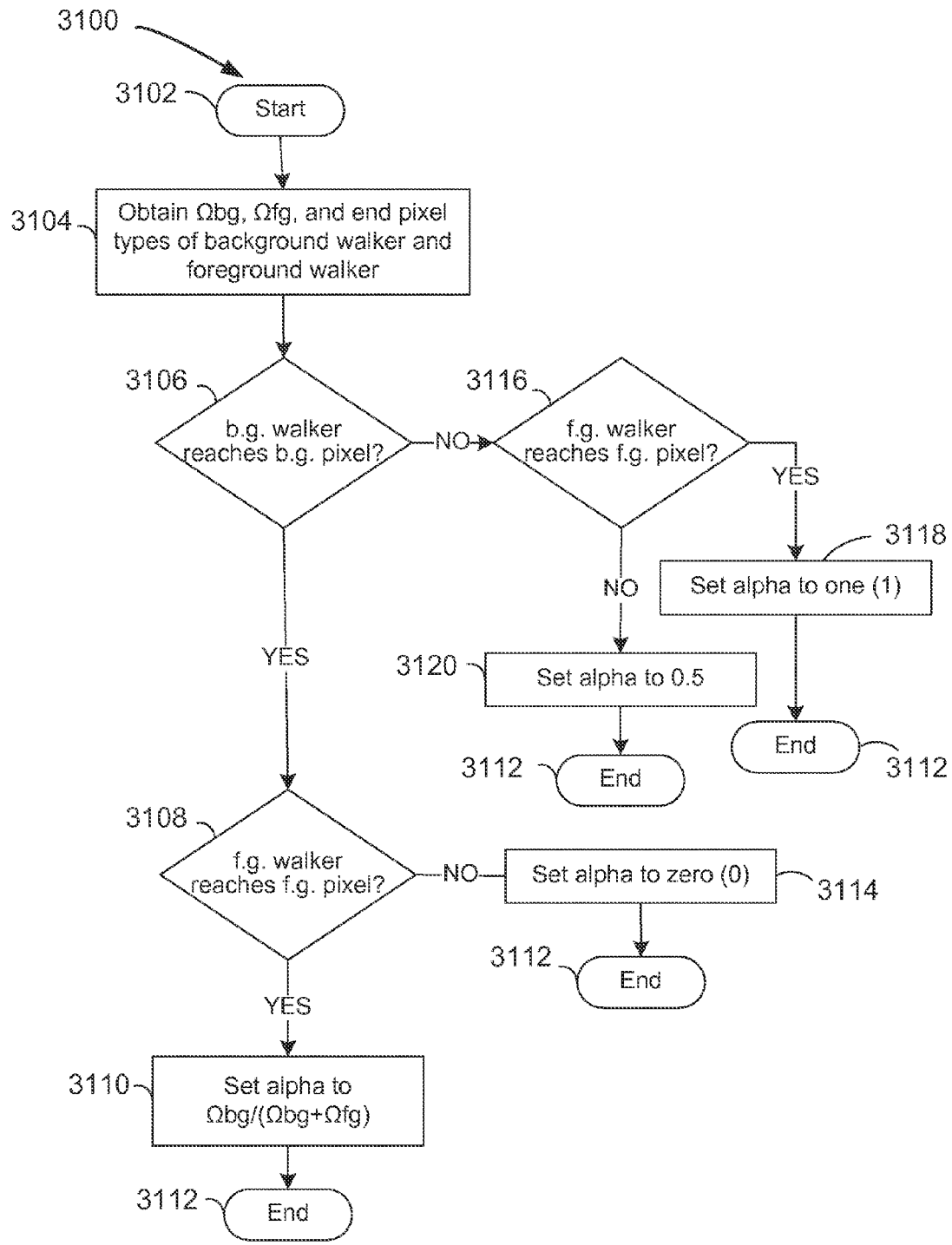
FIG. 31 show a flow diagram of an illustrative process for calculating what proportion of a boundary pixel is part of the foreground in accordance with an embodiment of the present invention.

Process 3100 of FIG. 31 may begin at step 3102. At step 3104, the presentation application may obtain the resistances associated with the paths directed towards the background and foreground as well as the type of pixels (either background or foreground) ending each of these paths. The presentation application can obtain these values using process 3000 of FIG. 30, by, for example, executing the steps of process 3000 once directed towards the foreground, and once directed towards the background. Then, at step 3106, the presentation application may determine whether the background walker reaches a background pixel. If so, the presentation application may move to step 3108, and may determine whether the foreground walker reaches a foreground pixel. If this determination is also affirmative, then both walkers have reached their respective pixel types. Thus, the unknown pixel is part of both the background and foreground, and process 3000 may move to 3110. At step 3110, the presentation application may compute an alpha value of the unknown pixel based on the accumulated resistances of the walkers. In some embodiments, the presentation application may compute alpha according to the equation, $$A = \frac{\Omega_{bg}}{\Omega_{bg} + \Omega_{fg}},$$

where A is the alpha value, $\Omega_{bg}$ is the resistance of the path guided towards the background, and $\Omega_{fg}$ is the resistance of the path guided towards the foreground. Process 3000 may then move to step 3112 and end.

Returning to step 3108, in response to the presentation application determining that the foreground walker does not reach a foreground pixel, process 3100 may move to step 3114. In this case, both walkers have terminated at a background pixel, and the presentation application may consider the unknown pixel to be fully part of the background. Thus, at step 3114, the presentation application may set the alpha value of the pixel to zero. Process 3100 may then move to step 3112 and end.

Returning to step 3106 of process 3100, if the presentation application determines that the background walker does not reach a background pixel, process 3100 may move to step 3116. At step 3116, the presentation application may determine whether the foreground walker reaches a foreground pixel. If so, process 3100 may move to step 3118. In this case, both the background walker and foreground walker have reached foreground pixels, and the presentation application may consider the unknown pixel to be fully part of the foreground. Thus, at step 3118, the presentation application may set the alpha value to one. Process 3100 may then move to step 3112 and end.

Returning to step 3116, if the presentation application determines that the foreground walker does not reach a foreground pixel, process 3100 may move to step 3120. In this scenario, neither walkers have reached their respective types of pixels. The presentation application may not be able to properly determine whether the unknown pixel is part of the foreground or background. Thus, at step 3120, the presentation application may set the alpha value of the pixel to 0.5. Process 3100 may then move to step 3100 and end.

Using the alpha values associated with each of the unknown pixels, and therefore the information on whether each of the pixels is part of the foreground or part of the background, the presentation application may be able to extract the foreground from an object. In some embodiments, the presentation application may trace the foreground or background pixels using a tracing algorithm (e.g., PO trace) to smoothen the areas of the object before performing the extraction. The result of extracting an object may be illustrated in FIG. 28.

One skilled in the art would understand that FIGS. 29-31 are merely illustrative. Any of the steps of processes 2900, 3000, and 3100 may be omitted, modified, combined, and/or rearranged, and any additional steps may be performed without departing from the scope of the invention.

In some embodiments of the present invention, the presentation application may provide users with the ability to record audio for use in enhancing slide show presentations. The presentation application may allow a user to give presentations using slides that may have been created and edited in the presentation application. In some embodiments, the presentation application may allow a user to record a presentation, including the audio of the presentation, while the presentation is given. The slide show presentation with the audio can be played or exported to a different file format (e.g., Quicktime, etc.) using the timing of the recorded presentation. These features are described in greater detail below.

Figure 32:
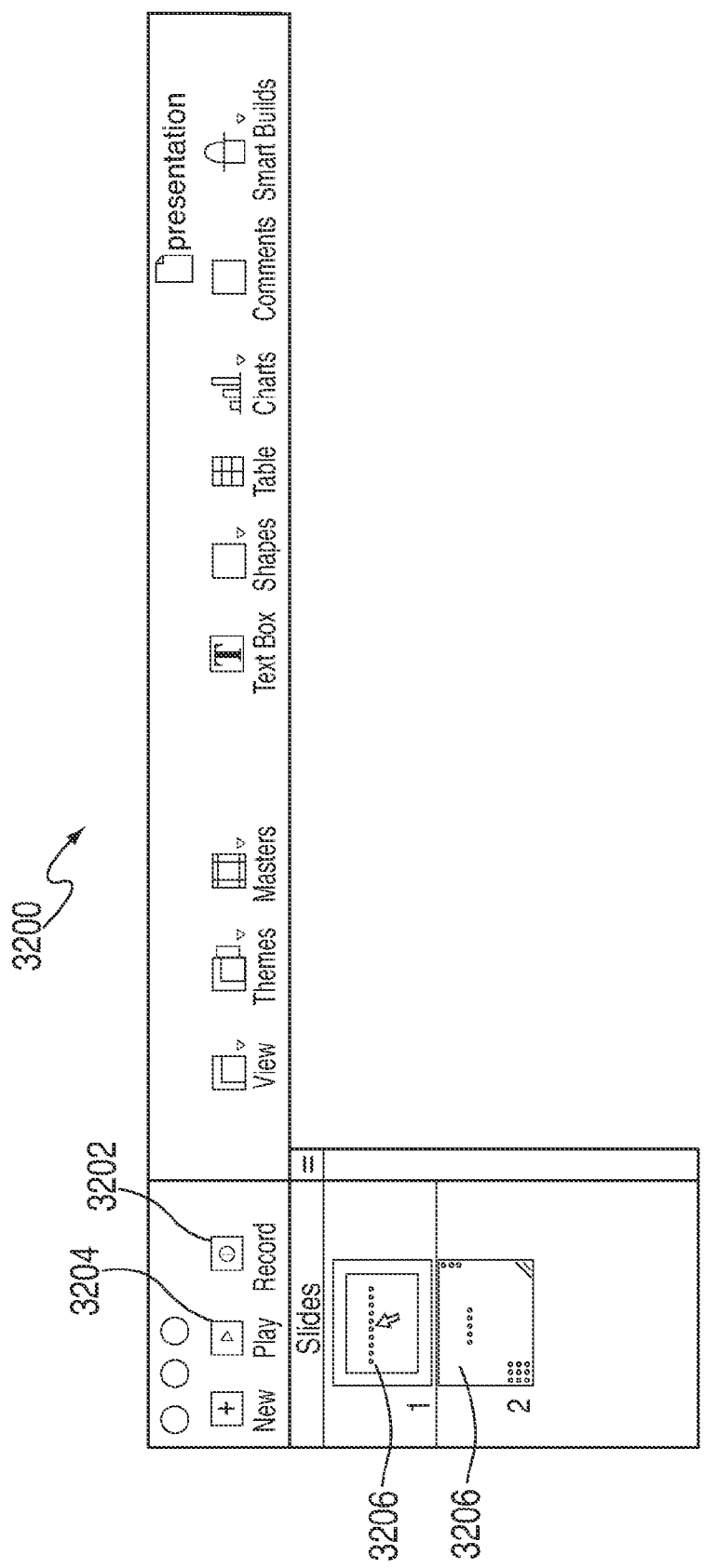
FIG. 32 shows an illustrative portion of a display screen including a record icon for recording a presentation in accordance with an embodiment of the present invention.

Referring now to FIG. 32, a presentation application (e.g., Keynote) may provide illustrative display screen 3200. Display screen 3200 may include any of the tools or functionalities described above in connection with FIG. 2. The presentation application may provide display screen 3200 when the presentation application is in edit mode. For example, in this mode, the presentation application may provide a user with the ability to change the objects or properties of slides in a slide show presentation (e.g., the slides of slide representations 3206) and can provide one or more tools for aiding a user in making these changes.

Display screen 3200 can include selectable record icon 3202 and selectable play icon 3204 in the toolbar of the presentation application. When a user selection of record icon 3202 is received, the presentation application may enter into presentation and/or presenter's mode to record a presentation of the slides currently open in the presentation application. For example, and as described above, the presentation application may switch to a presentation mode that displays the slide show presentation in a format suitable for viewing by an audience. In addition, or alternatively, the presentation application may switch to a presenter's mode that can be used by a presenter while giving a slide show presentation. While in presentation and/or presenter's mode, the presentation application may record the presentation given by the presenter.

In some embodiments, the presentation application may record the displayed slides of the slide show presentation by saving the timing between transitions in the presentation. That is, during the presentation, the transitions between, for example, the slides and/or object animations may progress by either manual manipulation from a presenter or based on timing settings predefined in edit mode. To record the slide show presentation, the presentation application may record the timing of each of these transitions. This allows the presentation to recreate the visual component of the slide show presentation at a later time. The presentation application can use the recreated visual component to create a video file, such as an MPEG file.

In some embodiments, the presentation application may record the displayed slides of the slide show presentation directly using, for example, a screen capturing program. For example, the screen capturing program may take a series of screen shots during the slide show presentation and may save the screen shots as a video file (e.g., an MPEG file).

In addition to or instead of saving the slides or slide transitions of the slide show presentation, the presentation application may perform audio recording to obtain a sound track that can accompany the slide show presentation. For example, the presentation application may enable an audio input device (e.g., included in user interface 102 of FIG. 1), such as a microphone, to record audio (e.g., the presenter's voice) onto an audio track. An example of the process that the presentation application may perform to record a slide show presentation with accompanying audio is described below in connection with FIG. 35.

In some embodiments, the application may provide a user with the ability to pause the recording of the presentation. This may allow the user to stop the recording of a presentation in the event of, for example, an interruption in the presentation (e.g., if an audience member asks a question). To pause the recording, the presentation application can pause the progression of the slide show presentation and the audio recording. If a screen capturing program is used for video recording, the presentation application may also pause the screen capturing program. If the presentation application records the slide show presentation by saving slide transitions, the presentation application may perform the steps described below in connection with FIG. 36 to pause recording.

The presentation application may provide an interface that allows the presenter to pause the recording and progression of the presentation in the presenter's mode of the application. In the presenter's mode, a "record" selectable icon may be displayed when the presentation is being recorded, and a "pause" selectable icon may be displayed when the presentation is not being recorded. By selecting the "record" or the "pause" icon, depending on which is displayed, the presenter may direct the presentation application to change the recording state of the presentation. The presentation application may display the slide show presentation to an audience using the presentation mode, where neither the "record" nor the "pause" icon may be displayed.

The presentation application may create an audio-visual media file (e.g., an MPEG file) based on the recorded slide show presentation. The audio component of the audio-visual media file may be the audio recorded during the slide show presentation, and the visual component may be the slides of the slide show presentation. The presentation application may create the audio-visual media file automatically or in response to a user request. For example, in some embodiments, the presentation application may create the audio-visual media file automatically once the slide show presentation has ended (e.g., by combining the video file and the audio file). In some embodiments, the presentation application may create the audio-visual media file in response to a user request to export the recorded slide show presentation (described below).

With continued reference to FIG. 32, the presentation application may provide play icon 3204 to allow the user to play back a slide show presentation that was previously recorded (e.g., a presentation recorded by selecting record icon 3202). For example, in response to receiving a selection of play icon 3204, the presentation application may play the most recently recorded presentation associated with the slides that are currently opened (e.g., in the edit mode). The recorded presentation may be played in, for example, the presentation mode, where the slides are displayed with the timing (e.g., the time between slides or between different animations) of the previously recorded presentation. Alternatively, the presentation application can invoke a media player to play the audio-visual media file generated for the recorded presentation. In some embodiments, the presentation application may display the slide show presentation with the audio recorded by the presenter.

Selecting play icon 3204 may cause the presentation application to play the recorded slide show presentation from any suitable slide or from any point in the slide show presentation. For example, the presentation application may begin to play from the currently selected slide (e.g., the slide displayed in the slide canvas). As another example, the presentation application may begin playback from the beginning of the presentation regardless of which slide is currently selected, or from any other suitable playback position. The presentation application can ensure that any audio that is played during playback of the slide show presentation corresponds to the appropriate slide or slide transition.

Figure 33:
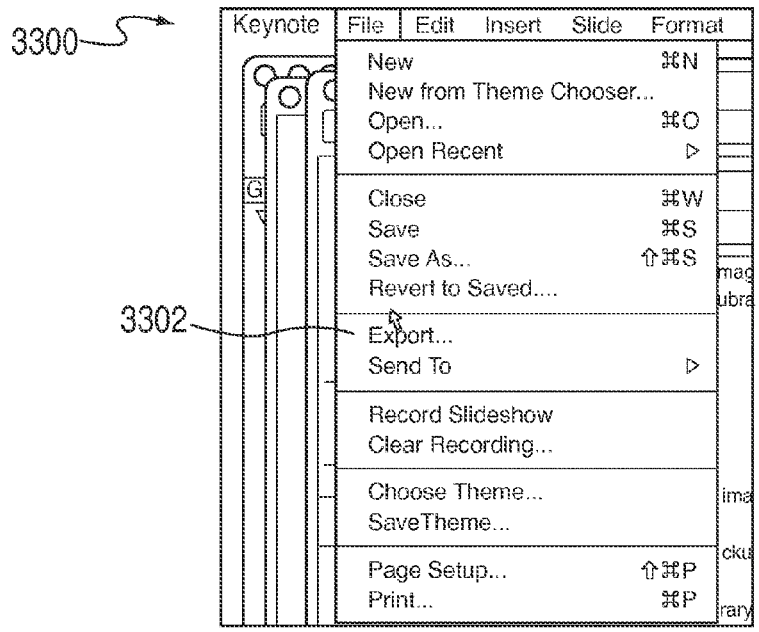
FIG. 33 shows an illustrative pull-down menu that includes options for exporting a recorded presentation in accordance with an embodiment of the present invention.

In some embodiments, the slide show presentation, including the audio recorded by the user, can be exported from the application to another file format. As illustrated in FIG. 33, a user may export the slide show by navigating to the "File" menu item in the taskbar of the presentation application and then to "Export . . . " option 3302. In response to receiving a selection of Export option 3302, the presentation application may bring up a display window with options for exporting the slide show presentation.

Figure 34:
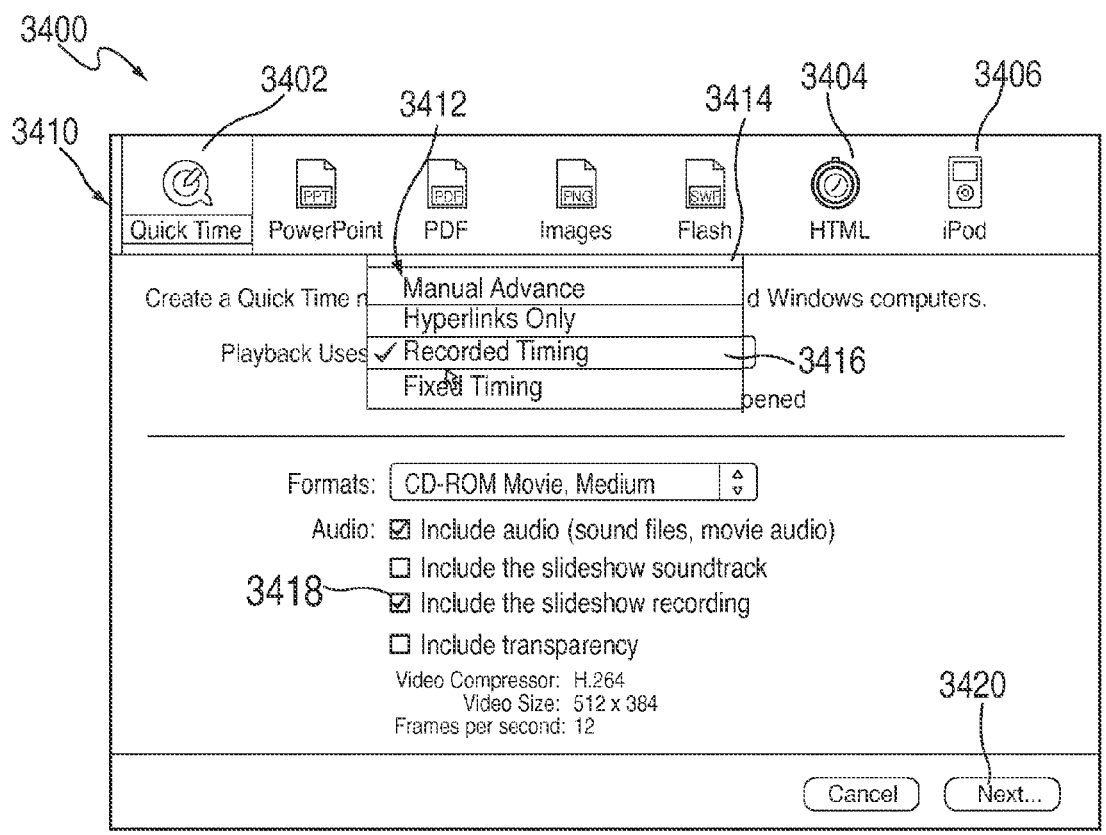
FIG. 34 shows an illustrative options window for exporting a recorded presentation in accordance with an embodiment of the present invention.

Window 3400 of FIG. 34 may illustrate one embodiment of a window presented by the application when an export of a slide show is requested. Window 3400 can include program options bar 3410 to allow a user to select a particular program or source that may be receiving the exported presentation file. Options bar 3410 may include, among other options, Quicktime option 3402 for exporting the presentation to a Quicktime application, HTML option 3404 for exporting the presentation to a web site (e.g., YouTube, etc.), and iPod option 3406 for exporting the presentation to a video format supported by a video iPod. It should be understood that the options shown in options bar 3410 of FIG. 34 are merely illustrative, and any other suitable file format may be contemplated.

Based on the selected program, the presentation application may provide window 3400 with various input mechanisms (e.g., drop-down menus, check boxes, etc.) that allow a user to define export settings. The export settings may include playback settings to define the way in which the progression of the exported presentation will be advanced (e.g., manually), format settings to set the quality (e.g., high, low) of the exported presentation, and audio settings to select the audio component of the exported presentation. For example, the presentation application may provide drop-down menu 3412, where a user can select one of a plurality of playback settings for the exported file. The user can select option 3414 to produce an exported presentation that is manually advanced, or the user may select option 3416 to produce an exported presentation with the timing of the recorded presentation. Using highlight region 3418, the user may choose to include or to exclude the recorded audio in the exported presentation.

Window 3400 can include "Next . . . " option 3420, which a user may select to direct the presentation application to export the slide show presentation. When a user selection of "Next . . . " option 3420 is received, the presentation application can export the slide show presentation to the file type and settings associated with the program and the export settings specified by the user. In some embodiments, the presentation application may first create a media file of a particular type (e.g., an MPEG file with the user-defined audio and visual components), and the presentation application can convert this media file to a different format compatible with the selected program or source. The presentation application may also perform any source-specific actions with the exported presentation. For example, if the presentation is exported to a QuickTime format, the presentation application may invoke the QuickTime media player to play the exported presentation. If the presentation is exported to an iPod format, the presentation application may initiate storage of the exported presentation into the storage of an iPod (if present).

In some embodiments, the presentation application may have the capability to add subtitles to an exported slide show. The presentation application may automatically add subtitles to an exported slide show. Alternatively, window 3400 may include an option (not shown) for including subtitles in the exported slide show. In some embodiments, the presentation application can add subtitles to a video file by invoking an application capable of text-to-voice conversion. The text can then be applied to slide show presentation with or instead of the recorded audio, and may be exported to the format specified by the user.

Figure 35:
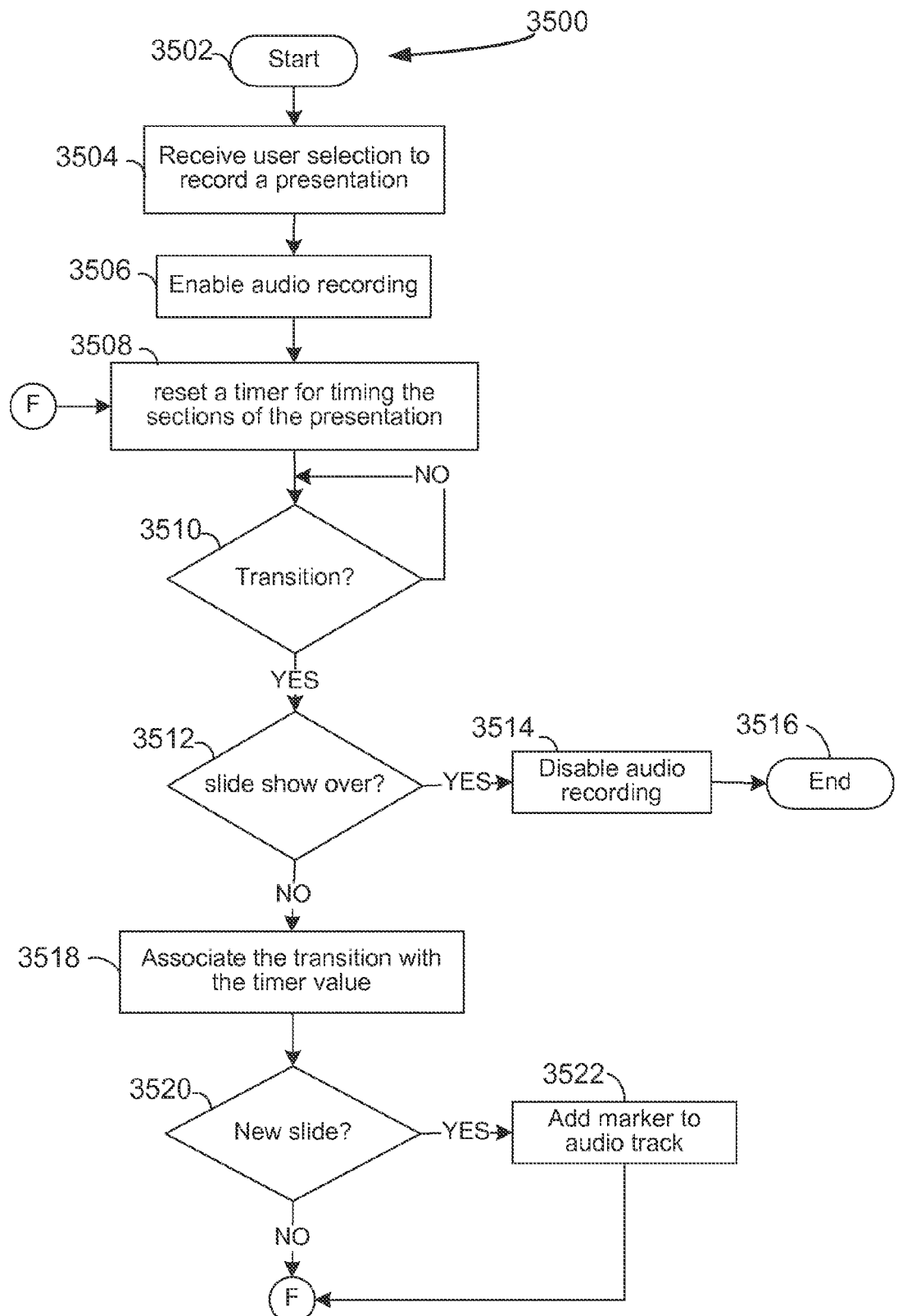
FIG. 35 shows a flow diagram of an illustrative process for recording a presentation in accordance with an embodiment of the present invention.

Referring now to FIG. 35, illustrative flow diagram of process 3500 is shown for recording a slide show presentation with audio in accordance with an embodiment of the present invention. Process 3500 may begin at step 3502. At step 3504, the presentation application may receive a user selection to record a presentation. For example, the presentation application may receive a user selection of record icon 3204 in FIG. 32. At step 3506, the presentation application may enable audio recording, and may activate a microphone for this purpose. At step 3508, the presentation application may reset and start a timer for timing sections of the presentations. In some embodiments, the presentation application may also display the timer to a presenter in, for example, the presenter's mode. Displaying the timer may provide the presenter with a visual indication as to the length of time since the previous slide or animation transition. When the slide show presentation has predefined transition timing, displaying the timer may provide the presenter with an indication as to when the next transition will take place.

At step 3510, the presentation application may determine whether a transition has occurred. The transition may be a slide transition, an animation or effect of an object (e.g., build in, build out, or smart build), or any other suitable transition defined in the slide show. Some animations that may affect the decision at step 3510 are discussed in greater detail in the P5574 reference. If, at step 3510, the presentation application determines that a transition has not occurred, process 3500 may return to step 3510 and may continue waiting for a transition. If, at step 3510, the presentation application determines that a transition has occurred, process 3500 may move to step 3512. At step 3512, the presentation application may determine whether the slide show has ended. If the slide show has ended, process 3500 may move to step 3514. At step 3514, the presentation application may disable audio recording (e.g., may turn off a microphone), and process 3500 may end at step 3516.

If, from step 3510, the presentation application instead determines that the slide show has not ended, process 3500 may move to step 3518. At step 3518, the presentation application may associate the value of the timer with the transition that occurred at step 3510. The value of the timer may reflect the amount of time that has lapsed since the previous transition (e.g., the last animation or slide change). Therefore, saving the time lapse between each transition in this way may allow the presentation application to reproduce the timing of the slide show presentation at a later time.

At step 3520, the presentation application may determine whether the slide show presentation has changed to a new slide. If the presentation application determines that the slide show has not changed to the next slide, process 3500 may return to step 3508 and may reset the timer for timing the next transition. If, at step 3520, the presentation application instead determines that the slide show has changed to the next slide, the presentation application may move to step 3522. At step 3522, the presentation application may add a marker to the audio track to indicate the location of the slide change in the time progression of the slide show presentation. Therefore, if the presentation is played back from this new slide rather than from the first slide, the audio track can be played starting from the proper time. Process 3500 may return to step 3508 and the presentation application may reset the timer for timing the next transition in the slide show.

One skilled in the art would understand that FIG. 35 is merely illustrative. Any of the steps of process 3500 may be omitted, modified, combined, and/or rearranged, and any additional steps may be performed without departing from the scope of the invention. For example, the steps of process 3600 may be modified to use screen capturing for obtaining the video component of a slide show presentation.

Figure 36:
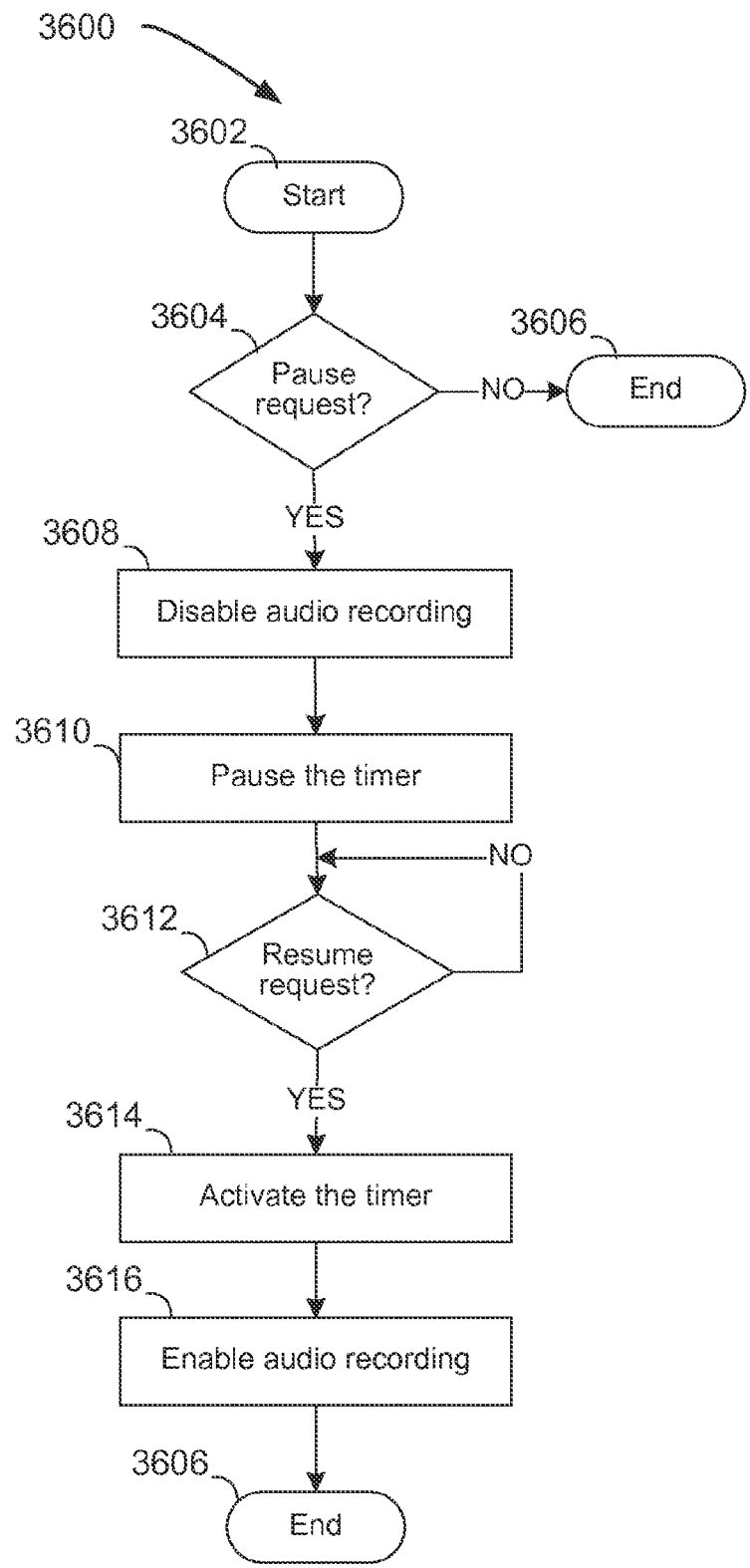
FIG. 36 shows a flow diagram of an illustrative process for pausing the recording of a presentation in accordance with an embodiment of the present invention.

Referring now to FIG. 36, illustrative flow diagram of process 3600 is shown for pausing the recording of a slide show presentation in accordance with an embodiment of the present invention. Process 3600 may begin at step 3602. At step 3604, the presentation application may determine whether a pause request has been received from the user. The pause request may be received when, for example, a presenter selects an icon in the presenter's mode of the application. If the presentation application determines that a pause request has not been received, process 3600 may move to step 3606 and end.

If, at step 3604, the presentation application instead determines that a pause request has been received, process 3600 may move to step 3608. At step 3608, the presentation application may disable audio recording. This may cause the recorded audio track to pause. At step 3610, the presentation application may pause the timer used to obtain timing information on slide transitions (discussed above). Thus, neither the audio nor the visual of the recording may remain active when a pause command is received.

At step 3612, the presentation application may determine whether a resume request has been received. A resume request may be received when, for example, the presenter re-selects the icon on the presenter's mode display. If no resume request has been received, process 3600 may return to step 3612 and may wait for a resume request. If, at step 3612, the presentation application determines that a resume request has been received, process 3600 may move to step 3614. At step 3614, the presentation application may reactivate the timer, and at step 3616, the presentation application may enable audio recording. Thus, by re-activating both the audio recording and the timer at approximately the same time, audio track and the slide show timing may continue to progress together. Process 3600 may then end at step 3606.

One skilled in the art would understand that FIG. 36 is merely illustrative. Any of the steps of process 3600 may be omitted, modified, combined, and/or rearranged, and any additional steps may be performed without departing from the scope of the invention. For example, the steps of process 3600 may be modified to include screen capture pausing in addition to or instead of pausing the timer.

Figure 37:
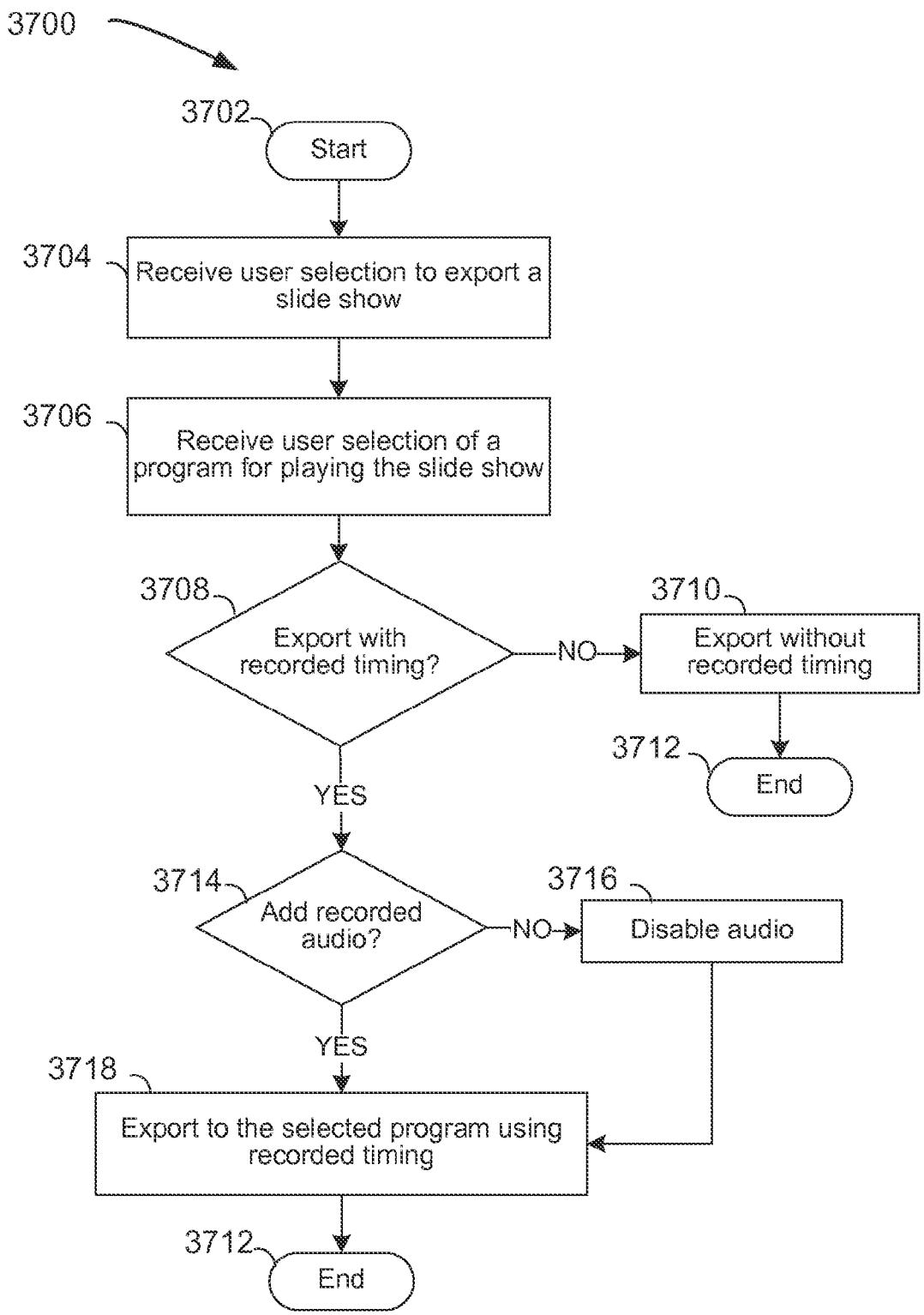
FIG. 37 shows a flow diagram of an illustrative process for exporting a recorded presentation in accordance with an embodiment of the present invention.

Referring now to FIG. 37, illustrative flow diagram of process 3700 is shown for exporting a recorded slide show presentation to a different program. Process 3700 may begin at step 3702. At step 3704, the presentation application may receive a user selection to export a slide show presentation. The selection can be received by the presentation application when, for example, a user selects an export option from drop-down menu 3304 in FIG. 33. At step 3706, the presentation application may receive a selection of another program. The other program may be received from the user, and may be a program (e.g., Quicktime) or source (e.g., an iPod, YouTube, a personal website, etc.) to which the user may want to export the presentation.

At step 3708, the presentation application may determine whether to export the slide show presentation using the timing from the recorded presentation. For example, the presentation application may determine whether the user has selected "Recorded Timing" option 3416 (FIG. 34) from pull-down menu 3414 (FIG. 34), or may determine whether the source or program selected at step 3706 can support a dynamic slide show presentation. If the presentation application determines that the recorded timing should not be used, process 3700 may move to step 3710. At step 3710, the presentation application may export the slide show without using the recorded timing. For example, the presentation application may export the slide show using a setting that enables manual slide show transitions. Process 3700 may then end at step 3712.

If, at step 3708, the presentation application determines that the timing of the recorded presentation should be used, process 3700 may move to step 3714. At step 3714, the presentation application may determine whether to include the recorded audio in the exported presentation. In some embodiments, this determination can be performed based on whether a user selection of checkbox 3418 (FIG. 34) has been received. If, at step 3714, the presentation application determines that the audio should not be exported, process 3400 may move to step 3716. At step 3716, the audio may be disabled. Process 3400 may then move to step 3718, described below.

Returning to step 3714, if the presentation application instead determines that the recorded audio should used, process 3700 may move to step 3718 without disabling the audio. At step 3718, the presentation application may export the presentation to the selected portion using the recorded timing. Because the selected application may be associated with a particular file format (e.g., resolution, compression, etc.) different than the current format, exporting the application may involve converting the slide show presentation to the format expected by the selected application. In some embodiments, exporting the slide show presentation may be performed in real-time. That is, the presentation application may play the slide show presentation, and while the slide show is played, the presentation application may save and convert the slide show presentation in the format of the selected program. In other embodiments, the presentation application may export the slide show presentation substantially faster than in real-time (e.g., 1.5×, 3×, 10× times faster) depending on the available format converters available to the presentation application. Process 3700 may end at step 3712.

One skilled in the art would understand that FIG. 37 is merely illustrative. Any of the steps of process 3700 may be omitted, modified, combined, and/or rearranged, and any additional steps may be performed without departing from the scope of the invention.

The presentation application may provide a plurality of features and functionalities, including those are described above. Some of the features provided by a presentation application may not be supported by other applications or programs, or may not be supported by older versions of the presentation application. For example, when exporting a recorded slide show presentation to another program, as described above in connection with FIG. 37, some smart builds or other features of the presentation may not be supported by the other program. As another example, when importing files that were created and/or edited by other programs, the presentation application may not support some of the features used in these other applications. Thus, to alleviate problems associated with unsupported features, some embodiments of the presentation application can provide an advanced user interface for allowing the user to address any importing or exporting issues that may arise.

Figure 38:
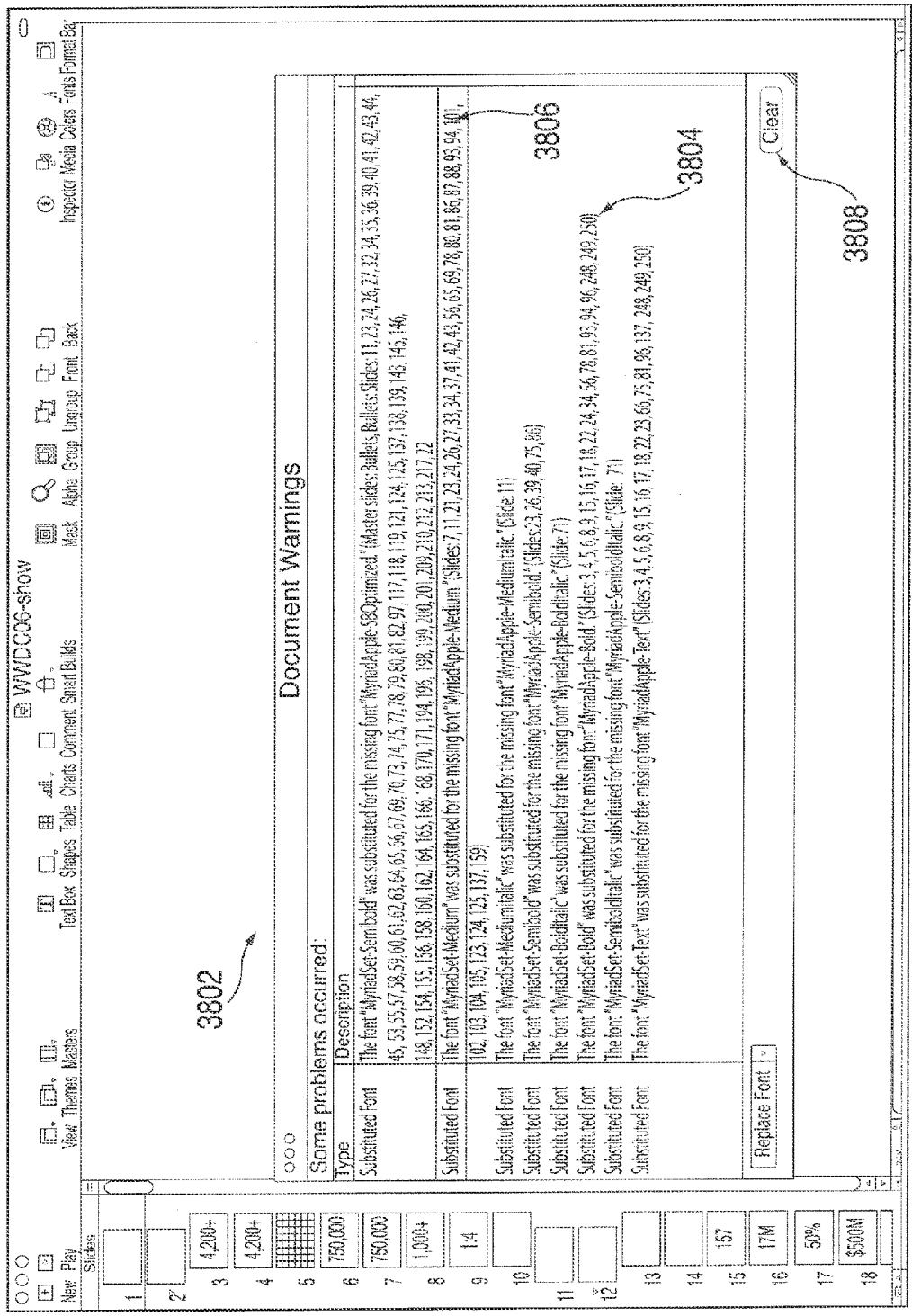

In some embodiments, an overlay may be displayed by the presentation application when a saved slide show is opened. The presentation application may provide a Document Warnings overlay window to the user if any import errors are discovered when the slide show is opened. FIG. 38 may be an illustrative display of a Document Warnings window. Document Warnings window 3802 can include a list of one or more rows, where each listing shows a particular warning 3804. The warnings or errors listed in window 3802 may inform the user of any type of import error that may occur. For example, window 3802 may list any warnings or notifications associated with features unsupported by the presentation application, such as warnings about an unsupported font or chart type.

Each warning 3804 of Document Warnings window 3802 may be selectable. To choose a particular warning/notification, the user may move highlight region 3806 to the warning or may directly select one of the warnings using an input device (e.g., a mouse or stylus). In response to receiving a selection of one of the warnings, the presentation application may display more information for the selected warning, if available, or may display options associated with the selected warning.

Each warning 3804 of Document Warnings window 3802 may list the slides in the slide show that are affected by the warning. For example, if warning 3804 is intended to notify the user of an unsupported font, warning 3804 may list all of the slides that include the unsupported font. Selecting a warning using highlight region 3806 may cause the presentation application to display one of the affected slides (e.g., the first affected slide). This may allow the user to quickly and easily navigate to an affected slide and determine the severity of the importing error. In these embodiments, the presentation application may display each of the affected slides in succession when the user selects a warning multiple times. In other embodiments, warning 3804 may list the slides that are affected by a particular import error, and may rely on the user to manually select a slide affected by the error.

In some embodiments, selecting a warning using highlight region 3806 may cause the presentation application to display several different correction options to the user (not shown in FIG. 38). For example, if a user selects a warning for an unsupported font, the presentation application may display a new window or a pull-down menu that lists different substitute fonts. The listed fonts may be those that the presentation application has determined are most similar to the unsupported font. If the presentation application cannot determine which font or fonts would be most similar to the unsupported font, the presentation application may display one or more fonts that are most commonly used (e.g., in the current slide show or across multiple slide shows).

If the user selects one of the substituted fonts that the presentation application displays in the new window or pull-down menu, each instance of the unsupported font may be replaced by the selected font. In some embodiments, choosing one of the plurality of correction options may direct the presentation to temporary replace all instances of the unsupported font with the selected font. The presentation application may allow the user to preview the corrections before finalizing the corrections, thereby providing an opportunity for the user to choose and preview a different correction option. Because selecting the warning message may also bring the user to a slide affected by the warning, as described above, this interface may provide a simple and effective way to correct import errors. The user may make any necessary corrections substantially using Document Warnings window 3804 (rather than manually going through each slide), and can rely on Document Warnings window

3804 to inform the user of any problems that may arise due to importing files from different sources.

Figure 39:
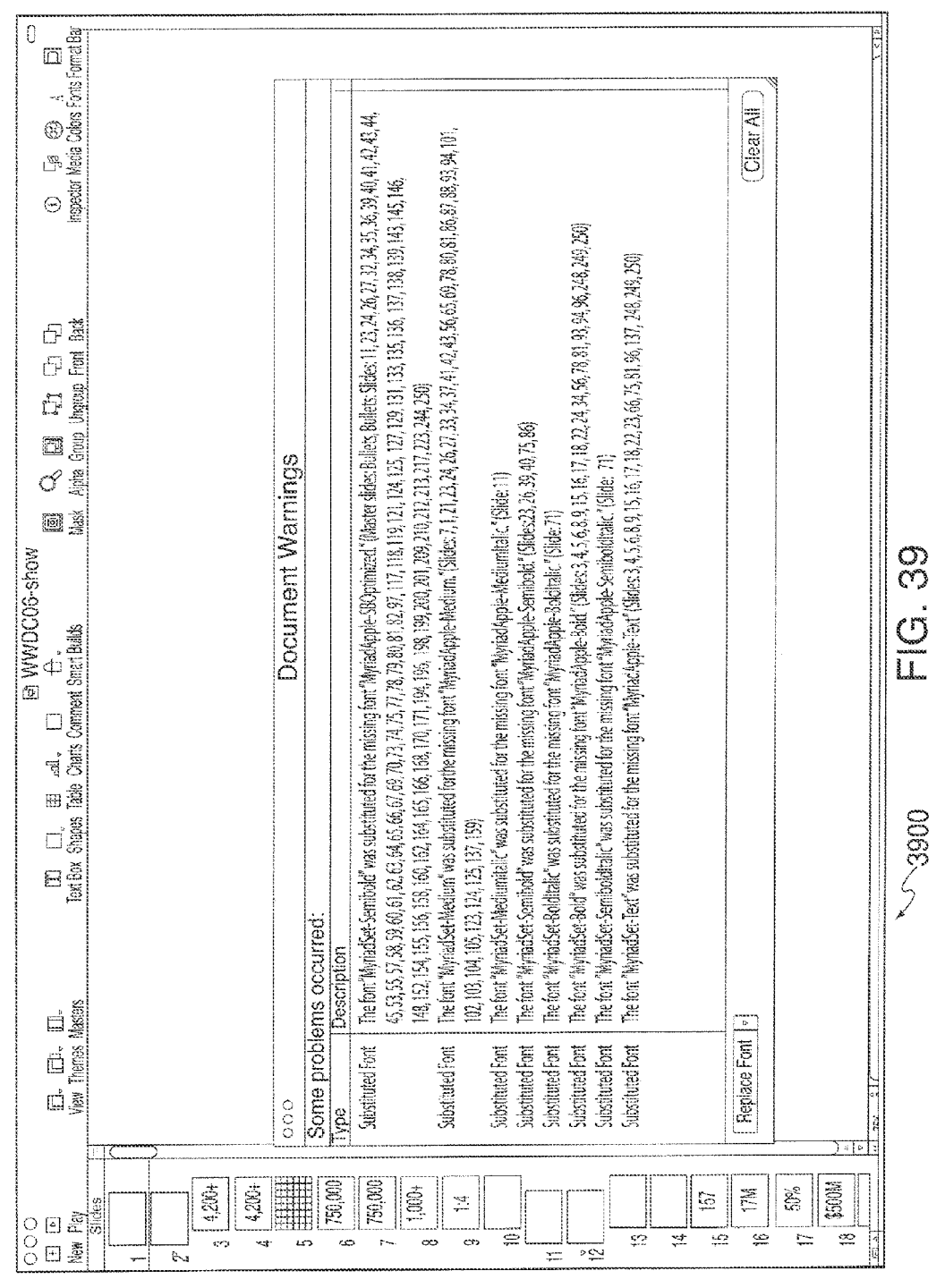

When a warning is highlight in Document Warnings window 3802, the user may direct the presentation application to remove the highlighted warning by selecting button 3808. For example, the user may choose to select button 3808 when the user no longer needs to see the warning message (e.g., has corrected the import error associated with the warning message). In response to receiving the selection, the presentation application can provide a display screen similar to display screen 3900 of FIG. 39. Display screen 3900 may show a Document Warnings list with one less import notification than display screen 3800 of FIG. 38.

In some operating scenarios of the presentation application, a user may have several presentations open. In these scenarios, the presentation application may provide a different Document Warnings window for each open presentation. Each Document Warnings window may list the import notifications/warnings for its associated presentation. When one of the presentations is displayed in the foreground of the application, the Document Warnings window associated with that presentation may also be brought to the foreground. For example, when the user directs the presentation application to display the slides of a particular presentation, the presentation application may display the Document warnings window associated with those slides as an overlay over the slides.

In some embodiments, the presentation application may automatically correct an import error. The presentation application may automatically correct an import error when, for example, it determines that there is only one suitable approach or a best approach for the type of unsupported import error. When this occurs, the warning displayed in Document Warnings window 3802 may be a warning that the automatic correction took place. For example, in some cases, the presentation application may automatically substitute an unsupported font with another font, and may display a warning in the Document Warnings window that a font has been substituted. This example may be illustrated by warning 3804, which may be of type "Substituted Font." As another example, the presentation application may replace a corrupted object in a slide with a placeholder object, and may notify the user of this replacement. For example, if an image included the presentation cannot be identified by the presentation application, the presentation application may display a placeholder image (e.g., of a question mark) in place of the unidentified image. This placeholder image or object may provide a user indication that there should be an object at that position, and may in some scenarios indicate the size of the original object.

As mentioned above, the presentation application may display different types of import errors. The user may determine what types of import errors to display in Document Warnings window 3802 (FIG. 38). For example, the user may only want to view import errors that require manual correction, and may therefore disable the display of warnings for errors that have been automatically corrected by the presentation application. Any other criteria for limiting the types of warnings displayed may also be used.

Figure 40:
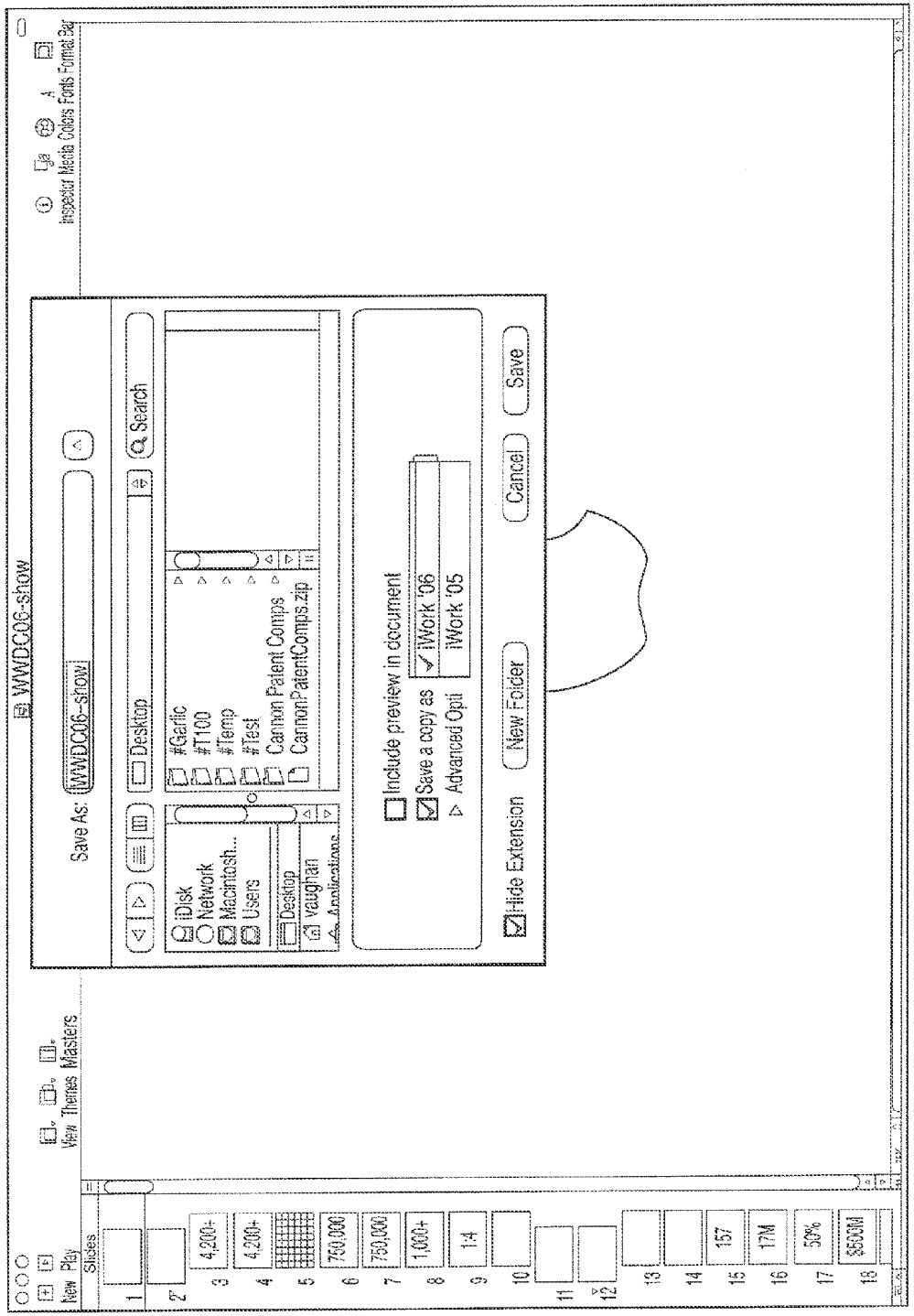
FIG. 40 shows an illustrative display screen for saving a presentation using an older version of the presentation application in accordance with an embodiment of the present invention.

Although, up to this point, Document Warnings window 3802 (FIG. 38) has been described for import notifications, it should be understood that the window (or a separate window) may be used for export notifications. In particular, the presentation application can generate export warnings when a user directs the presentation application to export a presentation to another application (e.g., Quicktime) or when a user wants to save a slide show presentation using an older version of the application. A display for exporting a file to another application was described above in connection with FIG. 34. A display for saving a presentation to an older version of an application may be illustrated by display 4000 of FIG. 40. When a presentation is exported to an older version of an application, some features, such as action builds, smart builds, and slide transitions may not be compatible with the other application or with an older version of the application. Therefore, Document Warnings window 4002 (FIG. 40) may aid a user in determining how to convert the presentation to one capable of being exported.

Figure 41:
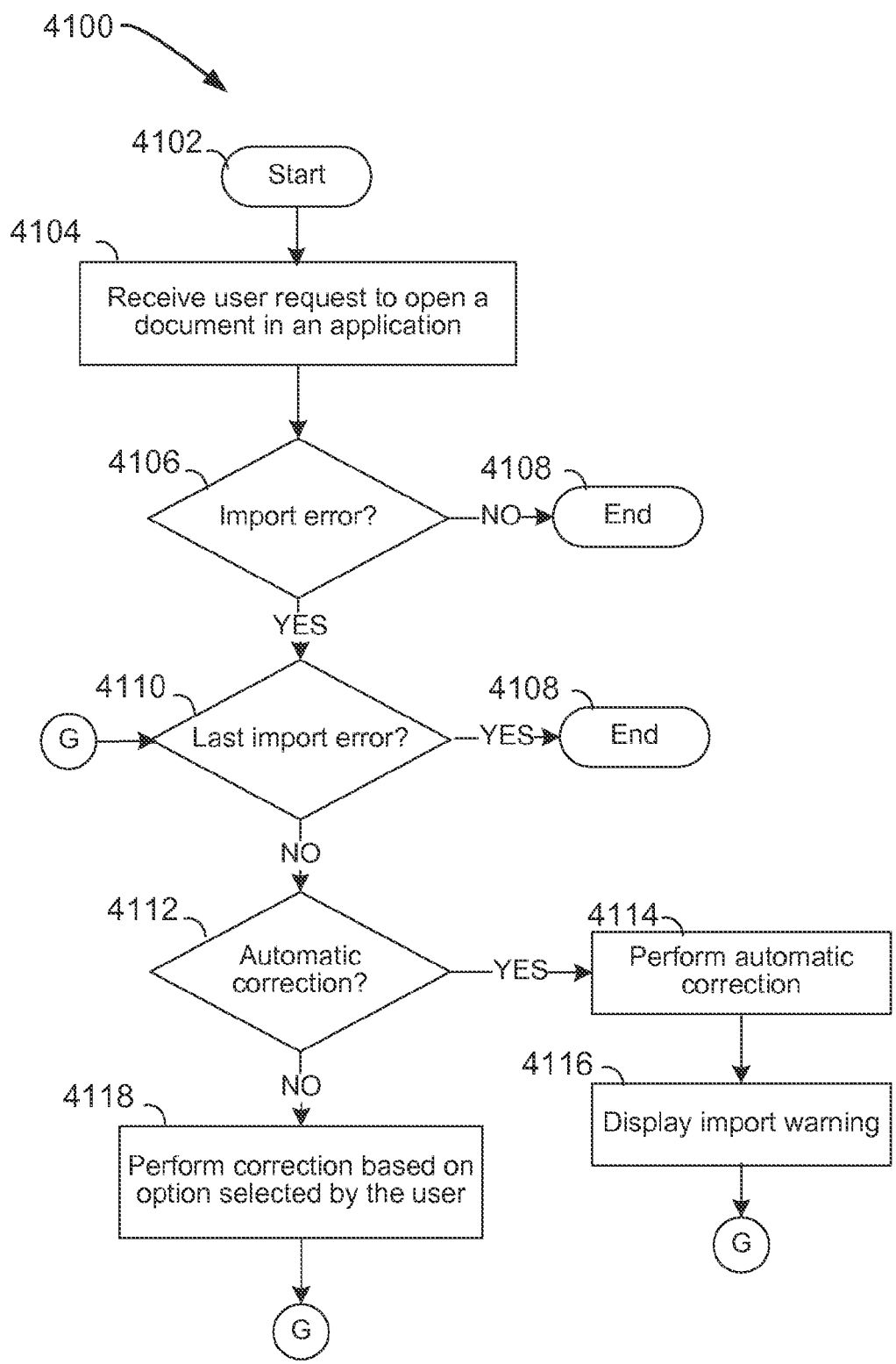
FIGS. 41 and 42 show flow diagrams of illustrative processes for correcting import and export errors in accordance with various embodiments of the present invention.

FIG. 41 is a flow diagram of an illustrative process for identifying import errors in accordance with one embodiment of the invention. Process 4100 may begin at step 4102. At step 4104, the presentation application may receive a user request to open a document (e.g., a slide show). At step 4106, the presentation application may determine whether at least one import error has occurred. An import error may occur, for example, if the document requested by the user was created or edited using a different application that supports features not supported by the presentation application. If, at step 4106, the presentation application determines that no import error has occurred, process 4100 may move to step 4108 and end.

If, at step 4106, the presentation application instead determines that an import error has occurred, process 4100 may move to step 4110. At step 4110, the presentation application may determine whether the import error is the last import error that needs to be addressed. For example, the presentation application may determine whether all of the import errors associated with the document have been addressed (e.g., a warning has been displayed for each error). If the import error is the last import error, process 4100 may move to step 4108 and end.

If, at step 4110, the presentation application determines that the import error is not the last import error, process 4100 may move to step 4112. At step 4112, the presentation application may determine whether to perform automatic correction. The application may decide to automatically correct an import error if there is a logical correction strategy. For example, the application may automatically substitute an unsupported font with a font that appears nearly identical. The choice of whether to automatically correct a particular error may be a design choice made by designers of the presentation application. For example, the presentation application may keep track of a set of typical unsupported features and an approach to automatically correct each of the unsupported features in the set.

If, at step 4112, the presentation application determines that automatic correction should be performed, process 4100 may move to step 4114. At step 4114, the presentation application may perform the automatic correction associated with the import error (e.g., automatic font replacement), and at step 4116, the presentation application may display an import warning informing the user of the automatic correction. For example, for an automatically replaced font type, the presentation application may display a warning message of type "Substituted Font," as described above. Process 4116 may then move back to step 4110 to address another import error, if necessary.

Returning to step 4112, if the presentation application instead determines that automatic correction will not be performed, process 4100 may move to step 4118. At step 4118, the presentation application may perform correction based on a correction option selected by the user. The correction option may be selected by the user from a plurality of options in, for example, a pull-down menu associated with a Document Warnings window. The application may use a placeholder correction strategy for the import error until a user selection of a correction strategy is received. For example, for an unsupported font, the application may use a default font face until a user selects a different font, at which time the presentation application may replace the default font with the selected font. Thus, even if the presentation application bypasses step 4118 (e.g., by user request), the text may still be associated with a font supported by the presentation application—the default font. Process 4100 may then return to step 4110 to address another import error, if necessary.

One skilled in the art would understand that FIG. 41 is merely illustrative. Any of the steps of process 4100 may be omitted, modified, combined, and/or rearranged, and any additional steps may be performed without departing from the scope of the invention.

Figure 42:
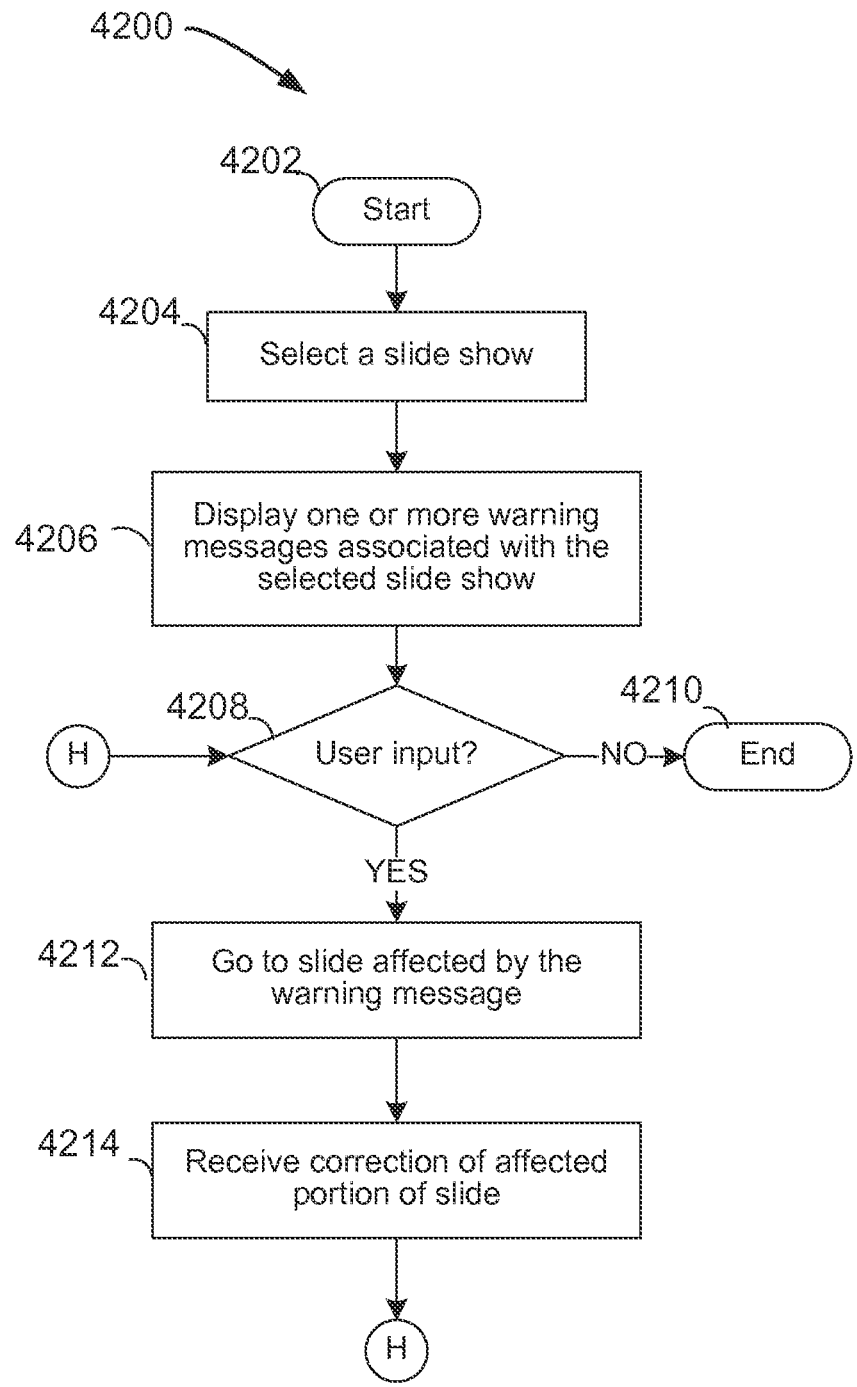

FIG. 42 is a flow diagram of an illustrative process for correcting a slide import/export error in accordance with one embodiment of the invention. Process 4200 may begin at step 4202. At step 4204, the presentation application may select a slide show. The selected slide show may be a slide show chosen by the user for editing. At step 4206, the presentation application may display one or more warning messages associated with the selected slide show. The warning messages may be displayed in a dedicated window, such as Document Warnings window 3802 of FIG. 38. At step 4208, the presentation application may determine whether a user selection of one of the warning messages has been received. If the application determines that no selection of a message has been received, process 4200 may move to step 4210 and end.

If, from step 4208, the presentation application instead determines that a user selection of a warning message has been received, process 4200 may move to step 4212. At step 4212, the presentation application may go to the slide affected by the warning message. For example, the application may show the affected slide in the slide canvas (e.g., slide canvas 210 of FIG. 2). At step 4214, the presentation application may receive a correction of the affected portion of the slide. The correction may be received from the user interacting with the slide directly (e.g., changing the font of a text box on the slide) or from the user interacting with a window associated with a Document Warnings window (e.g., selecting a font from a pull-down menu). In some embodiments, the presentation application may apply the received corrections to other slides in the slide show that have the same import/export error. Process 4200 may then return to step 4208, where the presentation application may determine whether another of the import/export errors has been selected by the user.

One skilled in the art would understand that FIG. 42 is merely illustrative. Any of the steps of process 4200 may be omitted, modified, combined, and/or rearranged, and any additional steps may be performed without departing from the scope of the invention.

Thus, the foregoing describes systems and methods for enhancing displayed objects, such as videos and images, within an application. Those skilled in the art will appreciate that the invention can be practiced by other than the described embodiments, which are presented for the purpose of illustration rather than of limitation.

What is claimed is:

1. A method of displaying a frame for an object in a presentation application implemented on an electronic device, wherein the frame has an inner boundary and an outer boundary, the method comprising:

displaying the object on a slide of a slide show presentation;

determining a first contour for the object wherein at least a portion of the first contour follows the inner boundary of the frame;

applying a mask to at least one portion of the object outside of the first contour and not to portions of the object inside of the first contour, wherein applying the mask comprises hiding the at least one portion without deleting information about the object;

displaying the frame so that the portions of the object inside the inner boundary are visible and the at least one portion of the object outside the outer boundary is not visible;

automatically determining, in response to input adjusting the size of the image, a second contour for the object that is different from the first contour; and applying the mask to portions of the object outside of the second contour.

2. The method of claim 1, wherein the inner and outer boundaries of the frame are not parallel and not straight.

3. The method of claim 1, further comprising:
receiving a selection of the frame from a plurality of frames.

4. The method of claim 1, wherein each of the object and the slide is stored as a file, and wherein hiding the portions of the object without deleting information about the object comprises:

hiding the portions of the object from view using information from the file representing the slide, the hiding of the portions of the object being performed without altering the file representing the object.

5. The method of claim 1, wherein at least one of the first contour or the second contour is in the inner boundary of the frame.

6. An electronic device, comprising:
a memory storing one or more routines; and
a processing component configured to execute the one or more routines stored in the memory, wherein the one or more routines, when executed by the processing component, execute a presentation application that performs acts comprising:

displaying an object on a slide of a slide show presentation;

determining a first contour for the object wherein at least a portion of the first contour follows the inner boundary of the frame;

applying a mask to at least one portion of the object outside of the first contour and not to portions of the object inside of the first contour, wherein applying the mask comprises hiding the at least one portion without deleting information about the object;

displaying the frame so that the portions of the object inside the inner boundary are visible and the at least one portion of the object outside the outer boundary is not visible;

automatically determining, in response to input adjusting the size of the image, a second contour for the object that is different from the first contour; and applying the mask to portions of the object outside of the second contour.

7. The electronic device of claim 6, wherein the inner and outer boundaries of the frame are not parallel and not straight.

8. The electronic device of claim 6, wherein the presentation application, when executed, performs acts further comprising:

receiving a selection of the frame from a plurality of frames.

9. The electronic device of claim 6, wherein each of the object and the slide is stored as a file, and wherein hiding the portions of the object without deleting information about the object comprises:

hiding the portions of the object from view using information from the file representing the slide, the hiding of the portions of the object being performed without altering the file representing the object.

10. The electronic device of claim 6, wherein at least one of the first contour or the second contour is in the inner boundary of the frame.

11. One or more non-transitory computer-readable media, encoding one or more routines which, when executed by a processor, cause the processor to perform acts comprising:

displaying an object on a slide of a slide show presentation;

determining a first contour for the object wherein at least a portion of the first contour follows the inner boundary of the frame;

applying a mask to at least one portion of the object outside of the first contour and not to portions of the object inside of the first contour, wherein applying the mask comprises hiding the at least one portion without deleting information about the object;

displaying the frame so that the portions of the object inside the inner boundary are visible and the at least one portion of the object outside the outer boundary is not visible;

automatically determining, in response to input adjusting the size of the image, a second contour for the object that is different from the first contour; and applying the mask to portions of the object outside of the second contour.

12. The one or more non-transitory computer-readable media of claim 11 wherein the inner and outer boundaries of the frame are not parallel and not straight.

13. The one or more non-transitory computer-readable media of claim 11, wherein the one or more routines, when executed, performs acts further comprising:

receiving a selection of the frame from a plurality of frames.

14. The one or more non-transitory computer-readable media of claim 11, wherein each of the object and the slide is stored as a file, and wherein hiding the portions of the object without deleting information about the object comprises:

hiding the portions of the object from view using information from the file representing the slide, the hiding of the portions of the object being performed without altering the file representing the object.

15. The one or more non-transitory computer-readable media of claim 11, wherein at least one of the first contour or the second contour is in the inner boundary of the frame.

16. The method of claim 1, wherein the inner boundary of the frame is determined based at least in part on metadata stored in a file associated with the frame.

17. The method of claim 1, wherein at least a portion of the first contour that follows the inner boundary of the frame does not follow an edge of the object.

18. The method of claim 1, comprising generating an adjusted frame by automatically lengthening or shortening the edges of frame.

19. The method of claim 18, wherein at least a portion of the second contour follows the inner boundary of the adjusted frame.

20. The method of claim 1, wherein at least a first edge of the object lies outside of the first contour and at least a second edge of the object lies inside of the first contour.

21. The method of claim 1, wherein at least a portion of the second contour that follows the inner boundary of the frame does not follow an edge of the object.

22. The method of claim 1, wherein at least a first edge of the object lies outside of the second contour and at least a second edge of the object lies inside of the second contour.

* * * * *